United States Patent
Yasu

(10) Patent No.: US 11,132,083 B2
(45) Date of Patent: Sep. 28, 2021

(54) FORCE SENSE PRESENTING OBJECT AND BOOK

(71) Applicant: NIPPON TELEGRAPH AND TELEPHONE CORPORATION, Chiyoda-ku (JP)

(72) Inventor: Kentaro Yasu, Atsugi (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 136 days.

(21) Appl. No.: 16/490,371

(22) PCT Filed: Feb. 26, 2018

(86) PCT No.: PCT/JP2018/008193
§ 371 (c)(1),
(2) Date: Aug. 30, 2019

(87) PCT Pub. No.: WO2018/159855
PCT Pub. Date: Sep. 7, 2018

(65) Prior Publication Data
US 2020/0012407 A1    Jan. 9, 2020

(30) Foreign Application Priority Data

Mar. 3, 2017 (JP) .............................. JP2017-040127
Oct. 6, 2017 (JP) .............................. JP2017-195925

(51) Int. Cl.
*G06F 3/01* (2006.01)
*G06F 3/041* (2006.01)
(Continued)

(52) U.S. Cl.
CPC .......... *G06F 3/04142* (2019.05); *G01L 1/122* (2013.01); *G06F 3/03547* (2013.01)

(58) Field of Classification Search
CPC .. G06F 3/04142; G06F 3/03547; G06F 3/016; G01L 1/122; G01L 1/12;
(Continued)

(56) References Cited

U.S. PATENT DOCUMENTS

| | | | |
|---|---|---|---|
| 6,747,631 B1 * | 6/2004 | Sakamaki | G01L 1/14 345/157 |
| 2006/0175753 A1 * | 8/2006 | MacIver | A63F 3/00643 273/237 |
| 2008/0024464 A1 * | 1/2008 | West | G06F 3/03548 345/184 |

FOREIGN PATENT DOCUMENTS

| | | |
|---|---|---|
| JP | 2000-89895 A | 3/2000 |
| JP | 2000-207114 A | 7/2000 |

OTHER PUBLICATIONS

International Search Report dated Apr. 10, 2018 in PCT/JP2018/008193 filed Feb. 26, 2018.

* cited by examiner

*Primary Examiner* — Lunyi Lao
*Assistant Examiner* — Jarurat Suteerawongsa
(74) *Attorney, Agent, or Firm* — Oblon, McClelland, Maier & Neustadt, L.L.P.

(57) ABSTRACT

To present different force senses depending on visually-recognizable patterns by using magnetic bodies which are preliminarily magnetized. A force sense presenting object includes: a base object that includes a first surface, which is preliminarily magnetized with a first texture including an S-pole region and an N-pole region; a first sheet that is provided with a first pattern, which is visually recognizable, and is layered on the first surface side of the base object; a second sheet that is provided with a second pattern, which is visually recognizable and is different from the first pattern, and is layered on the first surface side of the base object; a
(Continued)

first contact object that includes a second surface which is preliminarily magnetized with a second texture including an S-pole region and an N-pole region; and a second contact object that includes a third surface which is preliminarily magnetized with a third texture which includes an S-pole region and an N-pole region and is different from the second texture.

4 Claims, 43 Drawing Sheets

(51) Int. Cl.
  *G01L 1/12*    (2006.01)
  *G06F 3/0354*   (2013.01)
(58) Field of Classification Search
  CPC .......... A63F 3/00694; A63F 2007/4068; A63F 2003/00432; A63F 2003/0034; A63F 2011/0081
  See application file for complete search history.

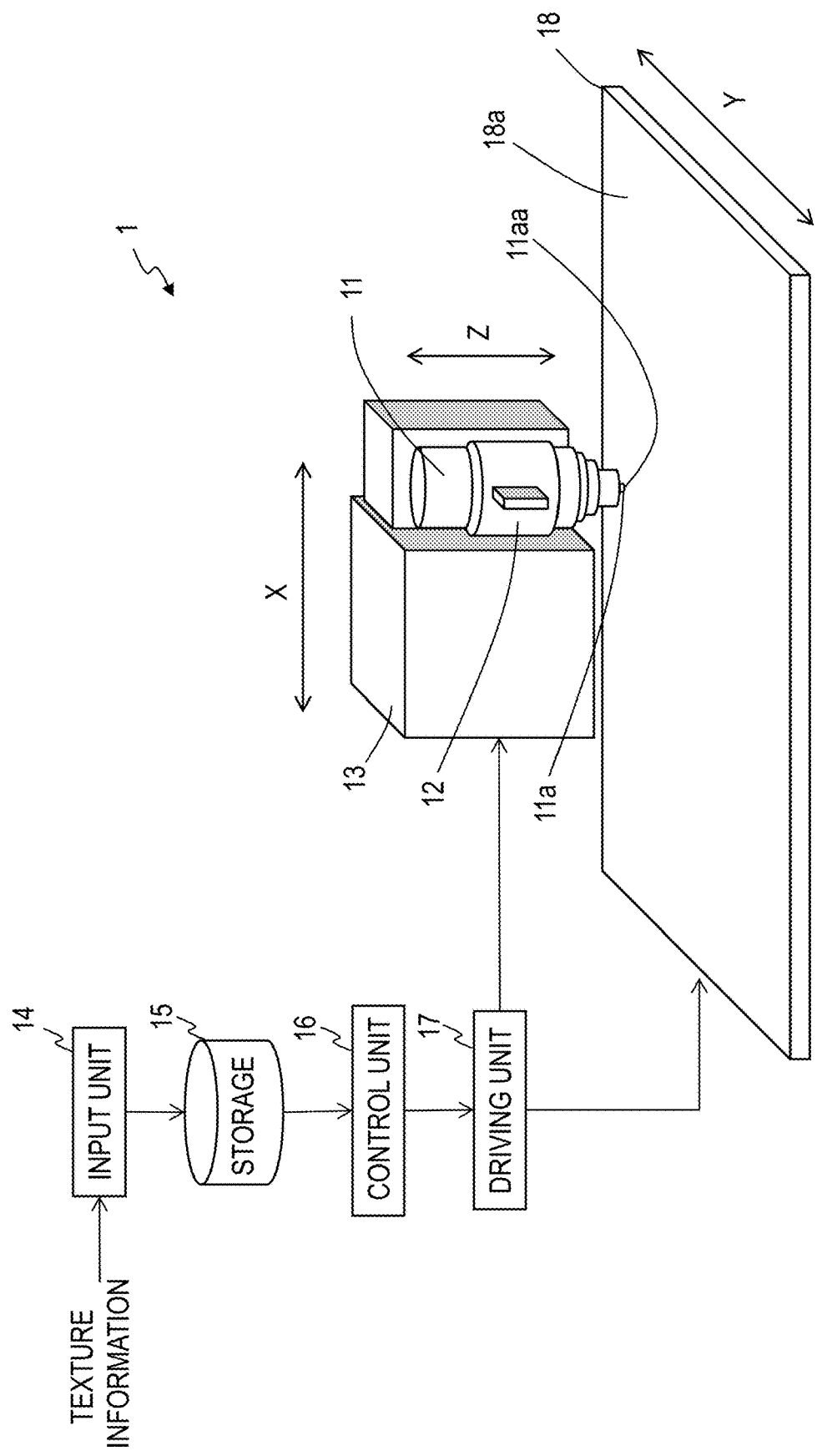

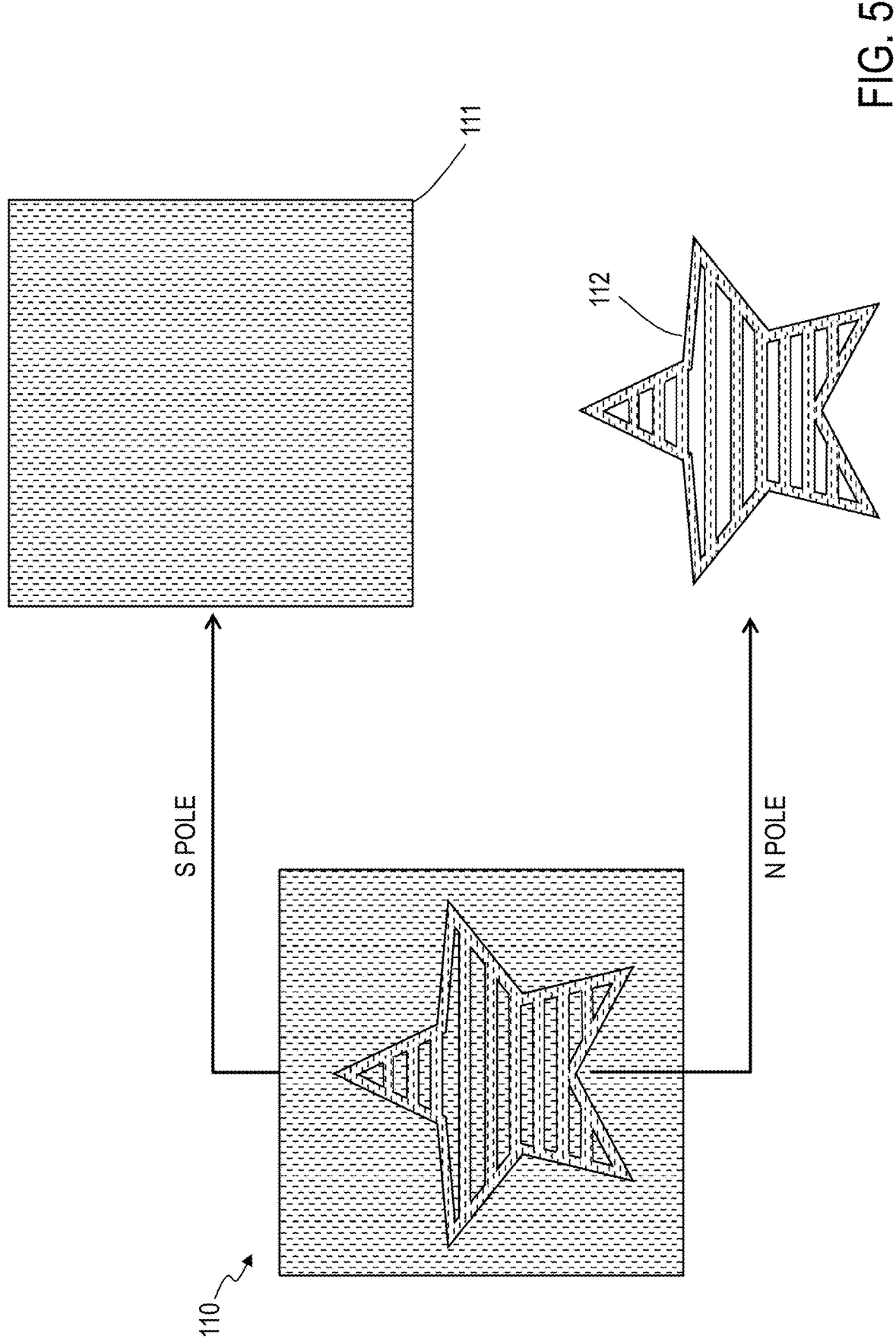

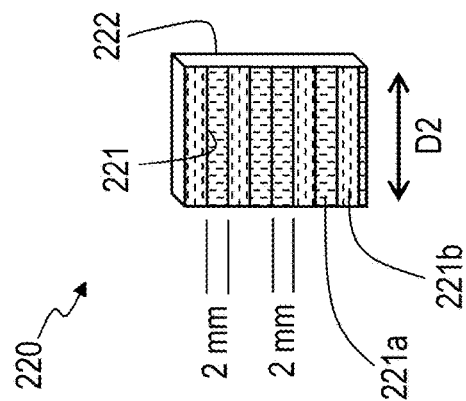
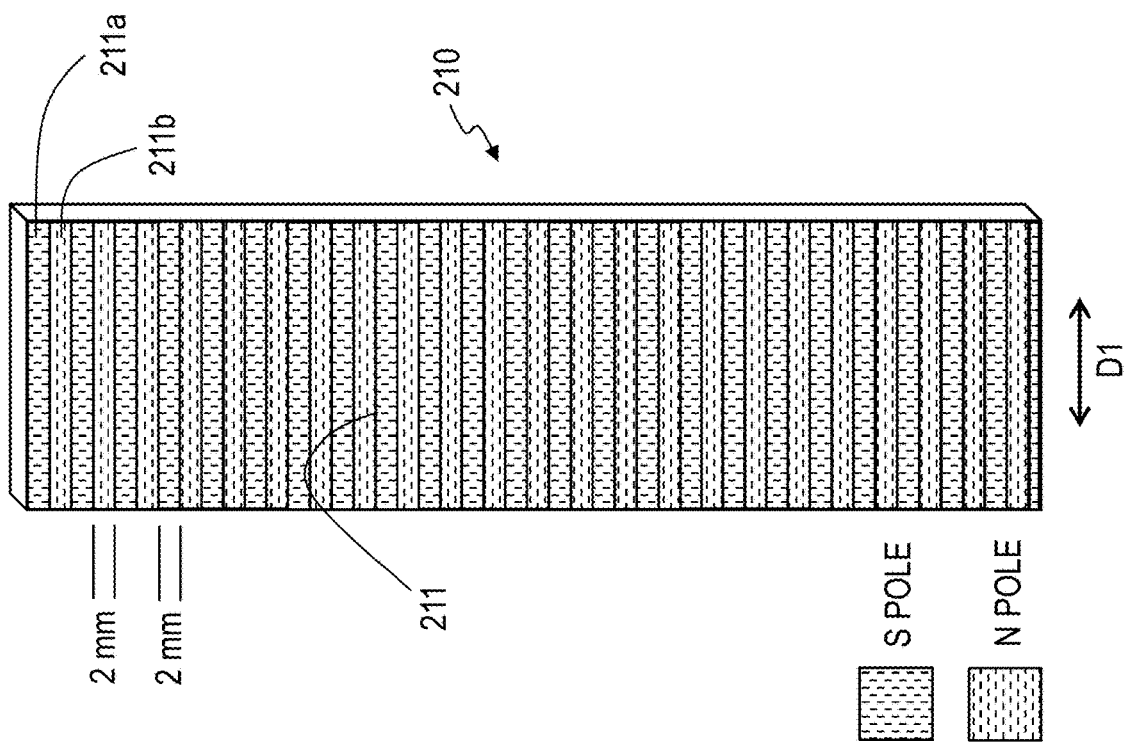
FIG. 6B
FIG. 6A

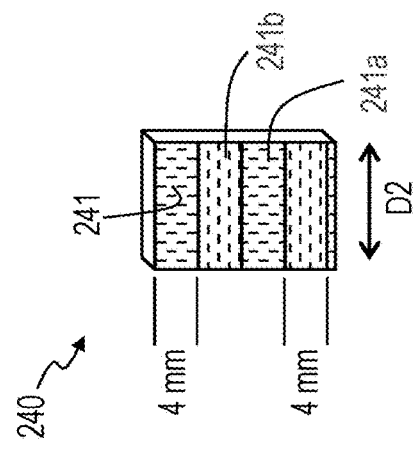
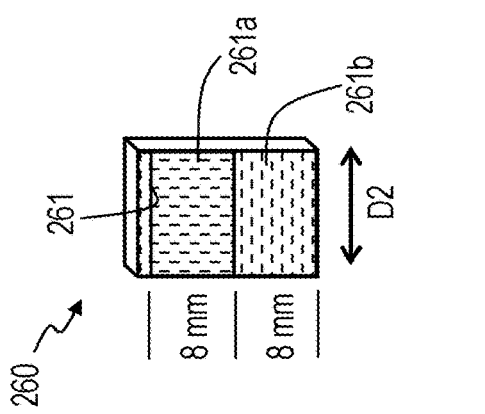
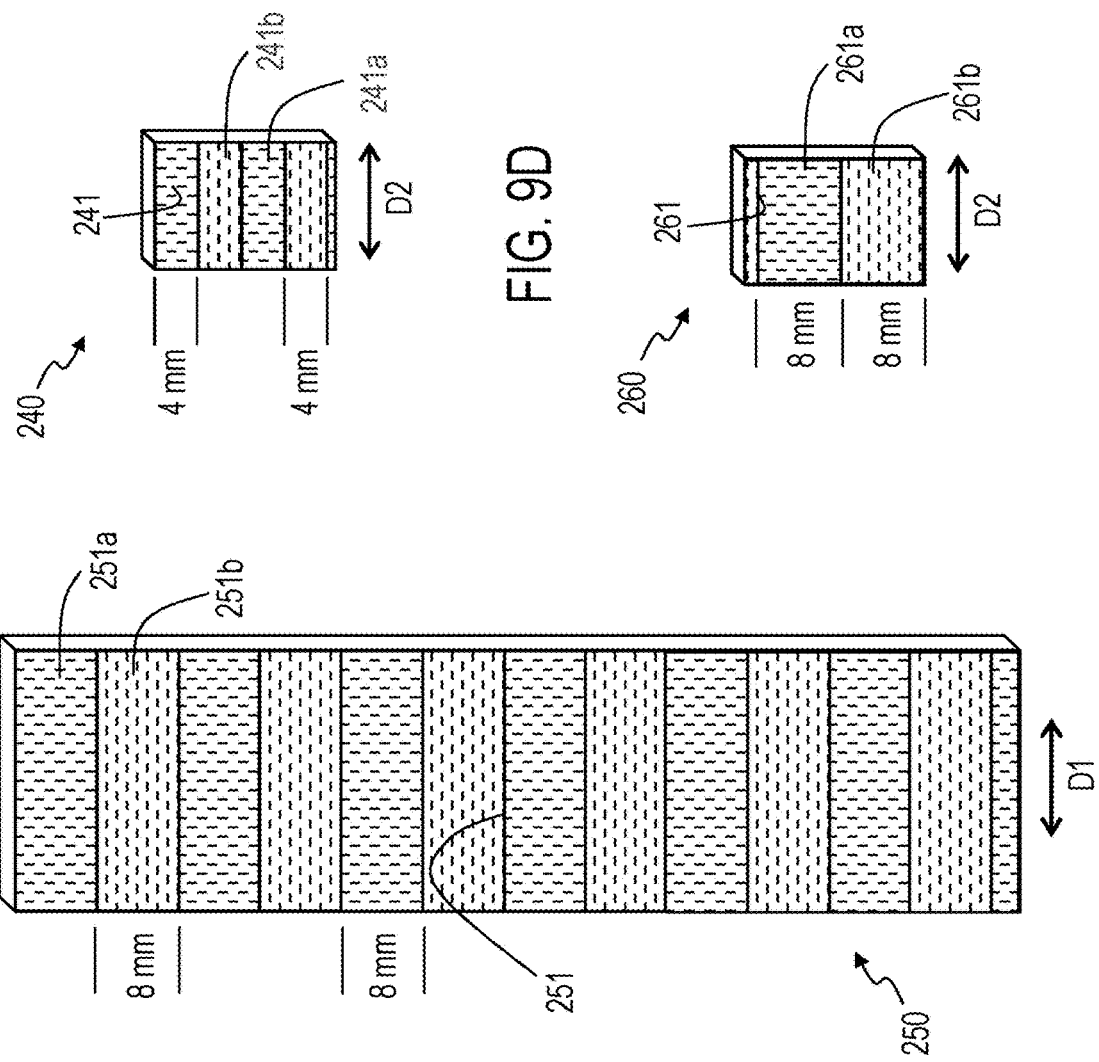
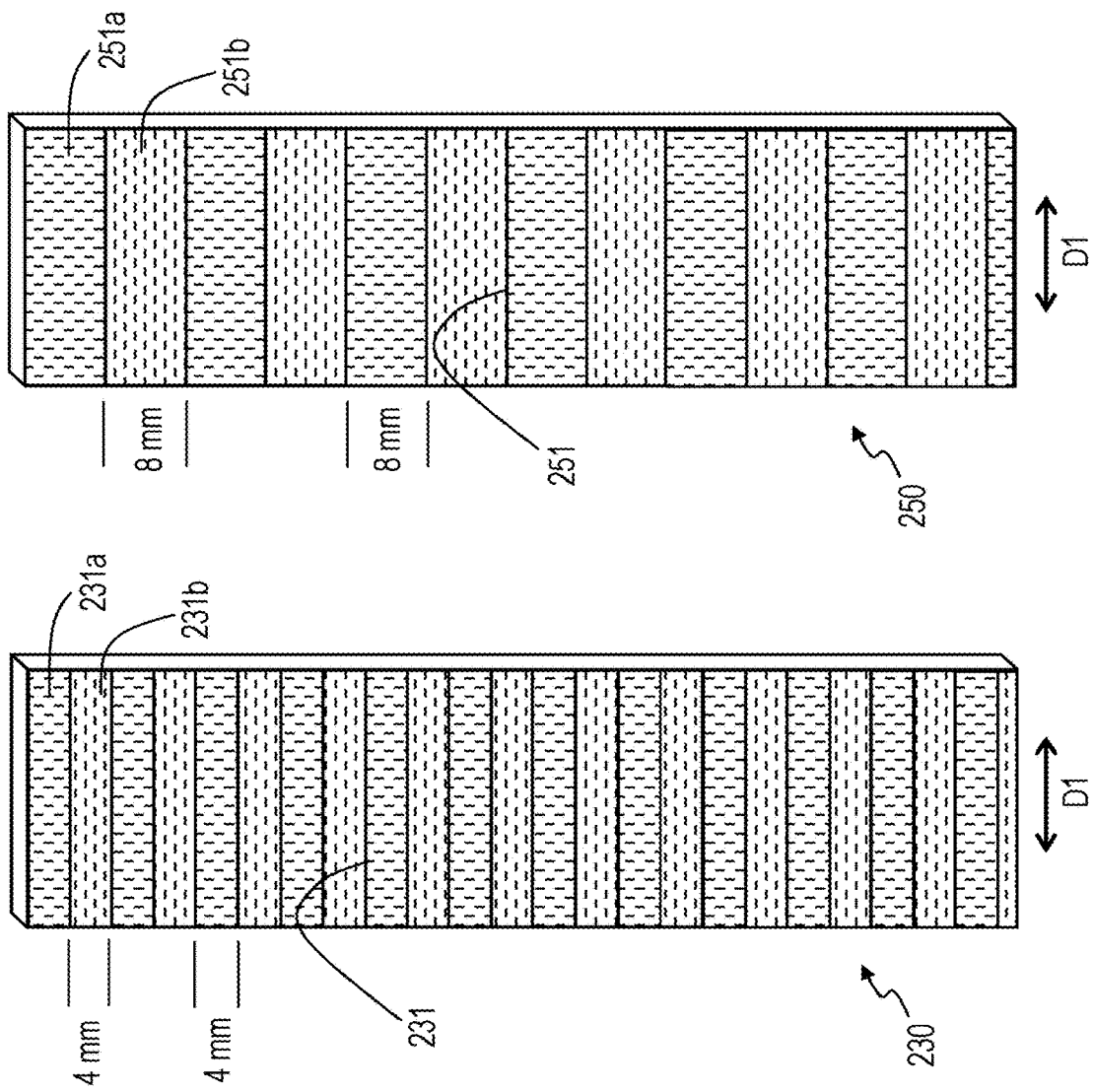

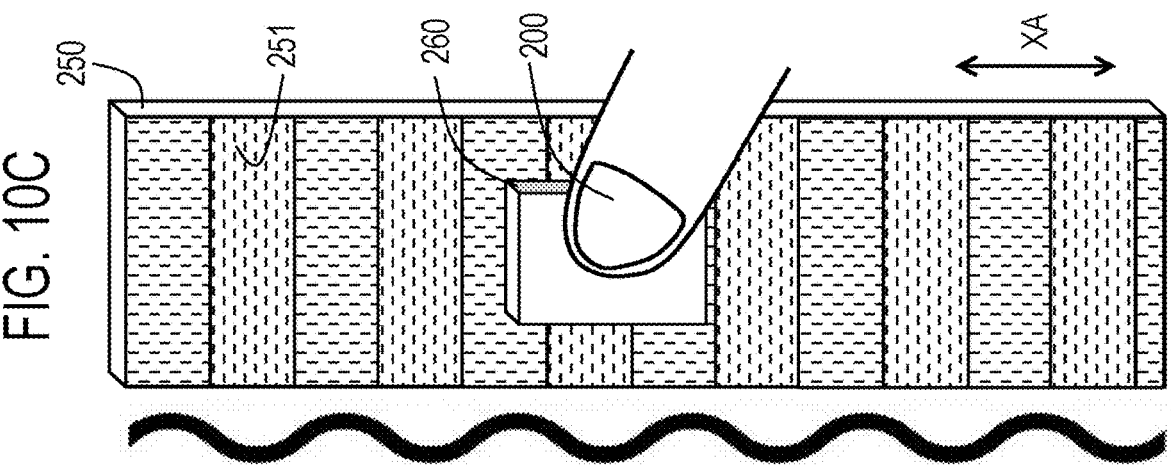
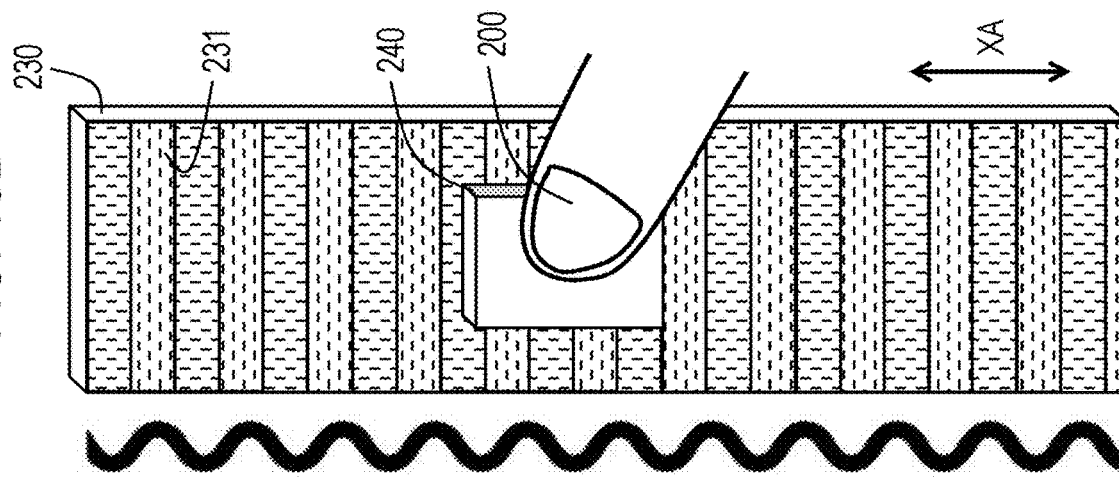
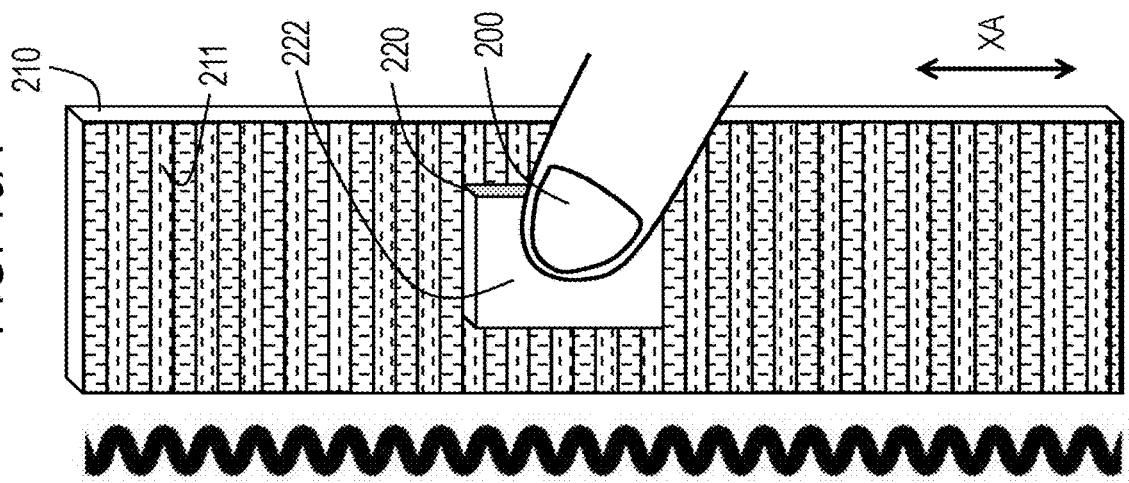

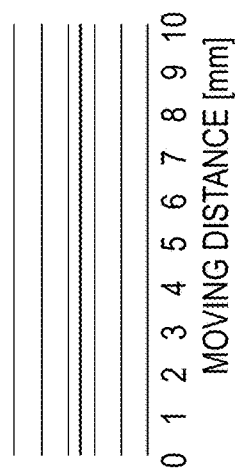
FIG. 11A
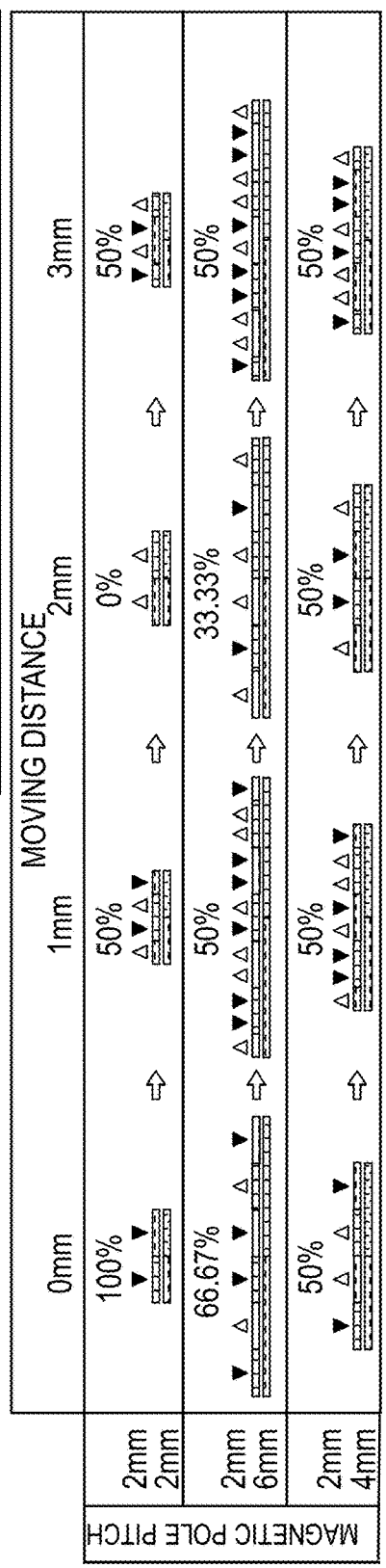
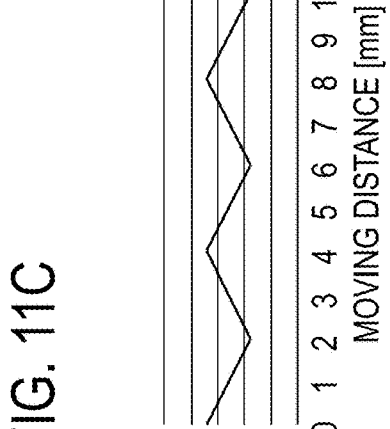
FIG. 11D
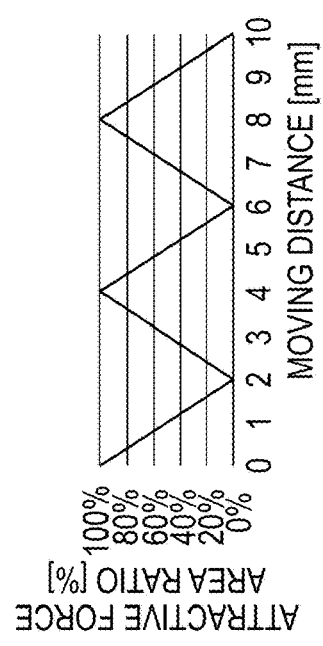
FIG. 11C
FIG. 11B

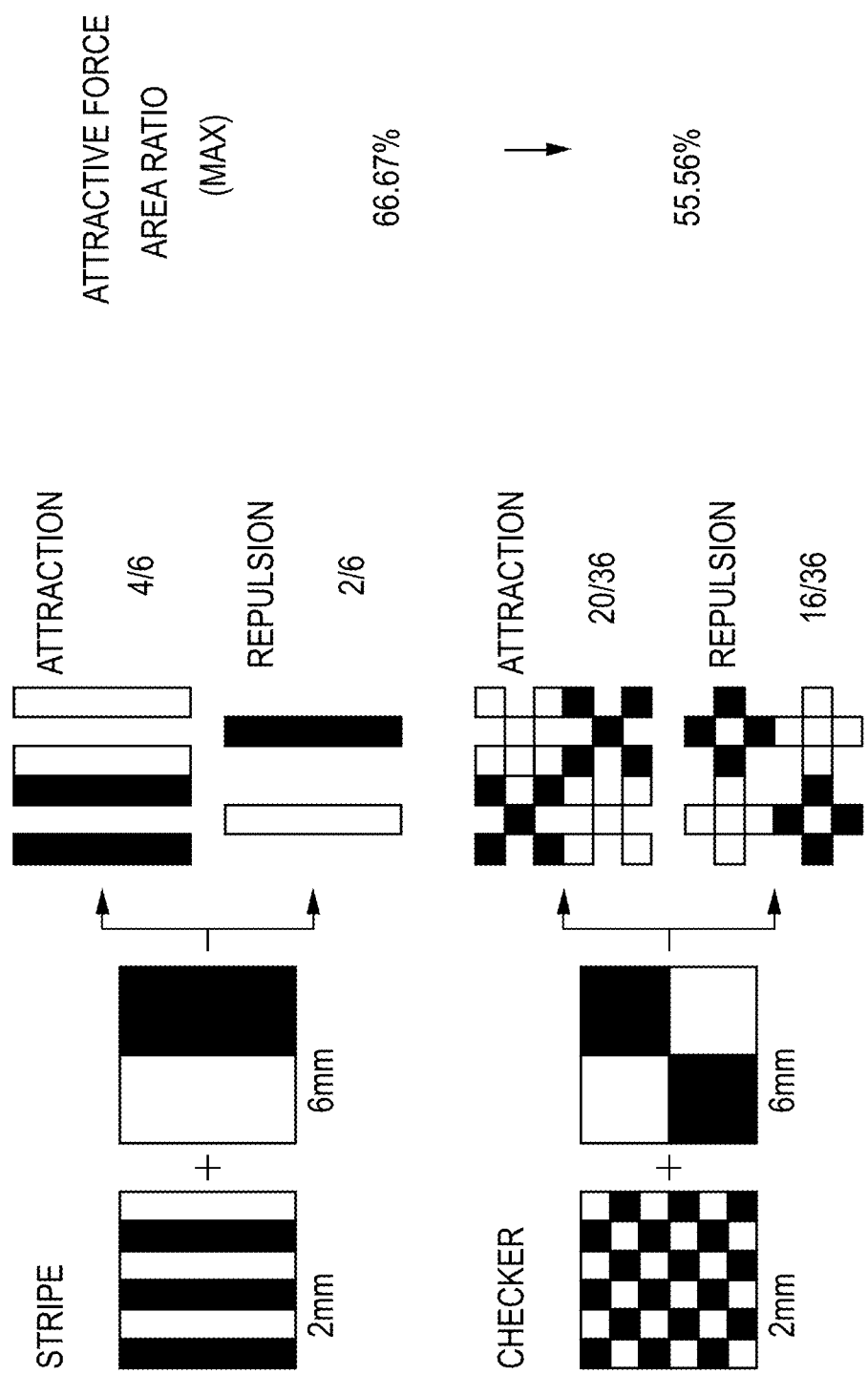

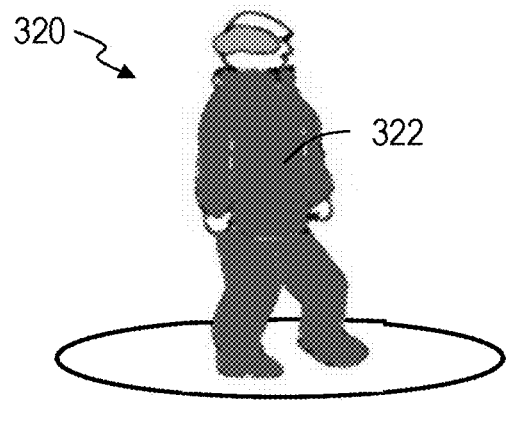
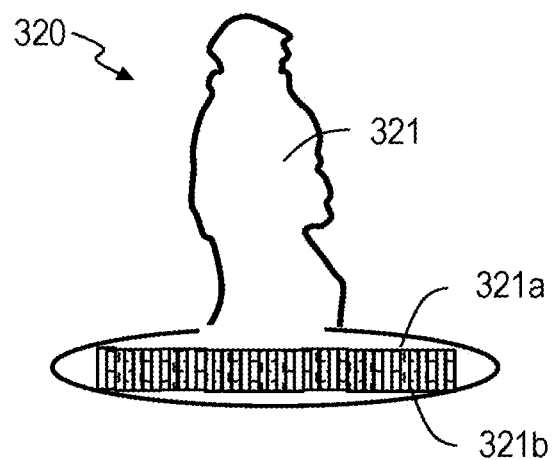
FIG. 20A
FIG. 20B
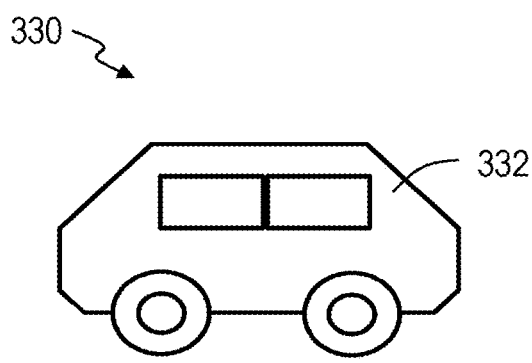
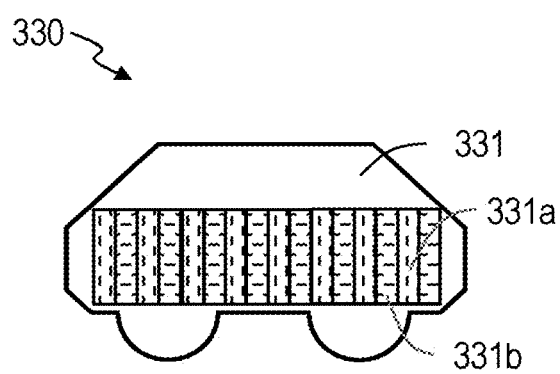
FIG. 20C
FIG. 20D

FIG. 21A
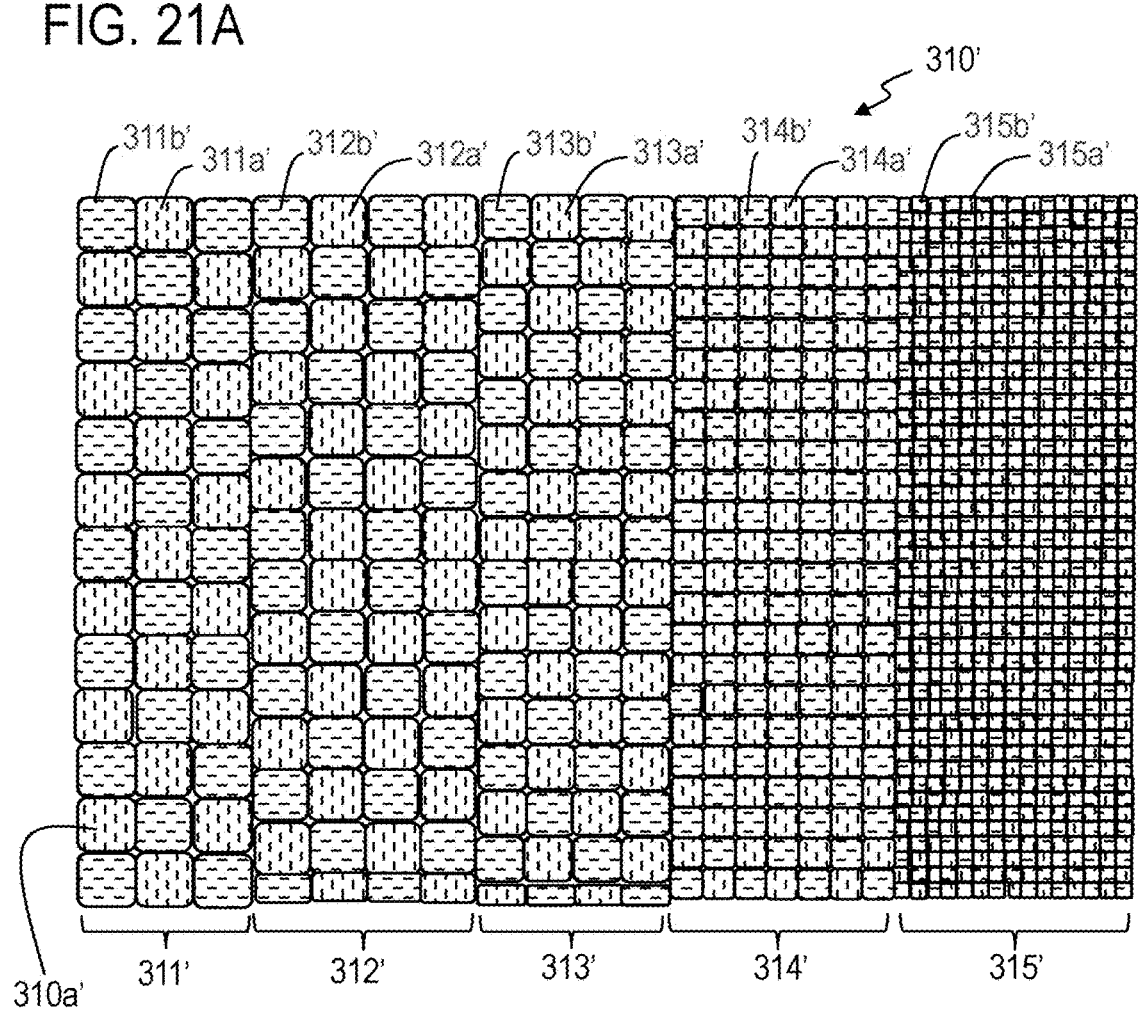
FIG. 21B
FIG. 21C
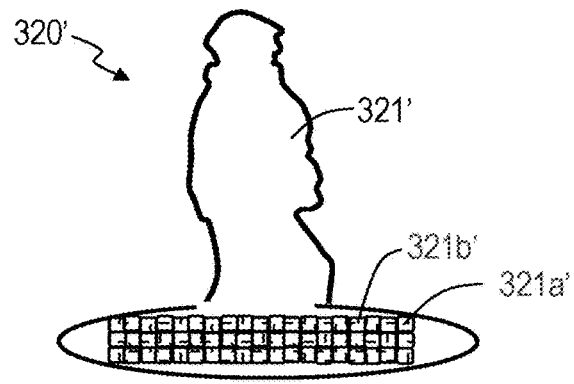
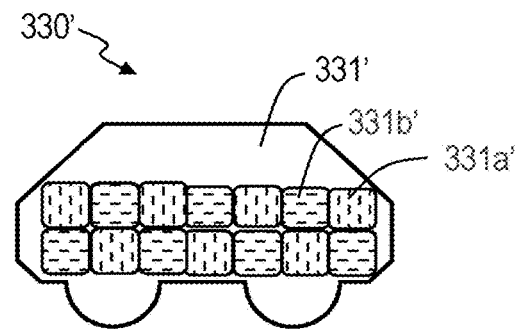

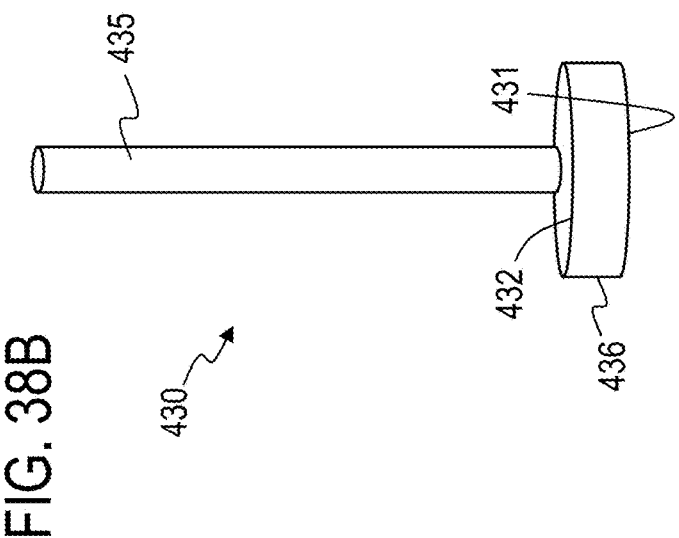
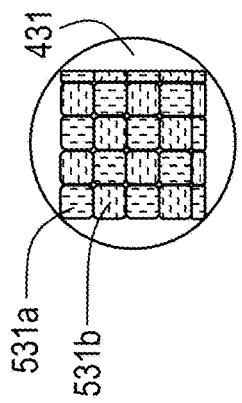
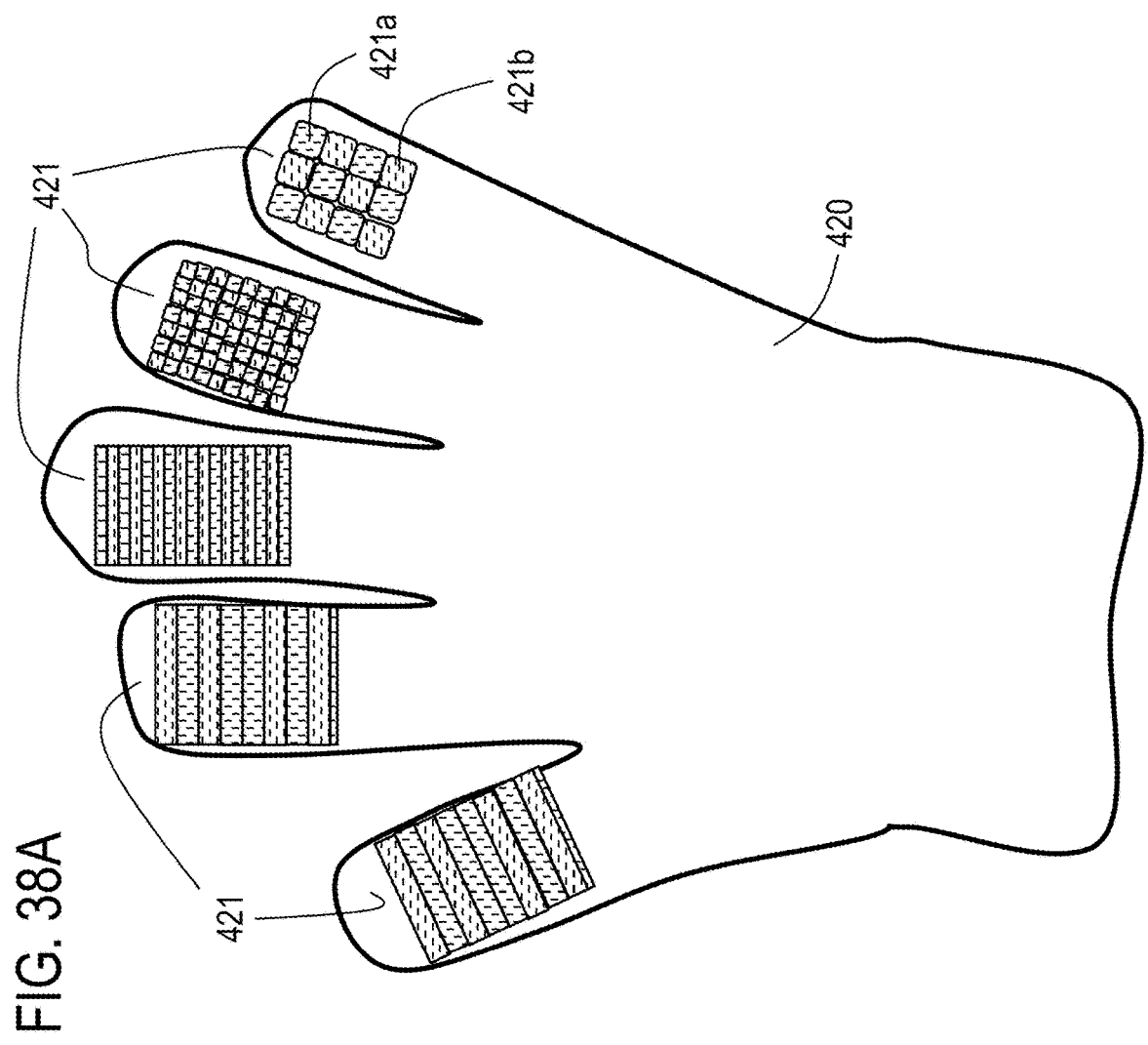

FORCE SENSE PRESENTING OBJECT AND BOOK

TECHNICAL FIELD

The present invention relates to techniques for presenting a force sense.

BACKGROUND ART

Patent Literature 1 discloses the technique for presenting a force sense of an object such as bumpy feeling which is obtained when a person touches the object with his/her fingers. Patent Literature 2 discloses the technique for feeding back a force sense to an operator of a drawing tablet.

PRIOR ART LITERATURE

Patent Literature

Patent Literature 1: Japanese Patent Application Laid Open No. 2000-89895
Patent Literature 2: Japanese Patent Application Laid Open No. 2000-207114

SUMMARY OF THE INVENTION

Problems to be Solved by the Invention

In the techniques of Patent Literature 1 and Patent Literature 2, various types of force senses are presented by magnetic force generated from electromagnets. An object of the present invention is to present force senses mutually different among respective visually-recognizable patterns by using magnetic bodies which are preliminarily magnetized.

Means to Solve the Problems

A force sense presenting object according to the present invention includes: a base object that includes a first surface, which is preliminarily magnetized with a first texture including an S-pole region and an N-pole region; a first sheet that is provided with a first pattern, which is visually recognizable, and is layered on the first surface side of the base object; a second sheet that is provided with a second pattern, which is visually recognizable and is different from the first pattern, and is layered on the first surface side of the base object; a first contact object that includes a second surface, which is preliminarily magnetized with a second texture including an S-pole region and an N-pole region; and a second contact object that includes a third surface, which is preliminarily magnetized with a third texture which includes an S-pole region and an N-pole region and is different from the second texture.

Effects of the Invention

According to the present invention, force senses mutually different among respective visually-recognizable patterns can be presented by using magnetic bodies which are preliminarily magnetized.

BRIEF DESCRIPTION OF THE DRAWINGS

FIG. 1 is a conceptual diagram illustrating a functional configuration of a magnetization device according to an embodiment.

FIG. 5 is a diagram illustrating texture information including S-pole pattern information and N-pole pattern information.

FIG. 6A and FIG. 6B are diagrams illustrating a magnetized magnetic sheet.

FIG. 9A to FIG. 9D are diagrams illustrating magnetized magnetic sheets.

FIG. 10A to FIG. 10C are diagrams illustrating an action for presenting bumpy feeling by two magnetic sheets.

FIG. 11A to FIG. 11D are diagrams illustrating an attractive force area ratio between two magnetic sheets.

FIG. 15 is a diagram illustrating a difference between an attractive force area ratio of a stripe texture and an attractive force area ratio of a checker texture.

FIG. 20A to FIG. 20D are diagrams illustrating contact objects.

FIG. 21A to FIG. 21C are diagrams illustrating contact objects.

FIG. 38A to FIG. 38C are diagrams illustrating an input device according to the embodiment.

DETAILED DESCRIPTION OF THE EMBODIMENTS

Embodiments according to the present invention are described below with reference to the accompanying drawings.

First Embodiment

In the present embodiment, a cutter component of a cutting plotter (also referred to as a "cutting machine"), which is an apparatus for making a cut corresponding to inputted texture information on an object based on the inputted texture information, is replaced with a magnetization component and this cutting plotter is driven to magnetize a magnetic sheet (the magnetic sheet is magnetized).

<Configuration>

Figure 2A:
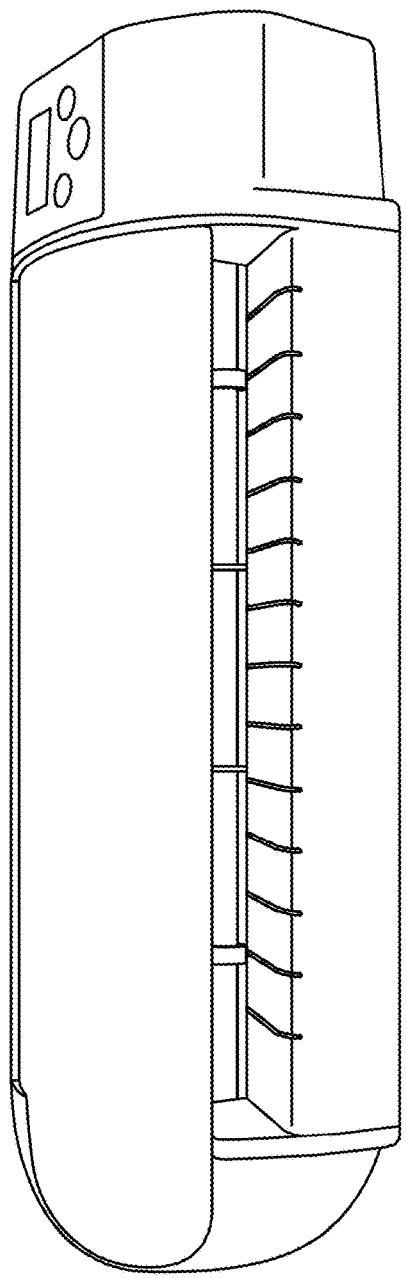
FIG. 2A and FIG. 2B are conceptual diagrams illustrating the functional configuration of the magnetization device according to the embodiment.

As illustrated in FIG. 1 to FIG. 3, a magnetization device 1 according to the present embodiment includes a magnetization component 11, a cutter component attachment unit 12, a drawing head 13, an input unit 14, a storage 15, a control unit 16, and a driving unit 17 and magnetizes a magnetic sheet 18 which is placed. This magnetization device 1 is obtained by replacing a cutter component 101 of a cutting plotter including the cutter component 101, the cutter component attachment unit 12, the drawing head 13, the input unit 14, the storage 15, the control unit 16, and the driving unit 17 with the magnetization component 11.

<<Cutter Component 101 and Magnetization Component 11>>

Figure 3A:
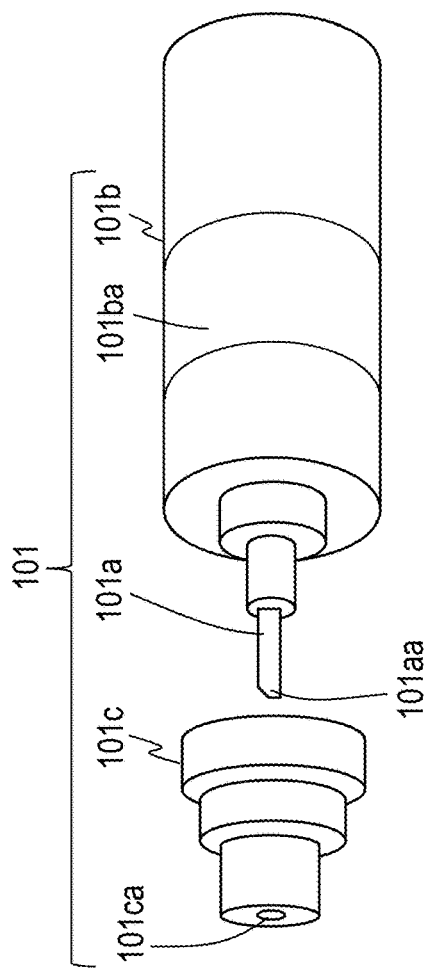
FIG. 3A is a perspective view illustrating a cutter component of a cutting plotter and FIG. 3B is an exploded perspective view of the cutter component.
Figure 3B:
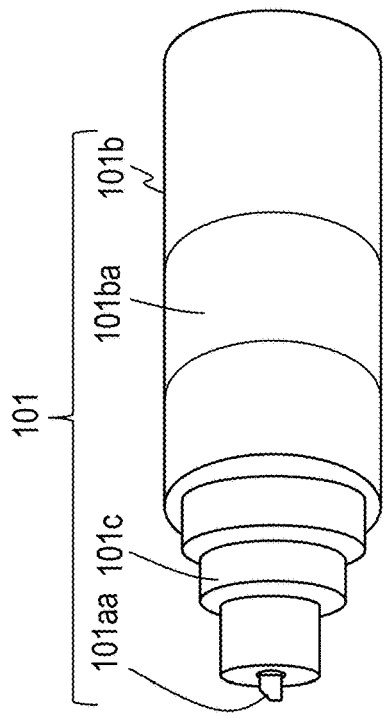

As illustrated in FIG. 3A and FIG. 3B, the cutter component 101 includes a cutter portion 101a for making a cut on an object, a fixing portion 101b which has a columnar shape and on which the cutter portion 101a is fixed, and a cap portion 101c. One end of the cutter portion 101a is a cutting edge 101aa and the other end is fixed in the fixing portion 101b. The cutter portion 101a may be attachable to and detachable from the fixing portion 101b or does not have to be attachable and detachable. A through hole 101ca is formed on an end side of the cap portion 101c. The cap portion 101c can be attached to the cutter portion 101a side of the fixing portion 101b. When the cap portion 101c is attached to the cutter portion 101a side of the fixing portion 101b, the cutting edge 101aa protrudes to the outside of the cap portion 101c through the through hole 101ca. An attachment region 101ba is provided on an outer lateral surface of the fixing portion 101b and this attachment region 101ba can be fixed on an attachment position of the above-mentioned cutting plotter.

Figure 3C:
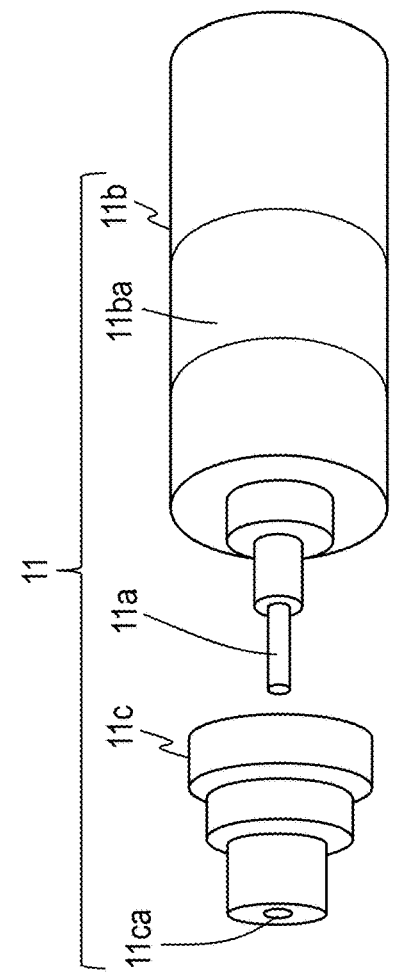
FIG. 3C is a perspective view illustrating a magnetization component and FIG. 3D is an exploded perspective view of the magnetization component.
Figure 3D:
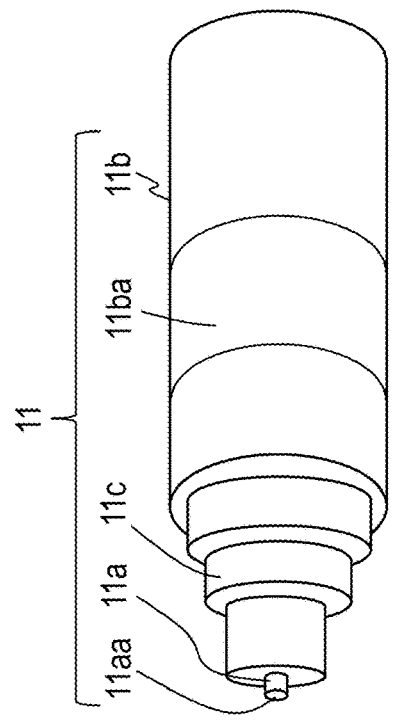
Figure 4:
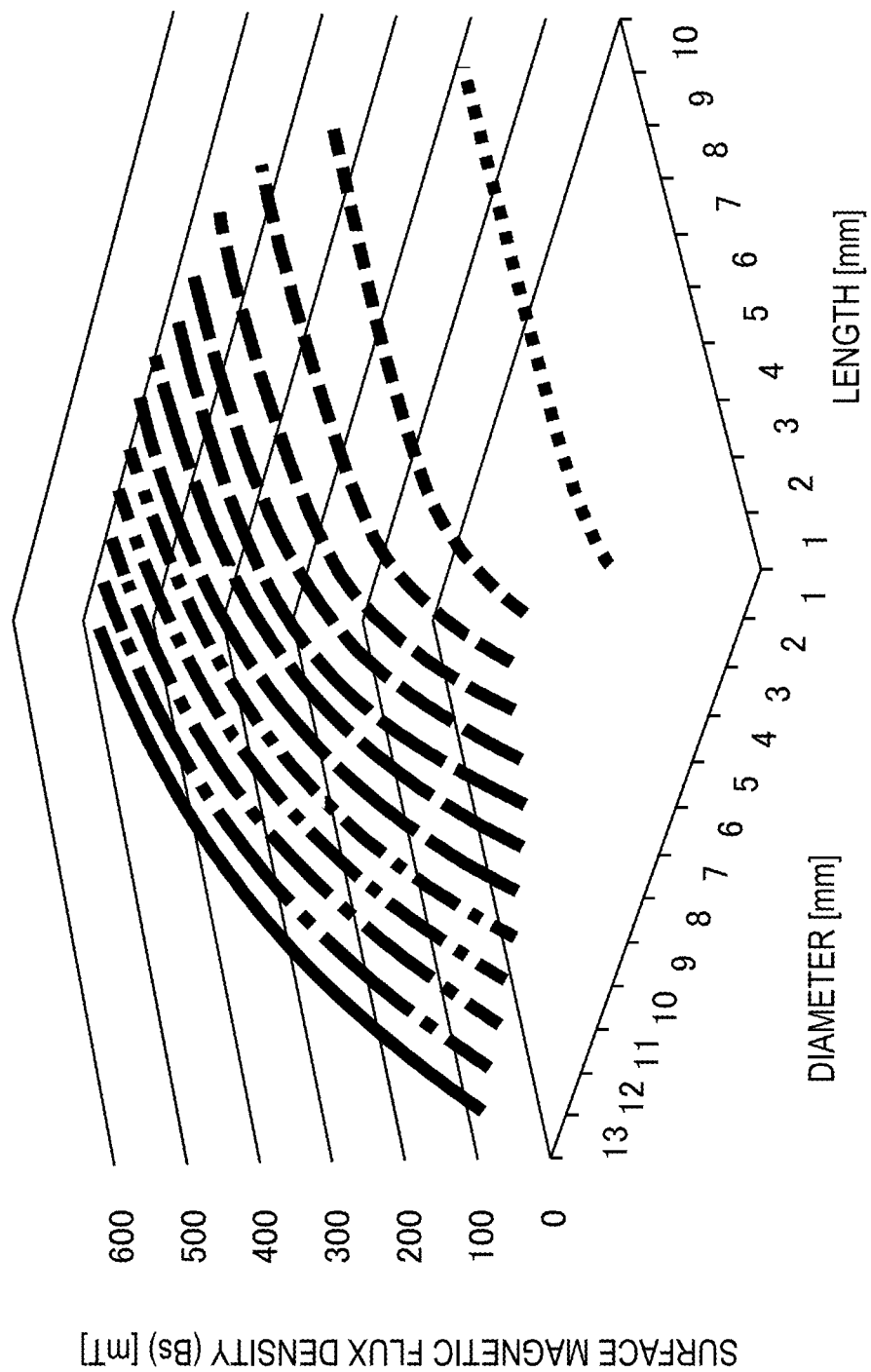
FIG. 4 is a graph illustrating a relation between a shape of a magnet and surface magnetic flux density.

As illustrated in FIG. 3C and FIG. 3D, the magnetization component 11 which replaces the cutter component 101 includes a magnet 11a which magnetizes an object and has a columnar shape (a magnet which is supported by an attachment mechanism and is configured such that the magnetic pole thereof is opposed to the object when the attachment mechanism is attached on an attachment position), a fixing portion 11b in which the magnet 11a is fixed and which has a columnar shape (an attachment mechanism which has the substantially same configuration as that of an attachment part of the cutter component with respect to an attachment position), and a cap portion 11c. The magnet 11a is a permanent magnet such as a neodymium magnet. When a neodymium magnet is used as the magnet 11a, surface magnetic flux density of an end portion 11as of the magnet 11a varies depending on a shape of the magnet 11a. FIG. 4 illustrates surface magnetic flux density (Bs) [mT] at the centers on bottom surfaces of columns of columnar neodymium magnets having different diameters [mm] and lengths [mm]. As illustrated in FIG. 4, the magnet 11a has larger surface magnetic flux density as the diameter thereof is larger. However, if the diameter is too larger, the magnetic flux density at the center is lowered and resolution of a pattern which can magnetize the magnetic sheet 18 is lowered. Surface magnetic flux density is larger as the length of the magnet 11*a* is greater when the magnets 11*a* have the same diameters as each other. The length of the magnet 11*a* is, however, limited due to the restriction as the magnetization component 11 which can replace the cutter component 101. A neodymium magnet having the diameter of 2 mm and the length of 10 mm can be used as the magnet 11*a*, for example. The end portion 11*aa* on one end of the magnet 11*a* has either magnetic pole (the S pole or the N pole) and the other end is fixed to the fixing portion 11*b*. The magnet 11*a* may be attachable to and detachable from the fixing portion 11*b* or does not have to be attachable and detachable. A through hole 11*ca* is formed on an end side of the cap portion 11*c*. The cap portion 11*c* can be attached to the magnet 11*a* side of the fixing portion 11*b*. When the cap portion 11*c* is attached to the magnet 11*a* side of the fixing portion 11*b*, the end portion 11*aa* of the magnet 11*a* protrudes to the outside of the cap portion 11*c* through the through hole 11*ca* (the magnetic pole of the magnet 11*a* is disposed on the outside of the cap portion 11*c*). An attachment region 11*ba* is provided on an outer lateral surface of the fixing portion 11*b* and this attachment region 11*ba* can be fixed on an attachment position of the above-mentioned cutting plotter.

In the present embodiment, the outer shape of the fixing portion 11*b* is substantially the same as the outer shape of the fixing portion 101*b* and the position and the shape of the attachment region 11*ba* (the configuration of the attachment mechanism) are also substantially the same as the position and the shape of the attachment region 101*ba* (the attachment part of the cutter component with respect to the attachment position). The outer shape of the cap portion 11*c* is preferably substantially the same as the outer shape of the cap portion 101*c*, but these shapes may be different from each other. A relative position of the end portion 11*aa* with respect to the attachment region 11*ba* is preferably substantially the same as a relative position of the cutting edge 101*aa* with respect to the attachment region 101*ba*. The length of the end portion 11*aa* positioned in the outside of the cap portion 11*c* when the cap portion 11*c* is attached to the fixing portion 11*b* is preferably substantially the same as the length of the cutting edge 101*aa* positioned in the outside of the cap portion 101*c* when the cap portion 101*c* is attached to the fixing portion 101*b*. The cutter component 101 in which the cutter portion 101*a* is replaced with the magnet 11*a*, for example, may be used as the magnetization component 11. In this case, the fixing portion 101*b* is equivalent to the fixing portion 11*b* and the cap portion 101*c* is equivalent to the cap portion 11*c*. In such a case, it is preferable that the shape of the cutter component 101 on the fixing portion 101*b* side is substantially the same as the shape of the magnetization component 11 on the fixing portion 11*b* side. Accordingly, the magnetization component 11 can be produced from the known cutter component 101 without specially installing a spacer and machining. Here, "α is substantially the same as β" means that α and β are the same as each other or α and β approximate each other.

<<Cutter Component Attachment Unit 12 and Drawing Head 13>>

Figure 2B:
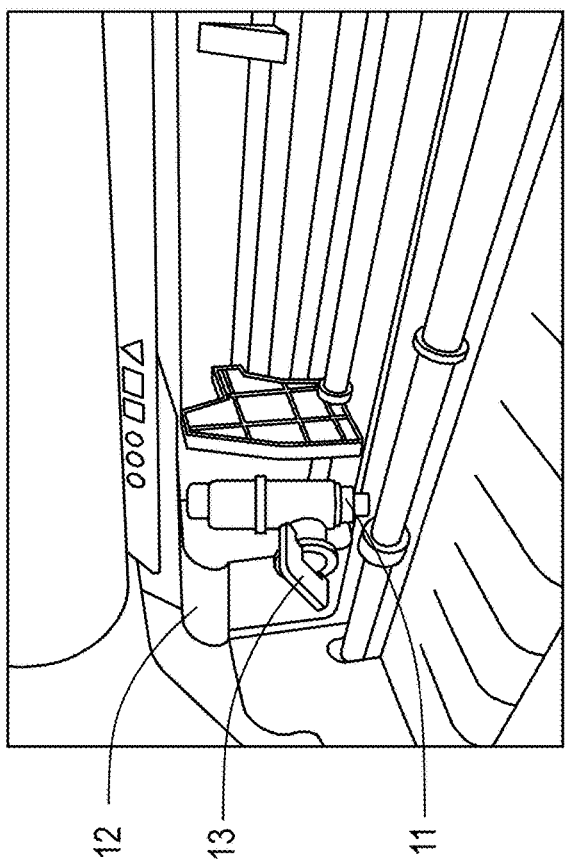

By fixing the attachment region 101*ba* of the cutter component 101 on the cutter component attachment unit 12, the cutter component 101 is attached to the drawing head 13. In the present embodiment, instead of the cutter component 101, by fixing the attachment region 11*ba* of the magnetization component 11 on the cutter component attachment unit 12 (the attachment position of the cutter component), the magnetization component 11 is attached to the drawing head 13 (FIG. 1 and FIG. 2B). The magnetization component 11 attached to the cutter component attachment unit 12 is positioned so that the end portion 11*aa* (magnetic pole) of the magnet 11*a* of the magnetization component 11 is opposed to a surface 18*a* of the magnetic sheet 18 (object) which is disposed as a magnetization object. That is, the magnetization component 11 which is a component including the magnet 11*a* whose magnetic pole (the S pole or the N pole) is opposite to that of the surface 18*a* of the magnetic sheet 18 is attached to the cutter component attachment unit 12. The end portion 11 as of the magnet 11*a* is set to the N pole when the surface 18*a* of the magnetic sheet 18 is magnetized to the S pole, while the end portion 11*aa* of the magnet 11*a* is set to the S pole when the surface 18*a* of the magnetic sheet 18 is magnetized to the N pole. The case where the surface 18*a* of the magnetic sheet 18 needs to be magnetized to the S pole and the N pole requires the magnetization component 11 including the magnet 11*a* whose end portion 11*aa* is on the N pole (for magnetization to the S pole) and the magnetization component 11 including the magnet 11*a* whose end portion 11*aa* is on the S pole (for magnetization to the N pole). If the magnet 11*a* is attachable to and detachable from the fixing portion 11*b*, the magnet 11*a* whose end portion 11*aa* is on the N pole may be attached to the fixing portion 11*b* when the surface 18*a* of the magnetic sheet 18 is magnetized to the S pole, and the magnet 11*a* whose end portion 11*aa* is on the S pole may be attached to the fixing portion 11*b* when the surface 18*a* of the magnetic sheet 18 is magnetized to the N pole. Two ends of the magnet 11*a* may have magnetic poles opposite to each other (the S pole and the N pole), and one end selected from the two ends may be set as the end portion 11*aa* and the other end may be able to be fixed on the fixing portion 11*b*. That is, the magnet 11*a* may be reversible with respect to the fixing portion 11*b* and either one end (the S pole or the N pole) of the magnet 11*a* can be selected as the end portion 11*aa*. As described later, positions of the drawing head 13 and the magnetic sheet 18 are digitally controlled and thus, the relative position of the drawing head 13 with respect to the surface 18*a* of the magnetic sheet 18 can be changed. Here, a surface different from the surface 18*a* of the magnetic sheet 18 is magnetized to the opposite magnetic pole to that of the surface 18*a*. That is, magnetization of the surface 18*a* of the magnetic sheet 18 also means magnetization of the magnetic sheet 18 itself.

<<Input Unit 14, Storage 15, Control Unit 16, and Driving Unit 17>>

The input unit 14, the storage 15, the control unit 16, and the driving unit 17 are functional components originally provided to the cutting plotter. The input unit 14 is an input interface, the storage 15 is a random-access memory (RAM), hard disk, and the like, and the driving unit 17 is a driving device composed of a motor, an actuator, and the like. The control unit 16 may be configured through execution of a predetermined program by a computer including a processor (hardware processor) such as a central processing unit (CPU), a memory such as a random-access memory (RAM) and a read-only memory (ROM), and the like, and may be configured by an integrated circuit.

<<Magnetic Sheet 18>>

The magnetic sheet 18 is a sheet mainly made of a ferromagnetic material, and is a magnetic rubber sheet mainly made of magnetic rubber, a magnetic plastic sheet mainly made of magnetic plastic, or a magnetic metal sheet mainly made of metal, for example. If a ferromagnetic material is exposed in a strong magnetic field, atoms' dipoles are aligned with a magnetic field and the alignment remains even after the magnetic field is removed. A ferromagnetic material which is once magnetized maintains the direction of the magnetic pole thereof until a sufficiently-strong opposite magnetic field, strong impact, or sufficient heat is applied to the ferromagnetic material. Utilizing this property in the present embodiment, the magnetic sheet 18 is magnetized by the magnet 11a of the magnetization component 11 in a rewritable manner.

<Operation>

A magnetization method according to the present embodiment is described. Texture information representing a pattern for magnetizing the surface 18a of the magnetic sheet 18 (magnetization pattern) is inputted into the input unit 14 of the magnetization device 1 (FIG. 1). The texture information is two dimensional data representing which coordinate of the surface 18a of the magnetic sheet 18 is to be magnetized. When the magnetization pattern is for magnetizing the surface 18a of the magnetic sheet 18 to either one magnetic pole (the S pole or the N pole) (when the magnetization pattern corresponds to only one magnetic pole), texture information includes pattern information representing a pattern for magnetization to the corresponding magnetic pole. On the other hand, when the magnetization pattern is for magnetizing the surface 18a of the magnetic sheet 18 to both magnetic poles (the S pole and the N pole) (when the magnetization pattern corresponds to both magnetic poles), texture information includes pattern information representing a pattern for magnetization to one magnetic pole (the S pole, for example) (first pattern information representing a pattern corresponding to one magnetic pole) and pattern information representing a pattern for magnetization to the other magnetic pole (the N pole, for example) (second pattern information representing a pattern corresponding to the other magnetic pole). FIG. 5 illustrates a magnetization pattern 110 for magnetizing the surface 18a of the magnetic sheet 18 to both magnetic poles. As illustrated in FIG. 5, the magnetization pattern 110 includes a pattern 111 for magnetization to the S pole and a pattern 112 for magnetization to the N pole. Texture information in this case includes information representing the pattern 111 and information representing the pattern 112. The texture information may be image data in a vector format which is produced by drawing software or may be image data in a raster format (bitmap image data) to which such image data is converted. The inputted texture information is stored in the storage 15. Further, the magnetic sheet 18 is placed on the magnetization device 1. Accordingly, the end portion 11aa (magnetic pole) of the magnet 11a in the magnetization component 11 attached to the cutter component attachment unit 12 is opposed to the surface 18a of the magnetic sheet 18.

When the magnetization device 1 which is a cutting plotter is operated, the control unit 16 reads the texture information from the storage 15 and changes a relative position of the drawing head 13 with respect to the surface 18a of the magnetic sheet 18 by controlling the driving unit 17 so as to magnetize the surface 18a of the magnetic sheet 18 to a pattern corresponding to the texture information by the magnetic force of the end portion 11 as of the magnet 11a (magnetization corresponding to the texture information is performed with respect to the surface 18a of the magnetic sheet 18). That is, the driving unit 17 moves the drawing head 13 along at least either one of the X axis and the Z axis, being able to change a relative position of the end portion 11 as of the magnet 11a with respect to the surface 18a of the magnetic sheet 18. The driving unit 17 further moves the magnetic sheet 18 along the Y axis, being able to change the relative position of the end portion 11 as of the magnet 11a with respect to the surface 18a of the magnetic sheet 18.

Here, the X axis, the Y axis, and the Z axis are coordinate axes which are orthogonal to each other. The X-Y plane passing the X axis and the Y axis is substantially parallel (parallel, for example) to the surface 18a of the magnetic sheet 18 and the Z axis is substantially orthogonal (orthogonal, for example) to the surface 18a of the magnetic sheet 18. If the relative position of the drawing head 13 with respect to the magnetic sheet 18 is changed along the X coordinate and/or the Y axis, an (X,Y) coordinate of the end portion 11 as of the magnet 11a on the surface 18a of the magnetic sheet 18 can be changed and the magnetization position in the surface 18a of the magnetic sheet 18 can be changed. If the relative position of the drawing head 13 with respect to the magnetic sheet 18 is changed along the Z coordinate, a distance between the surface 18a of the magnetic sheet 18 and the end portion 11aa of the magnet 11a can be changed. The surface 18a of the magnetic sheet 18 is magnetized when the surface 18a of the magnetic sheet 18 and the end portion 11 as of the magnet 11a are brought in contact with or close to each other. Thus, existence of magnetization can be controlled by changing the distance between the surface 18a of the magnetic sheet 18 and the end portion 11aa of the magnet 11a. The driving unit 17 changes the relative position between the drawing head 13 and the magnetic sheet 18 along the X axis, the Y axis, and the Z axis based on the texture information so as to magnetize the surface 18a side of the magnetic sheet 18 in the magnetization pattern represented by the texture information. Here, when the magnetization pattern is for magnetizing the surface 18a of the magnetic sheet 18 to both magnetic poles (the S pole and the N pole), the driving unit 17 magnetizes the surface 18a side of the magnetic sheet 18 in a pattern corresponding to each magnetic pole. When magnetization is performed based on a pattern for magnetization to the S pole, the driving unit 17 changes the relative position between the drawing head 13 and the magnetic sheet 18 along the X axis, the Y axis, and the Z axis in accordance with the S-pole pattern so as to magnetize the surface 18a of the magnetic sheet 18 with the S-pole pattern (the pattern 111 in FIG. 5, for example) by using the magnetization component 11 which includes the magnet 11a having the end portion 11 as of the N pole. When magnetization is performed based on a pattern for magnetization to the N pole, the driving unit 17 changes the relative position between the drawing head 13 and the magnetic sheet 18 along the X axis, the Y axis, and the Z axis in accordance with the N-pole pattern so as to magnetize the surface 18a of the magnetic sheet 18 with the N-pole pattern (the pattern 112 in FIG. 5, for example) by using the magnetization component 11 which includes the magnet 11a having the end portion 11aa of the S pole. That is, when the N pole (the other magnetic pole) of the magnet 11a included in the magnetization component 11 is opposed to the surface 18a of the magnetic sheet 18, the surface 18a of the magnetic sheet 18 is magnetized with the S-pole pattern (the pattern 111 in FIG. 5, for example) (magnetization corresponding to first pattern information). On the other hand, when the S pole (one magnetic pole) of the magnet 11a included in the magnetization component 11 is opposed to the surface 18a of the magnetic sheet 18, the surface 18a of the magnetic sheet 18 is magnetized with the N-pole pattern (the pattern 112 in FIG. 5, for example) (magnetization corresponding to second pattern information). The method for switching the magnetic poles of the end portion 11aa is as described above.

The following two types of magnetization methods can be assumed.

Sliding method: A method in which an (X,Y) coordinate of the drawing head 13 on the magnetic sheet 18 is changed while keeping the magnetic pole of the end portion 11 as of the magnet 11*a* in contact with or close to the surface 18*a* of the magnetic sheet 18.

Plotting method: A method in which an (X,Y) coordinate of the drawing head 13 on the magnetic sheet 18 is changed while keeping the magnetic pole of the end portion 11*aa* of the magnet 11*a* separate from the surface 18*a* of the magnetic sheet 18 and the magnetic pole of the end portion 11*aa* of the magnet 11*a* is brought into contact with or close to the surface 18*a* of the magnetic sheet 18 on a coordinate on which magnetization is to be performed.

Though high speed magnetization can be realized in the sliding method, directions of atoms' dipoles on a magnetized part may not be able to be orthogonally aligned to the surface 18*a* and surface magnetic flux density may be accordingly lowered. On the other hand, directions of atoms' dipoles on a magnetized part can be orthogonally aligned to the surface 18*a* in the plotting method, but the magnetization requires much time. Comparison results in the number of steps, processing time, and surface magnetic flux density obtained when magnetization with the same patterns are performed by the plotting method, in which magnetization is performed at 2 mm interval and 1 mm interval, and the sliding method are illustrated.

TABLE 1

| Magnetization method | Number of steps | Processing time [s] | Bs [mT] |
|---|---|---|---|
| Plotting method (2 mm interval) | 176 | 57.0 | Max: 28.6, Min: 6.7 |
| Plotting method (1 mm interval) | 352 | 96.4 | Max: 24.1, Min: 18.7 |
| Sliding method | 11 | 8.3 | Max: 25.5, Min: 22.3 |

This result shows that there is not large difference among the maximum values of the surface magnetic flux density in the plotting method and the sliding method. Further, it is understood that the number of steps and the processing time in the slide method are particularly smaller than those in the plotting method. Further, when magnetization is performed at 2 mm interval with the plotting method, the minimum value of the surface magnetic flux density is largely lowered. This is because an interval between magnetization points has been increased and the surface magnetic flux density has become uneven. The above shows that it is more preferable to perform magnetization by using the sliding method than the plotting method.

Characteristics of Present Embodiment

Magnetization can be performed with an arbitrary magnetic pattern without using a dedicated device for magnetization in the present embodiment.

Modification of First Embodiment

The magnetic poles of the end portion 11 as of the magnet 11*a* are manually switched when the surface 18*a* of the magnetic sheet 18 is magnetized to both magnetic poles (the S pole and the N pole), in the first embodiment. However, the magnetic poles of the end portion 11*aa* of the magnet 11*a* may be automatically switched. That is, the N pole (the other magnetic pole) of the magnet 11*a* included in the magnetization component 11 may be automatically made opposed to the surface 18*a* of the magnetic sheet 18 when the surface 18*a* of the magnetic sheet 18 is magnetized with the S-pole pattern (magnetization corresponding to the first pattern information), and the S pole (one magnetic pole) of the magnet 11*a* included in the magnetization component 11 may be automatically made opposed to the surface 18*a* of the magnetic sheet 18 when the surface 18*a* of the magnetic sheet 18 is magnetized with the N-pole pattern (magnetization corresponding to the second pattern information). Namely, polarity of the magnetic pole opposed to the surface 18*a* of the magnetic sheet 18 (object) may be able to be switched when the fixing portion 11*b* (attachment mechanism) is attached to the cutter component attachment unit 12 (attachment position). For example, the magnetic poles of the end portion 11 as in the magnet 11*a* may be automatically switched by physically reversing the magnet 11*a* of the magnetization component 11. Alternatively, an electromagnet may be used as the magnet 11*a* and the magnetic poles of the end portion 11 as in the magnet 11*a* may be automatically switched by switching a direction of current supplied to the electromagnet.

Second Embodiment

In a second embodiment, perception of bumpiness (also referred to as "unevenness") is provided by using two objects which are magnetized with patterns having the S pole and the N pole. A force sense presenting object according to the present embodiment has a "first object" and a "second object". The "first object" includes a "first surface" and the "first surface" is magnetized with a "first texture" including an S-pole region and an N-pole region. The "second object" includes a "second surface" and the "second surface" is magnetized with a "second texture" including an S-pole region and an N-pole region. Here, an "acting subject" that is a human being or an animal other than a human being touches at least either one of the "first object" and the "second object" and performs an operation for changing a relative positional relation between the "first surface" and the "second surface" and/or an action for changing the relative positional relation between the "first surface" and the "second surface" while keeping the "first surface" and the "second surface" in contact with or close to each other. Accordingly, the "acting subject" perceives bumpiness. That is, the "acting subject" touches at least either one of the "first object" and the "second object" and performs the operation for changing the relative positional relation between the "first surface" and the "second surface" or/and the action for changing the relative positional relation between the "first surface" and the "second surface" while keeping the "first surface" and the "second surface" in contact with or close to each other. Accordingly, shearing stress received by the "acting subject" from at least one of the "first object" and the "second object" periodically changes. Change in shearing stress is change in a linear direction included in a plane along the "first surface" and the "second surface", and the "acting subject" perceives (has an illusion) this change as bumpiness substantially orthogonal to the "first surface" and the "second surface". In the "first texture" and the "second texture", regions magnetized to the S pole and regions magnetized to the N pole are periodically arranged in an alternate manner, for example. The "first texture" and the "second texture" may be textures in which belt-like regions magnetized to the S pole and belt-like regions magnetized to the N pole are periodically arranged in an alternate manner or may include periodical nearly-checkered regions magnetized to the S pole and periodical nearly-checkered regions magnetized to the N pole, for example. A pattern of the "first texture" and a pattern of the "second texture" may be the same as each other or different from each other. The way of change in shearing stress received by the "acting subject" from at least one of the "first object" and the "second object" varies and bumpy feeling perceived by the "acting subject" also varies depending on a combination between a pattern of the "first texture" and a pattern of the "second texture". The way of change in shearing stress received by the "acting subject" from at least one of the "first object" and the "second object" may vary depending on a direction in which the relative positional relation between the "first surface" and the "second surface" is changed. In this case, bumpy feeling perceived by the "acting subject" varies as well depending on the direction in which the relative positional relation between the "first surface" and the "second surface" is changed. For example, the "first texture" and the "second texture" may be textures on which tape-like regions magnetized to the S pole and tape-like regions magnetized to the N pole are periodically arranged in an alternate manner. The operation for changing the relative positional relation between the "first surface" and the "second surface" or/and the action for changing the relative positional relation between the "first surface" and the "second surface" may be performed while keeping the "first surface" and the "second surface" in contact with or close to each other so that the longitudinal direction of the tape-like regions of the "first texture" follows the longitudinal direction of the tape-like regions of the "second texture". In this case, the way of change in shearing stress received by the "acting subject" from at least one of the "first object" and the "second object" varies and bumpy feeling perceived by the "acting subject" also varies depending on whether the relative positional relation between the "first surface" and the "second surface" is changed in the longitudinal direction of the tape-like regions or the short side direction of the same. Any of the following (1) to (3) or a combination of a part or all of these is the example of the operation for changing the relative positional relation between the "first surface" and the "second surface" or/and the action for changing the relative positional relation between the "first surface" and the "second surface".

(1) An action for changing the relative positional relation between the "first surface" and the "second surface" by directly moving at least one of the "first object" and the "second object" by the "acting subject".

(2) An action for changing the relative positional relation between the "first surface" and the "second surface" by moving a thing interposed between at least one of the "first object" and the "second object" and the "acting subject" by the "acting subject" so as to indirectly move at least one of the "first object" and the "second object".

(3) An operation for changing the relative positional relation between the "first surface" and the "second surface" by driving a device which automatically moves at least one of the "first object" and the "second object" by the "acting subject".

Further, "changing the relative positional relation between the first surface and the second surface" means sliding the "second surface" with respect to the "first surface" and sliding the "first surface" with respect to the "second surface", for example.

Specific examples of the present embodiment are described below with reference to the accompanying drawings.

A magnetic sheet 210 in FIG. 6A is a specific example of the "first object" and a magnetic sheet 220 in FIG. 6B is a specific example of the "second object". One surface (plate surface) 211 (first surface) of the magnetic sheet 210 is magnetized with a texture (first texture) including S-pole regions 211a and N-pole regions 211b. The regions 211a which have a belt-like (tape-like) shape and are magnetized to the S pole and the regions 211b which have a belt-like (tape-like) shape and are magnetized to the N pole are periodically arranged on the surface 211 in an alternate manner. In a similar manner, one surface (plate surface) 221 (the second surface) of the magnetic sheet 220 is magnetized with a texture (second texture) including S-pole regions 221a and N-pole regions 221b. The regions 221a which have a belt-like (tape-like) shape and are magnetized to the S pole and the regions 221b which have a belt-like (tape-like) shape and are magnetized to the N pole are periodically arranged on the surface 221 in an alternate manner. In this example, each of the width (pitch) in the short side direction of the region 211a, the width (pitch) in the short side direction of the region 211b, the width (pitch) in the short side direction of the region 221a, and the width (pitch) in the short side direction of the region 221b is 2 mm. Further, FIG. 6A and FIG. 6B express difference in magnetic poles of the region 211a, the region 211b, the region 221a, and the region 221b by difference of drawing patterns. The region 211a, the region 211b, the region 221a, and the region 221b are not separately painted in a visually recognizable manner. That is, these textures are magnetization patterns but are not a visually separately painted patterns (the same is applied to the below). The magnetic sheets 210 and 220 are magnetized by the method described in the first embodiment, for example. However, the magnetic sheets 210 and 220 may be magnetized by a method other than the above method (the same is applied to the below).

Figure 7:
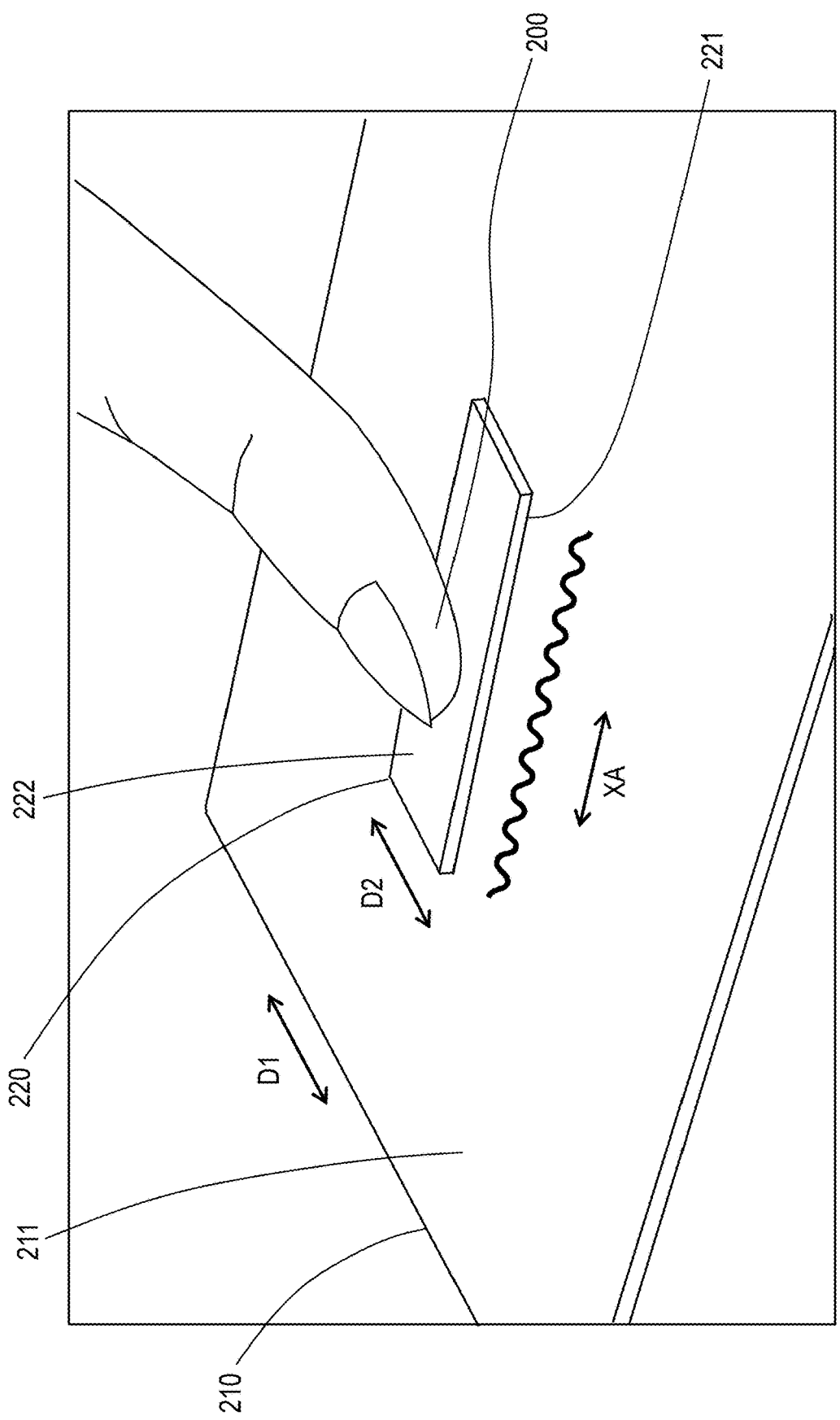
FIG. 7 is a diagram illustrating an action for presenting bumpy feeling by two magnetic sheets.
Figure 8:
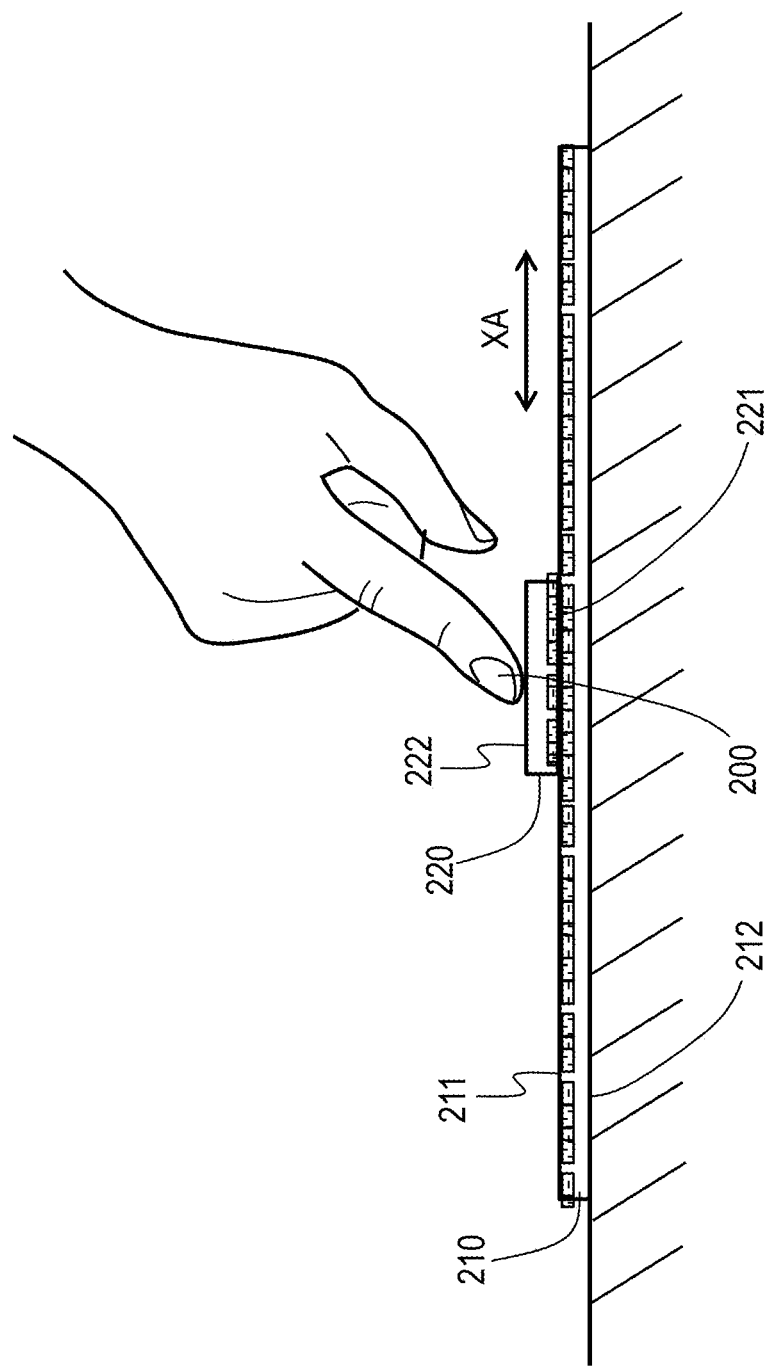
FIG. 8 is a diagram illustrating an action for presenting bumpy feeling by two magnetic sheets.

As illustrated in FIG. 7, FIG. 8, and FIG. 10A, a user (acting subject) places the magnetic sheet 210 so that the surface 211 faces outside and places the magnetic sheet 220 so that the surface 221 is in contact with the surface 211. Here, the magnetic sheet 220 is layered on the magnetic sheet 210 in a direction in which the longitudinal direction D1 of the regions 211a and 211b of the magnetic sheet 210 follows the longitudinal direction D2 of the regions 221a and 221b of the magnetic sheet 220. For example, the magnetic sheet 220 is layered on the magnetic sheet 210 so that the longitudinal direction D1 is along the longitudinal direction D2 (in other words, so that the longitudinal direction D1 and the longitudinal direction D2 are substantially parallel to each other). The user touches the other surface 222 of the magnetic sheet 220, which is layered on the magnetic sheet 210, with the finger 200 and performs an operation for changing a relative positional relation between the surface 211 and the surface 221 while keeping the surface 211 and the surface 221 in contact with or close to (nearly in contact with) each other. In the example of FIG. 7 and FIG. 8, the relative positional relation between the surface 211 and the surface 221 is changed in the XA direction which is the short side direction of the regions 211a and 211b of the magnetic sheet 210. Accordingly, shearing stress in the XA direction received by the user from the magnetic sheet 220 periodically changes. As a result, the user perceives bumpy feeling in a direction substantially orthogonal to the surface 221. Here, when the relative positional relation between the surface 211 and the surface 221 is changed in the longitudinal direction of the regions 211a and 211b of the magnetic sheet 210, shearing stress received by the user does not change and the user does not perceive bumpy feeling. The way of change in shearing stress received by the user from the magnetic sheet 220 varies and bumpy feeling perceived by the user also varies depending on a direction in which the relative positional relation between the surface 211 and the surface 221 is changed.

FIG. 9A and FIG. 9B respectively illustrate magnetic sheets 230 and 250 whose pitches are different from the pitch of the magnetic sheet 210 and FIG. 9C and FIG. 9D respectively illustrate magnetic sheets 240 and 260 whose pitches are different from the pitch of the magnetic sheet 220. The magnetic sheets 230 and 250 are specific examples of the "first object" and the magnetic sheets 240 and 260 are specific examples of the "second object". Belt-like regions 231a magnetized to the S pole and belt-like regions 231b magnetized to the N pole are periodically arranged in an alternate manner on one surface 231 (first surface) of the magnetic sheet 230. Similarly, belt-like regions 241a magnetized to the S pole and belt-like regions 241b magnetized to the N pole are periodically arranged in an alternate manner on one surface 241 (second surface) of the magnetic sheet 240. Belt-like regions 251a magnetized to the S pole and belt-like regions 251b magnetized to the N pole are periodically arranged in an alternate manner on one surface 251 (first surface) of the magnetic sheet 250. In a similar manner, belt-like regions 261a magnetized to the S pole and belt-like regions 261b magnetized to the N pole are periodically arranged in an alternate manner on one surface 261 (second surface) of the magnetic sheet 260. Here, each of the width in the short side direction of the region 231a, the width in the short side direction of the region 231b, the width in the short side direction of the region 241a, and the width in the short side direction of the region 241b is 4 mm. Each of the width in the short side direction of the region 251a, the width in the short side direction of the region 251b, the width in the short side direction of the regions 261a, and the width in the short side direction of the region 261b is 6 mm.

When the magnetic sheet 230 is used as the "first object" and the magnetic sheet 240 is used as the "second object", a user performs an operation for changing a relative positional relation between the surface 231 and the surface 241 or/and an action for changing the relative positional relation between the surface 231 and the surface 241 while keeping the surface 231 and the surface 241 in contact with or close to each other and accordingly perceives bumpy feeling (FIG. 10B), similarly to the case where the magnetic sheets 210 and 220 are used by replacing the magnetic sheets 210 and 220, the surfaces 211 and 221, and the regions 211a, 211b, 221a, and 221b with the magnetic sheets 230 and 240, the surfaces 231 and 241, and the regions 231a, 231b, 241a, and 241b respectively. In a similar manner, when the magnetic sheet 250 is used as the "first object" and the magnetic sheet 260 is used as the "second object", a user performs an operation for changing a relative positional relation between the surface 251 and the surface 261 or/and an action for changing the relative positional relation between the surface 251 and the surface 261 while keeping the surface 251 and the surface 261 in contact with or close to each other and accordingly perceives bumpy feeling (FIG. 10C), similarly to the case where the magnetic sheets 210 and 220 are used by replacing the magnetic sheets 210 and 220, the surfaces 211 and 221, and the regions 211a, 211b, 221a, and 221b with the magnetic sheets 250 and 260, the surfaces 251 and 261, and the regions 251a, 251b, 261a, and 261b respectively.

Also, any of the magnetic sheets 210, 230, and 250 may be used as the "first object", any of the magnetic sheets 220, 240, and 260 may be used as the "second object", and the pitch of the "first object" and the pitch of the "second object" may be different from each other.

Pitches of magnetic sheets used as the "first object" and the "second object" affect shearing stress, that is, bumpy feeling perceived by a user. First, as illustrated from FIG. 10A to FIG. 10C, a spatial frequency of shearing stress perceived by a user, that is, spacing of bumpiness depends on a smaller pitch between a pitch of a magnetic sheet used as the "first object" and a pitch of a magnetic sheet used as the "second object". For example, spacing of bumpiness perceived when both of the pitch of a magnetic sheet used as the "first object" and the pitch of a magnetic sheet used as the "second object" are 2 mm as illustrated in FIG. 10A is narrower than spacing of bumpiness perceived when both of the pitch of a magnetic sheet used as the "first object" and the pitch of a magnetic sheet used as the "second object" are 4 mm as illustrated in FIG. 10B. Further, as illustrated from FIG. 11A to FIG. 11D, a magnitude of shearing stress, that is, a magnitude of bumpy feeling perceived by a user depends on a combination between the pitch of a magnetic sheet used as the "first object" and the pitch of a magnetic sheet used as the "second object". As illustrated in FIG. 11A and FIG. 11B, a difference between the maximum value (100%) and the minimum value (0%) of an attractive force area ratio between magnetic sheets used as the "first object" and the "second object" reaches the maximum and the magnitude of bumpy feeling perceived by a user reaches the maximum when the pitch of the magnetic sheet used as the "first object" and the pitch of the magnetic sheet used as the "second object" are the same as each other (when both are 2 mm, for example). As illustrated in FIG. 11A and FIG. 11C, when the pitch of a magnetic sheet used as the "first object" is 6 mm and a pitch of a magnetic sheet used as the "second object" is 2 mm, the maximum value and the minimum value of the attractive force area ratio between the magnetic sheets are respectively 66.67% and 33.33% and the magnitude of bumpy feeling perceived by a user is thus smaller than that obtained when the pitches of magnetic sheets used as the "first object" and the "second object" are the same as each other. Further, as illustrated in FIG. 11A and FIG. 11D, when the pitch of a magnetic sheet used as the "first object" is 4 mm and the pitch of a magnetic sheet used as the "second object" is 2 mm, the maximum value and the minimum value of the attractive force area ratio between the magnetic sheets are both 50% and a user accordingly does not perceive bumpy feeling.

The magnitude of bumpy feeling perceived by a user is formulated as the following. The pitch of the magnetic sheet A used as the "second object" is $p_A$=n [mm] and the pitch of the magnetic sheet B used as the "first object" is $p_B$=m [mm]. Here, n≤m holds. The attractive force area ratio $Ar_{(A,B)}$ on a surface on which these two magnetic sheets A and B are in contact with each other is expressed by a function f of two pitches $p_A$ and $p_B$.

$$Ar_{(A,B)}=f(p_A,p_B)[\%] \tag{1}$$

Here, the function f depends on patterns magnetizing the magnetic sheets A and B. Further, holding force ($H_{(A,B)}$ [g/cm$^2$]) generated between the two magnetic sheets A and B depends on $Ar_{(A,B)}$ and surface magnetic flux density $Bs_A$ and $Bs_B$ [mT] of both magnetic sheets A and B and is expressed by a function g.

$$H_{(A,B)}=g(Ar_{(A,B)},Bs_{(A)},Bs_{(B)})[\text{g/cm}^2] \tag{2}$$

The magnitude $V_{(A,B)}$ of bumpy feeling depends on the maximum value $H_{(A,B)MAX}$ of $H_{(A,B)}$ and is expressed by a function h, the bumpy feeling perceived when the relative positional relation between surfaces of the magnetic sheet A and the magnetic sheet B is changed while keeping the surfaces of these two magnetic sheets A and B in contact with or close to each other.

$$V_{(A,B)} = h(H_{(A,B)MAX})$$
$$= h(g(Ar_{(A,B)}, Bs_{(A)}, Bs_{(B)})_{MAX})(\because (2))$$
$$= h(g(f(p_A, p_B), p_A, p_B)_{MAX})(\because (1),$$

and when identical materials are used, surface magnetic flux density $Bs_A$ and $Bs_B$ mainly depend on the pitches $p_A$ and $p_B$ respectively)

$$=F(p_A, p_B) \qquad (3)$$

Figure 12:
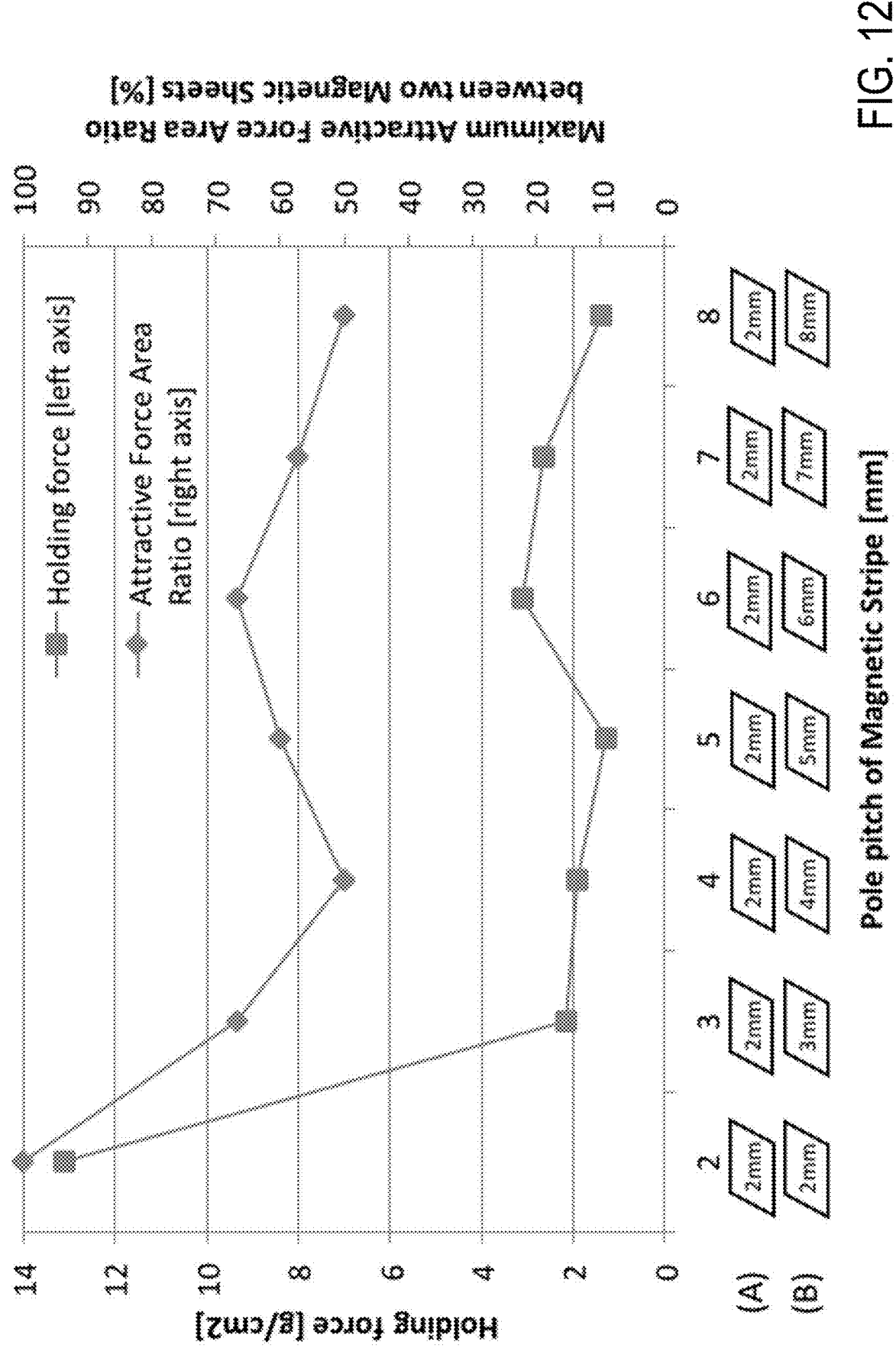
FIG. 12 is a diagram illustrating a relation among a pitch of a magnetic pattern, holding force, and an attractive force area ratio.

FIG. 12 illustrates a relation among the pitches $p_A$ and $p_B$ of the magnetic sheets A and B, holding force generated between the magnetic sheets A and B, and the maximum attractive force area ratio (the maximum value of the attractive force area ratio). The left vertical axis of FIG. 12 represents holding force, the right vertical axis represents maximum attractive force area ratio, and the horizontal axis represents the pitches $p_A$ and $p_B$ of the magnetic sheets A and B ((A) represents the pitch $p_A$ and (B) represents the pitch $p_B$). As illustrated, the magnitude of bumpiness perceived from the magnetic sheets A and B used as the "first object" and the "second object" vary depending on the pitches of the magnetic sheets A and B.

Figure 13C:
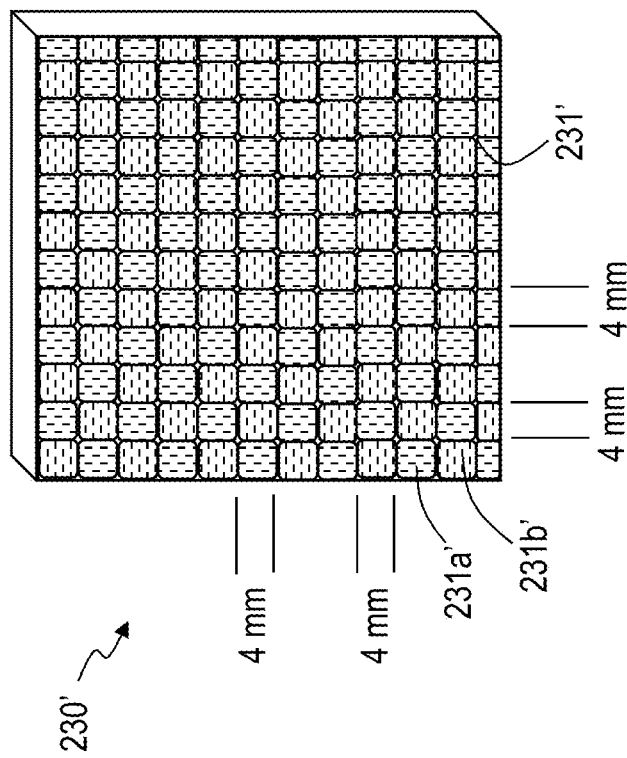
FIG. 13A to FIG. 13D are diagrams illustrating magnetized magnetic sheets.
Figure 13D:
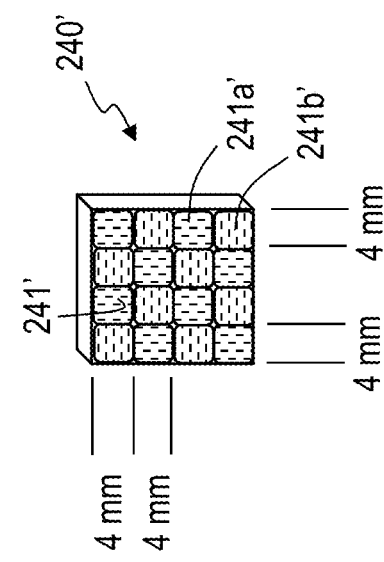
Figure 13A:
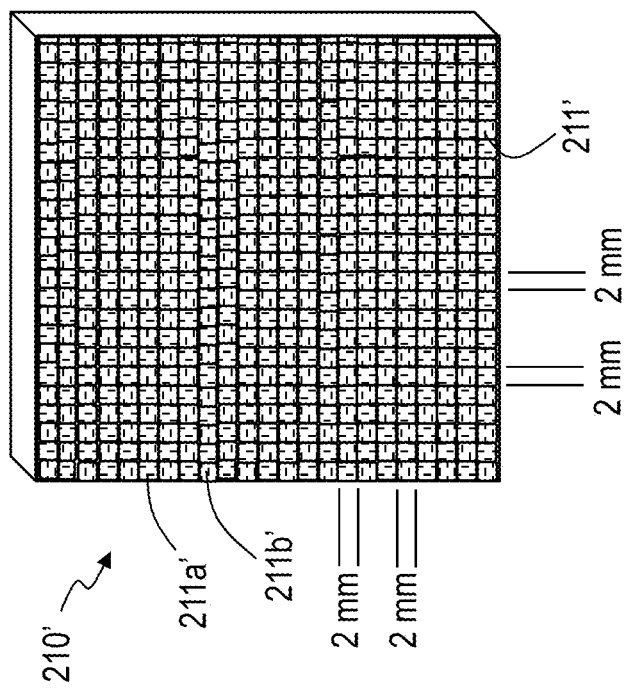
Figure 13B:
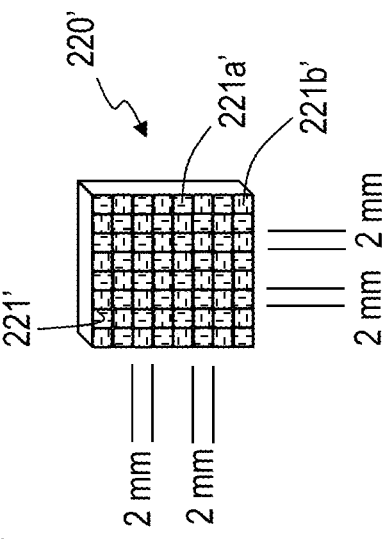
Figure 14B:
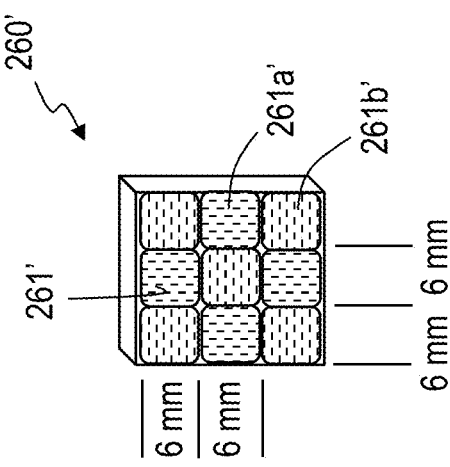
FIG. 14A and FIG. 14B are diagrams illustrating magnetized magnetic sheets.
Figure 14A:
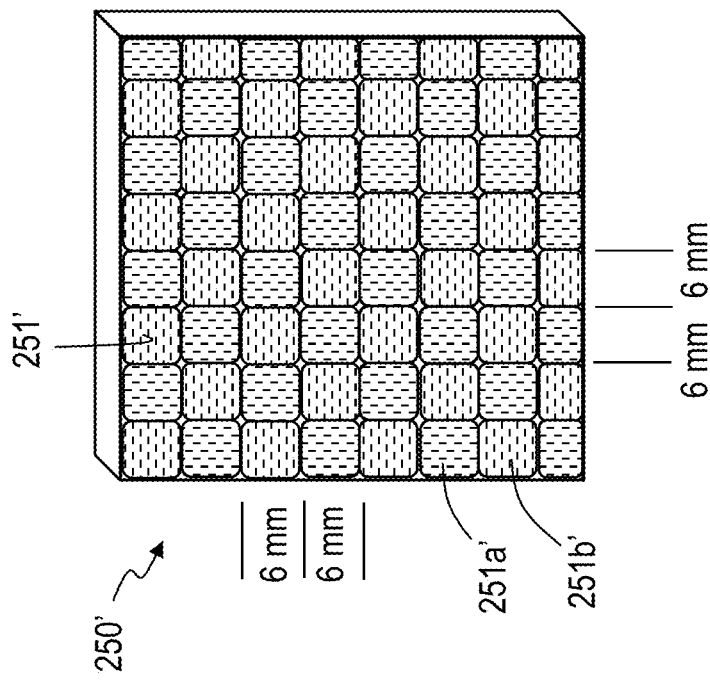

Other examples of the "first object" and the "second object" are described. FIG. 13A to FIG. 14B illustrate magnetic sheets which are magnetized with a texture including periodical nearly-checkered (nearly checker) regions magnetized to the S pole and periodical nearly-checkered regions magnetized to the N pole, as examples of the "first object" and the "second object". Magnetic sheets 210', 230', and 250' in FIG. 13A, FIG. 13C, and FIG. 14A are specific examples of the "first object" and magnetic sheets 220', 240' and 260' in FIG. 13B, FIG. 13D, and FIG. 14B are specific examples of the "second object". A nearly-checkered pattern means a checkered pattern or a pattern close to a checkered pattern. That is, the nearly-checkered pattern in the present embodiment includes not only a pattern (checkered pattern) in which squares (or rectangles) magnetized to the S pole and squares (or rectangles) magnetized to the N pole are periodically arranged in an alternate manner but also a pattern in which patterns similar to squares (or rectangles) magnetized to the S pole and patterns similar to squares (or rectangles) magnetized to the N pole are periodically arranged in an alternate manner. Examples of the pattern similar to a square (or a rectangle) include a pattern of a square (or a rectangle) with rounded corners, a circle, and an oval.

As illustrated in FIG. 13A, one surface 211' (first surface) of the magnetic sheet 210' (first object) is magnetized with a nearly-checkered texture (first texture) in which square regions 211a' having rounded corners and magnetized to the S pole and square regions 211b' having rounded corners and magnetized to the N pole are periodically repeated in an alternate manner. As illustrated in FIG. 13B, one surface 221' (second surface) of the magnetic sheet 220' (second object) is magnetized with a nearly-checkered texture (second texture) in which square regions 221a' having rounded corners and square regions 221b' having rounded corners and magnetized to the N pole are periodically repeated in an alternate manner. All pitches of patterns in the nearly-checkered patterns magnetizing the magnetic sheets 210' and 220' (the width of each of the patterns periodically and repeatedly arranged in an alternate manner) are 2 mm.

As illustrated in FIG. 13C, one surface 231' (first surface) of the magnetic sheet 230' (first object) is magnetized with a nearly-checkered texture (first texture) in which square regions 231a' having rounded corners and magnetized to the S pole and square regions 231b' having rounded corners and magnetized to the N pole are periodically repeated in an alternate manner. As illustrated in FIG. 13D, one surface 241' (second surface) of the magnetic sheet 240' (second object) is magnetized with a nearly-checkered texture (second texture) in which square regions 241a' having rounded corners and magnetized to the S pole and square regions 241b' having rounded corners and magnetized to the N pole are periodically repeated in an alternate manner. All pitches of patterns in the nearly-checkered patterns magnetizing the magnetic sheets 230' and 240' are 4 mm.

As illustrated in FIG. 14A, one surface 251' (first surface) of the magnetic sheet 250' (first object) is magnetized with a nearly-checkered texture (first texture) in which square regions 251a' having rounded corners and magnetized to the S pole and square regions 251b' having rounded corners and magnetized to the N pole are periodically repeated in an alternate manner. As illustrated in FIG. 14B, one surface 261' (second surface) of the magnetic sheet 260' (second object) is magnetized with a nearly-checkered texture (second texture) in which square regions 261a' having rounded corners and magnetized to the S pole and square regions 261b' having rounded corners and magnetized to the N pole are periodically repeated in an alternate manner. All pitches of patterns in the nearly-checkered patterns magnetizing the magnetic sheets 250' and 260' are 6 mm.

A user can perceive bumpiness by performing the operation for changing the relative positional relation between the "first surface" and the "second surface" or/and the action for changing the relative positional relation between the "first surface" and the "second surface" while keeping the "first surface" of the "first object" and the "second surface" in contact with or close to each other also when magnetic sheets magnetized with nearly-checkered textures described above are used as the "first object" and the "second object". The pitch of the "first object" and the pitch of the "second object" may be the same as or different from each other. Also, a magnetic sheet magnetized with a nearly-checkered texture may be used as the "first object" and a magnetic sheet magnetized with a texture in which belt-like regions are alternately repeated as described above may be used as the "second object". In an inverted manner, a magnetic sheet magnetized with a texture in which belt-like regions are alternately repeated as described above may be used as the "first object" and a magnetic sheet magnetized with a nearly-checkered texture may be used as the "second object".

Figure 16B:
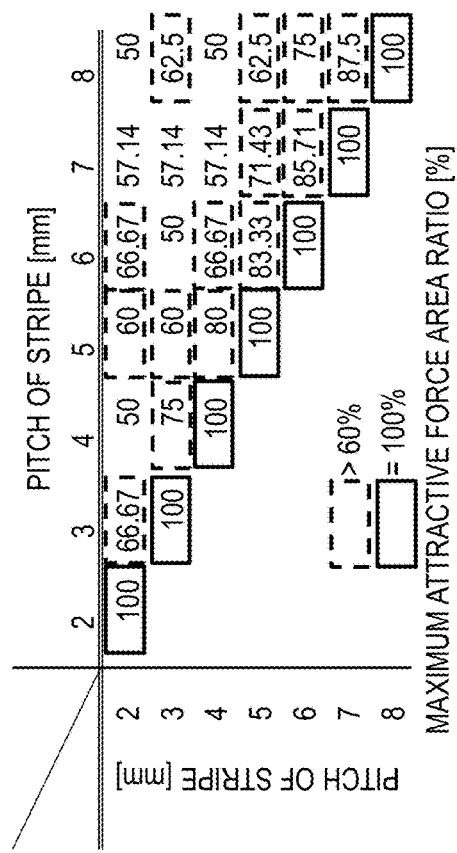
FIG. 16A and FIG. 16B respectively illustrate a relation between a pitch of a combination of magnetic sheets magnetized with stripe textures and holding force, and a relation between a pitch and an attractive force area ratio.
Figure 16A:
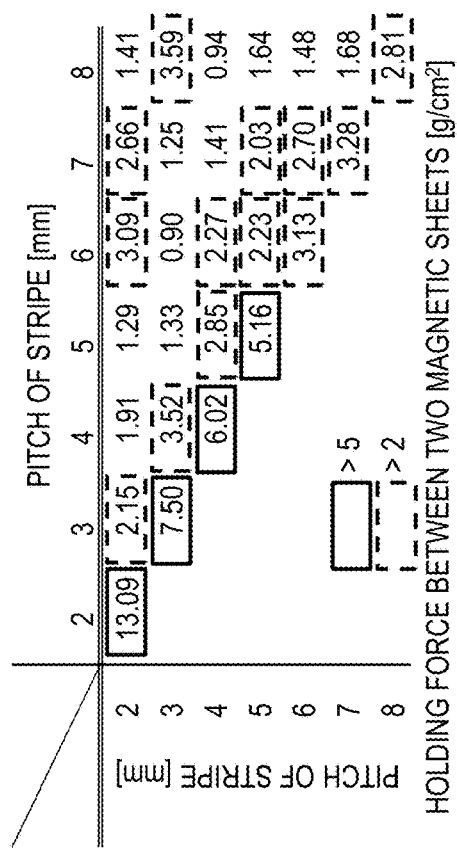
Figure 17B:
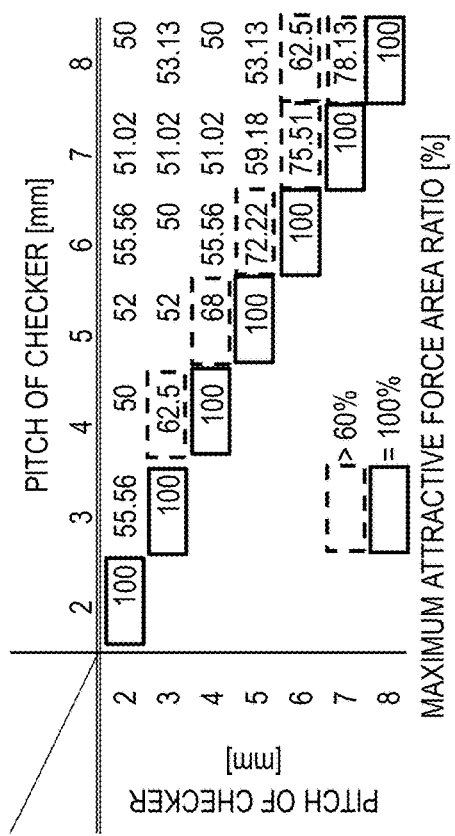
FIG. 17A and FIG. 17B respectively illustrate a relation between a pitch of a combination of magnetic sheets magnetized with checker textures and holding force, and a relation between a pitch and an attractive force area ratio.
Figure 17A:
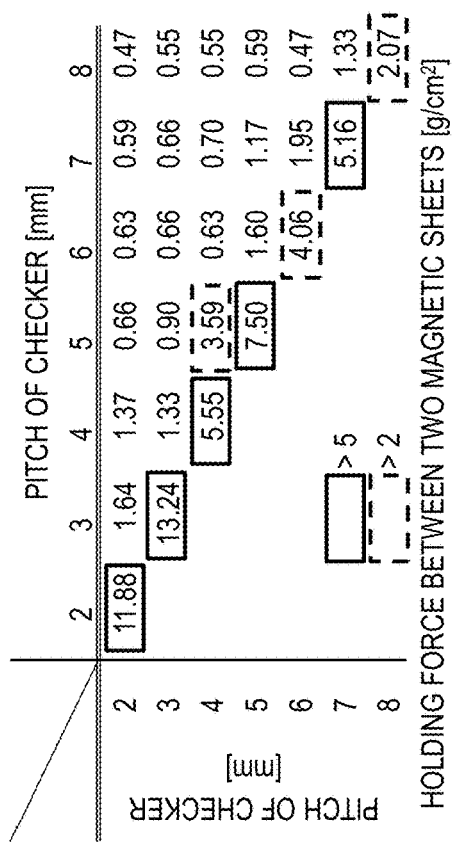

Pitches of magnetic sheets used as the "first object" and the "second object" affect shearing stress, that is, bumpy feeling perceived by a user also when a magnetic sheet magnetized with a nearly-checkered texture as described above is used as at least one of the "first object" and the "second object". That is, a spatial frequency of shearing stress, that is, spacing of bumpiness perceived by a user depends on a smaller pitch between the pitch of a magnetic sheet used as the "first object" and the pitch of a magnetic sheet used as the "second object". Further, a magnitude of shearing stress, that is, a magnitude of bumpy feeling perceived by a user depends on a combination between the pitch of a magnetic sheet used as the "first object" and the pitch of a magnetic sheet used as the "second object". Also, the above-described formulation for a magnitude of perceived bumpy feeling is applicable also to the case where a magnetic sheet magnetized with a nearly-checkered texture is used as at least one of the "first object" and the "second object", and the magnitude $V_{(A,B)}$ of perceived bumpy feeling is expressed by Formula (3). However, the maximum attractive force area ratio between magnetic sheets is smaller and perceived bumpy feeling can be reduced when a magnetic sheet magnetized with a nearly-checkered texture is used as at least one of the "first object" and the "second object" compared to the case where magnetic sheets magnetized with a texture in which belt-like regions are alternately repeated as those described above are used as the "first object" and the "second object". For example, even in the use of the magnetic sheet having a 2-mm pitch and the magnetic sheet having a 6-mm pitch, 66.67% of maximum attractive force area ratio is obtained when a combination of magnetic sheets magnetized with textures in which belt-like regions are alternately repeated (stripe texture) is used, while 55.56% of maximum attractive force area ratio is obtained when a combination of magnetic sheets magnetized with nearly-checkered textures (checker texture) is used, as illustrated in FIG. 15. Further, even in the use of a combination of magnetic sheets magnetized with stripe textures or a combination of magnetic sheets magnetized with checker textures, holding force and the maximum attractive force area ratio between these magnetic sheets reach the maximum when the pitch of the magnetic sheet used as the "first object" and the pitch of the magnetic sheet used as the "second object" are equal to each other, as illustrated from FIG. 16A to FIG. 17B. Here, in the use of stripe textures, certain levels of holding force and maximum attractive force area ratios can be obtained even when the pitch of the magnetic sheet used as the "first object" and the pitch of the magnetic sheet used as the "second object" are different from each other (FIG. 16A and FIG. 16B). On the other hand, in the use of checker textures, holding force and maximum attractive force area ratios are largely lower when the pitch of the magnetic sheet used as the "first object" and the pitch of the magnetic sheet used as the "second object" are different from each other compared to the case where these pitches are the same as each other (FIG. 17A and FIG. 17B). That is, it is understood that a certain level of magnitude of bumpy feeling can be perceived even when pitches of two magnetic sheets are different from each other in the use of stripe textures, while the magnitude of perceived bumpy feeling is largely lowered when the pitches of two magnetic sheets are different from each other in the use of checker textures. Meanwhile, bumpy feeling can be perceived only when the relative position between the "first object" and the "second object" is changed in a one-dimensional direction in the use of stripe textures, while bumpy feeling can be perceived also when this relative position is changed in a two-dimensional direction in the use of checker textures.

Characteristics of Present Embodiment

In the present embodiment, use of two magnetic sheets enables perception of bumpy feeling and realizes expression of various kinds of bumpy feeling in accordance with textures magnetizing respective magnetic sheets and pitches.

Modification of Second Embodiment

If magnetic force sufficiently acts between a magnetic sheet used as the "first object" and a magnetic sheet used as the "second object", the relative positional relation between surfaces (first surface and second surface) of these magnetic sheets may be changed in a state that these two magnetic sheets are not in contact with each other. For example, a thin sheet made of a nonmagnetic body such as paper may be interposed between these two magnetic sheets. A user may be in contact with both of a magnetic sheet used as the "first object" and a magnetic sheet used as the "second object" or may be in contact only with the magnetic sheet used as the "first object".

Third Embodiment

The principles of the second embodiment are applied to a third embodiment. As described above, even though a texture magnetizing one magnetic sheet is unvaried, different kinds of bumpy feeling can be provided to a user if a texture magnetizing the other magnetic sheet to be layered on one magnetic sheet is varied. The present embodiment utilizes this characteristic. A force sense presenting object according to the present embodiment includes a "base object", a "first sheet", a "second sheet", a "first contact object", and a "second contact object". The "base object" includes a "first surface", and the "first surface" is preliminarily magnetized with a "first texture" including S-pole regions and N-pole regions. The "first sheet" is provided with a "first pattern", which is visually recognizable, and is layered on the "first surface" side (the "first surface", for example) of the "base object". The "second sheet" is provided with a "second pattern", which is different from the "first pattern" and is visually recognizable, and is layered on the "first surface" side (the "first surface", for example) of the "base object". The "first contact object" includes a "second surface", and the "second surface" side (the "second surface", for example) is preliminarily magnetized with a "second texture" including S-pole regions and N-pole regions. The "second contact object" includes a "third surface", and the "third surface" side (the "third surface", for example) is preliminarily magnetized with a "third texture" which includes S-pole regions and N-pole regions and is different from the "second texture". Here, bumpy feeling perceived by the "acting subject" from the "first contact object" when performing a "first action" and bumpy feeling perceived by the "acting subject" from the "second contact object" when performing a "second action" are different from each other. In other words, the way of change in shearing stress received by the "acting subject" from the "first contact object" when performing the "first action" and the way of change in shearing stress received by the "acting subject" from the "second contact object" when performing the "second action" are different from each other. Here, the "first action" means an action that the "acting subject" touches the "first contact object" and performs an operation for changing a relative positional relation between the "first surface" and the "second surface" or/and an action for changing the relative positional relation between the "first surface" and the "second surface" while keeping the "first surface" and the "second surface" close to each other when the "first sheet" is layered on the "first surface" side of the "base object". The "second action" means an action that the "acting subject" touches the "second contact object" and performs an operation for changing a relative positional relation between the "first surface" and the "third surface" or/and an action for changing the relative positional relation between the "first surface" and the "third surface" while keeping the "first surface" and the "third surface" close to each other when the "second sheet" is layered on the "first surface" side of the "base object".

Specific examples of the present embodiment are described below with reference to the accompanying drawings. Hereinafter, description for matters which have already been described is simplified by quoting the identical reference characters.

Figure 19:
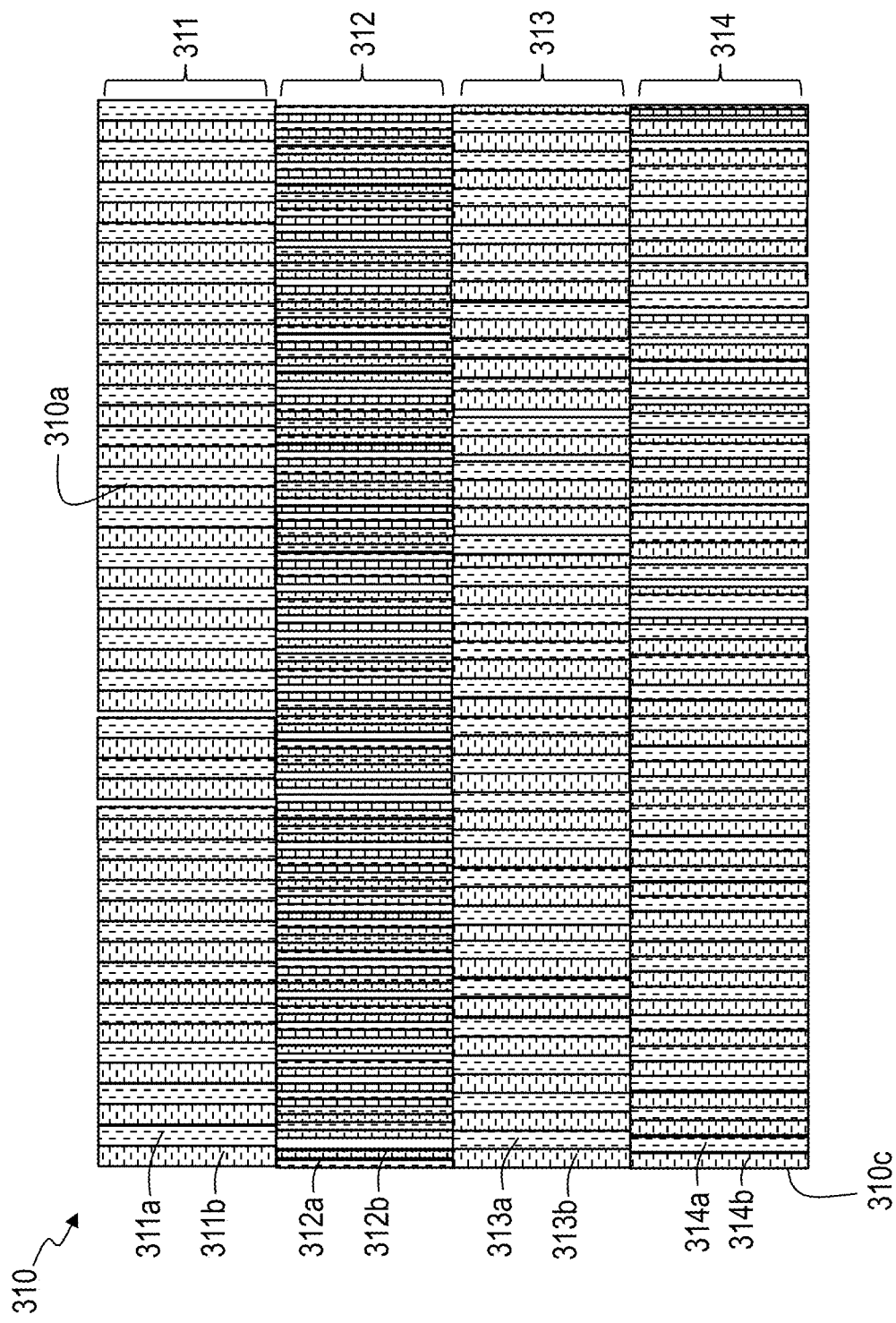
FIG. 19 is a diagram illustrating a base object.

FIG. 19 illustrates a base object 310 which is the "base object" of the present embodiment. The base object 310 of the present embodiment is a magnetic sheet and one surface 310a (first surface) of the base object 310 is preliminarily magnetized with a texture (first texture) including S-pole regions 311a, 312a, 313a, and 314a and N-pole regions 311b, 312b, 313b, and 314b. The surface 310a of the base object 310 is sectioned into four regions 311, 312, 313, and 314. The region 311 is magnetized so that the S-pole regions 311a having a belt-like shape and the N-pole regions 311b having a belt-like shape are periodically repeated in an alternate manner. The region 312 is magnetized so that the S-pole regions 312a having a belt-like shape and the N-pole regions 312b having a belt-like shape are periodically repeated in an alternate manner. The region 313 is magnetized so that the S-pole regions 313a having a belt-like shape and the N-pole regions 313b having a belt-like shape are periodically repeated in an alternate manner. The region 314 is magnetized so that the S-pole regions 314a having a belt-like shape and the N-pole regions 314b having a belt-like shape are periodically repeated in an alternate manner.

Figure 18A:
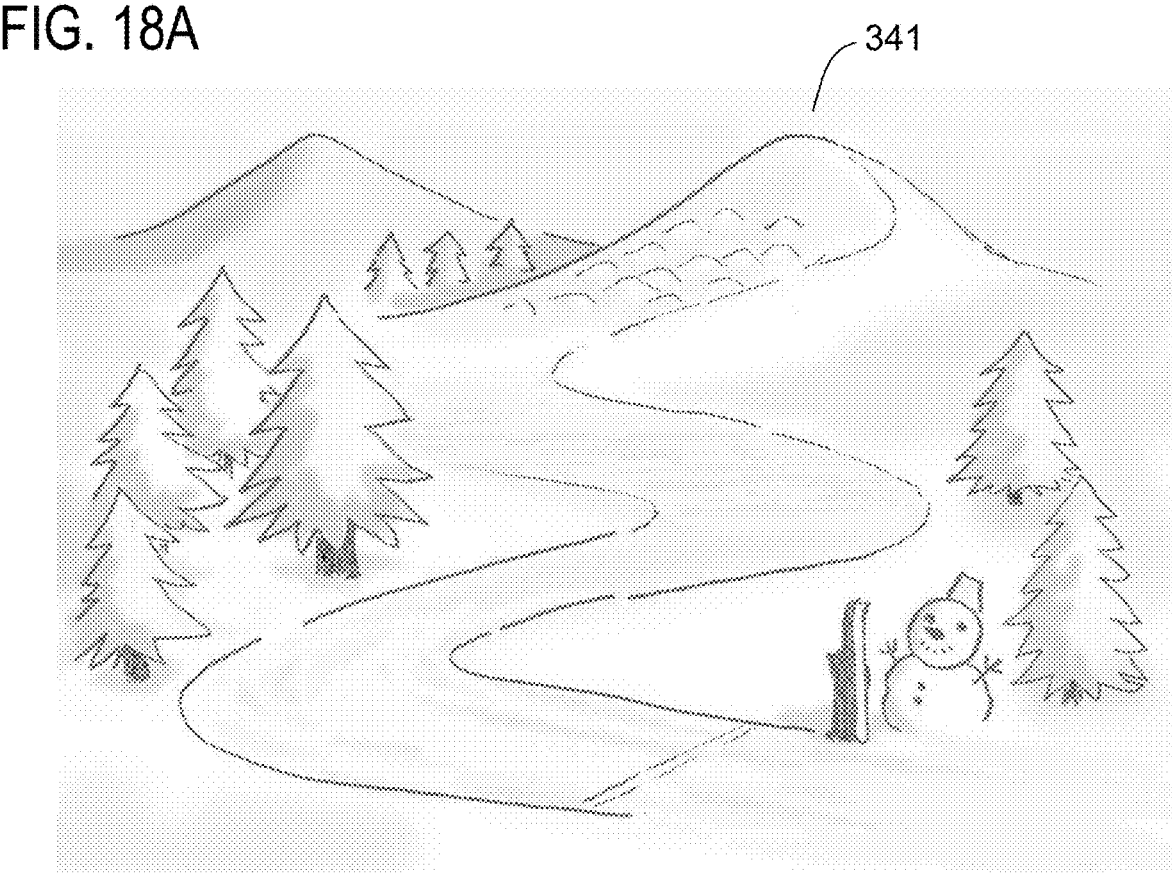
FIG. 18A and FIG. 18B are diagrams illustrating sheets to be layered on a base object.
Figure 18B:
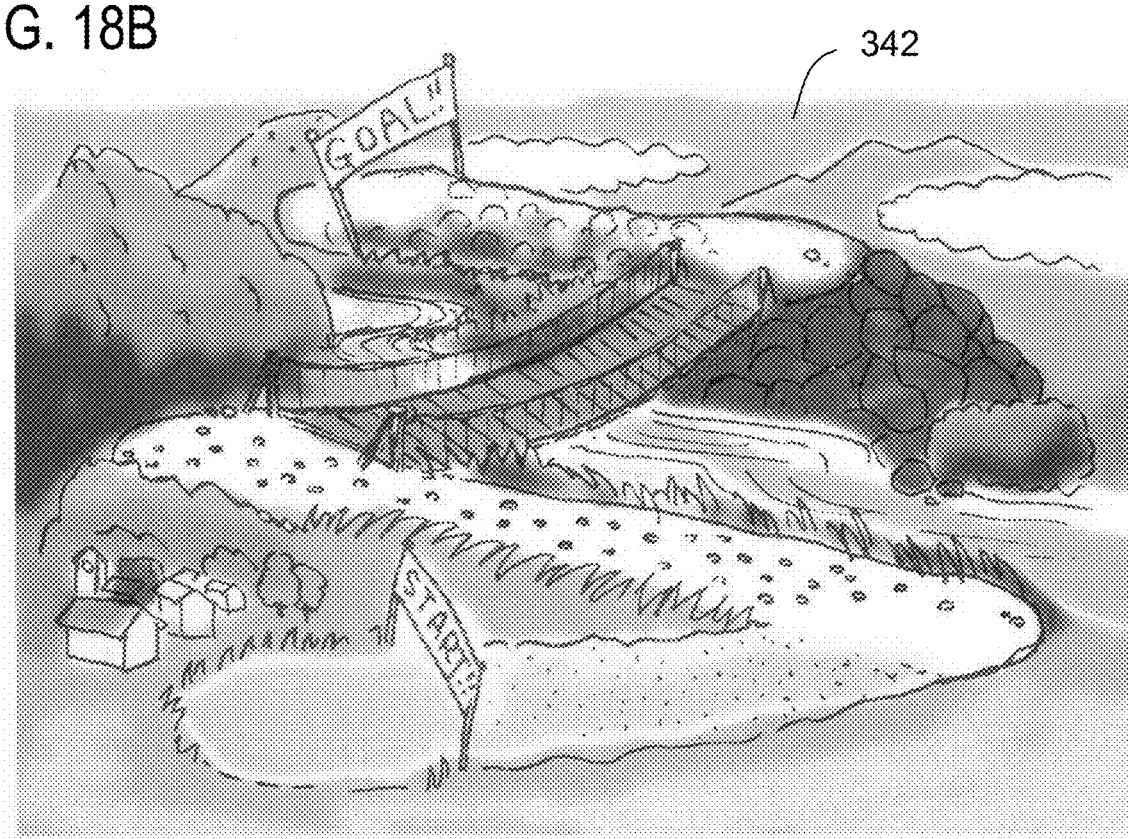

FIG. 18A illustrates a sheet 341 which is the "first sheet" of the present embodiment and FIG. 18B illustrates a sheet 342 which is the "second sheet" of the present embodiment. The sheets 341 and 342 are thin sheets made of a nonmagnetic body such as paper and synthetic resin. The sheets 341 and 342 may be made of an opaque material or may be made of a transparent material. One surface of the sheet 341 is provided with a visually-recognizable pattern (first pattern). One surface of the sheet 342 is provided with a visually-recognizable pattern (second pattern) which is different from the pattern (first pattern) of the sheet 341. On one surface of the sheet 341 illustrated in FIG. 18A and one surface of the sheet 342 illustrated in FIG. 18B, images which are different from each other (drawings and pictures, for example) are drawn. In this example, a ski area is expressed on the sheet 341 and an off-road course is expressed on the sheet 342. Each of the sheets 341 and 342 can be layered on the surface 310a of the base object 310.

FIG. 20A and FIG. 20B illustrate a contact object 320 which is the "first contact object" of the present embodiment. The contact object 320 of the present embodiment includes a magnetic sheet. An image (a drawing and a picture of a snowboarder, for example) is drawn on one surface 322 of the contact object 320. The other surface 321 (second surface) of the contact object 320 is preliminarily magnetized with a texture (second texture) including S-pole regions 321a and N-pole regions 321b. The surface 321 of the contact object 320 of the present embodiment is magnetized so that the S-pole regions 321a having a belt-like shape and the N-pole regions 321b having a belt-like shape are periodically repeated in an alternate manner. When the contact object 320 is partially a magnetic sheet, part, on which there is the magnetic sheet, of the surface 321 (second surface) of the contact object 320 is preliminarily magnetized with a texture (second texture). The case is described below where the whole of the surface 321 (second surface) of the contact object 320 is preliminarily magnetized with a texture (second texture).

FIG. 20C and FIG. 20D illustrate a contact object 330 which is the "second contact object" of the present embodiment. The contact object 330 of the present embodiment also includes a magnetic sheet. An image (a drawing and a picture of a car, for example) is drawn on one surface 332 of the contact object 330. The other surface 331 (third surface) of the contact object 330 is preliminarily magnetized with a texture (third texture) including S-pole regions 331a and N-pole regions 331b. The texture magnetizing the surface 331 of the contact object 330 is different from the texture magnetizing the surface 321 of the contact object 320. The surface 331 of the contact object 330 of the present embodiment is magnetized so that the S-pole regions 331a having a belt-like shape and the N-pole regions 331b having a belt-like shape are periodically repeated in an alternate manner. However, the pitch of the texture magnetizing the surface 331 is different from the pitch of the texture magnetizing the surface 321 of the contact object 320. When the contact object 330 is partially a magnetic sheet, part, on which there is the magnetic sheet, of the surface 331 (third surface) of the contact object 330 is preliminarily magnetized with a texture (third texture). The case is described below where the whole of the surface 331 (third surface) of the contact object 330 is preliminarily magnetized with a texture (third texture).

When the sheet 341 (first sheet) is layered on the surface 310a of the base object 310, the contact object 320 is further layered on the sheet 341. The sheet 341 is interposed between the contact object 320 and the base object 310 in a state that the surface 321 of the contact object 320 faces the sheet 341 side. A user (acting subject) touches the surface 322 of the contact object 320 with the finger or the like and performs an operation for changing a relative positional relation between the surface 310a (first surface) and the surface 321 (second surface) or/and an action for changing the relative positional relation between the surface 310a (first surface) and the surface 321 (second surface) while keeping the surface 310a (first surface) and the surface 321 (second surface) close to each other (first action). Accordingly, the user perceives bumpy feeling from the contact object 320. As described above, this bumpy feeling varies depending on a combination between a pattern, which is composed of the S-pole regions 321a and the N-pole regions 321b and magnetizes the surface 321 of the contact object 320, and a pattern, which is composed of the S-pole regions (any of the regions 311a, 312a, 313a, and 314a) and the N-pole regions (any of the regions 311b, 312b, 313b, and 314b) and magnetizes the region (any of the regions 311, 312, 313, and 314) of the surface 310a of the base object 310, which is close to the pattern composed of the S-pole regions 321a and the N-pole regions 321b.

Meanwhile, when the sheet 342 (second sheet) is layered on the surface 310a of the base object 310, the contact object 330 is further layered on the sheet 342. The sheet 342 is interposed between the contact object 330 and the base object 310 in a state that the surface 331 of the contact object 330 faces the sheet 342 side. A user (acting subject) touches the surface 332 of the contact object 330 with the finger or the like and performs an operation for changing a relative positional relation between the surface 310a (first surface) and the surface 331 (third surface) or/and an action for changing the relative positional relation between the surface 310a (first surface) and the surface 331 (third surface) while keeping the surface 310a (first surface) and the surface 331 (third surface) close to each other (second action). Accordingly, the user perceives bumpy feeling from the contact object 330. As described above, this bumpy feeling also varies depending on a combination between a pattern, which is composed of the S-pole regions 331a and the N-pole regions 331b and magnetizes the surface 331 of the contact object 330, and a pattern, which is composed of the S-pole regions (any of the regions 311a, 312a, 313a, and 314a) and the N-pole regions (any of the regions 311b, 312b, 313b, and 314b) and magnetizes the region (any of the regions 311, 312, 313, and 314) of the surface 310a of the base object 310, which is close to the pattern composed of the S-pole regions 331a and the N-pole regions 331b.

Further, the texture including the S-pole regions 321a and the N-pole regions 321b which are magnetized on the surface 321 of the contact object 320 and the texture including the S-pole regions 331a and the N-pole regions 331b which are magnetized on the surface 331 of the contact object 330 are different from each other. Therefore, bumpy feeling perceived by a user performing the "first action" when the texture including the regions 321a and 321b which are magnetized on the contact object 320 is close to any region α (any of the regions 311, 312, 313, and 314) of the surface 310a of the base object 310 and bumpy feeling perceived by the user performing the "second action" when the texture including the regions 331a and 331b which are magnetized on the contact object 330 is close to the same region α are different from each other. This is because the way of change in shearing stress received from the contact object 320 by a user performing the "first action" when the texture including the regions 321a and 321b which are magnetized on the contact object 320 is close to the region α and the way of change in shearing stress received from the contact object 330 by the user performing the "second action" when the texture including the regions 331a and 331b which are magnetized on the contact object 330 is close to the same region α are different from each other, as described above.

Characteristics of Present Embodiment

As described above, different kinds of bumpy feeling can be presented to a user depending on whether to use the contact object 320 or the contact object 330 even when the base object 310 is used for both cases. For example, magnitude or a pitch (spacing of perceived bumpiness) of bumpy feeling can be varied and regions on which bumpy feeling is not perceived can be varied depending on whether to use the contact object 320 or the contact object 330. Thus, mutually-different images corresponding mutually-different bumpy feeling are drawn on the sheet 341 and sheet 342 respectively, enabling perception of mutually-different bumpy feeling which respectively correspond to the mutually-different images drawn on the sheet 341 and the sheet 342. Thus, bumpy feeling can be changed depending on an image expressed on a sheet even though only a permanent magnet is used in the present embodiment. This technique is applicable to picture books presenting different kinds of bumpy feeling depending on a sheet.

Modification 1 of Third Embodiment

The "first texture" magnetized on the "first surface" of the "base object" may be a "checker texture" which includes periodical nearly-checkered regions magnetized to the S pole and periodical nearly-checkered regions magnetized to the N pole. In the same manner, the "second texture" magnetizing the "second surface" of the "first contact object" may be the "checker texture" and the "third texture" magnetizing the "third surface" of the "second contact object" may be the "checker texture".

For example, a base object 310' illustrated in FIG. 21A may be used instead of the base object 310 described above, a contact object 320' illustrated in FIG. 21B may be used instead of the contact object 320, and a contact object 330' illustrated in FIG. 21C may be used instead of the contact object 330.

The base object 310' is a magnetic sheet and one surface 310a' (first surface) of the base object 310' is preliminarily magnetized with a periodical nearly-checkered texture (first texture) including S-pole regions 311a', 312a', 313a', 314a', and 315a' and N-pole regions 311b', 312b', 313b', 314b', and 315b'. The surface 310a' of the base object 310' is sectioned into five regions 311', 312', 313', 314', and 315'. The region 311' is magnetized with a periodical nearly-checkered texture composed of the S-pole regions 311a' and the N-pole regions 311b'. The region 312' is magnetized with a periodical nearly-checkered texture composed of the S-pole regions 312a' and the N-pole regions 312b'. The region 313' is magnetized with a periodical nearly-checkered texture composed of the S-pole regions 313a' and the N-pole regions 313b'. The region 314' is magnetized with a periodical nearly-checkered texture composed of the S-pole regions 314a' and the N-pole regions 314b'. The region 315' is magnetized with a periodical nearly-checkered texture composed of the S-pole regions 315a' and the N-pole regions 315b'.

The contact object 320' is a magnetic sheet. An image is drawn on one surface of the contact object 320' and the other surface 321' (second surface) is preliminarily magnetized with a periodical nearly-checkered texture (second texture) composed of S-pole regions 321a' and N-pole regions 321b'. The contact object 330' is a magnetic sheet. An image is drawn on one surface of the contact object 330' and the other surface 331' (third surface) is preliminarily magnetized with a periodical nearly-checkered texture (third texture) composed of S-pole regions 331a' and N-pole regions 331b'.

Figure 22B:
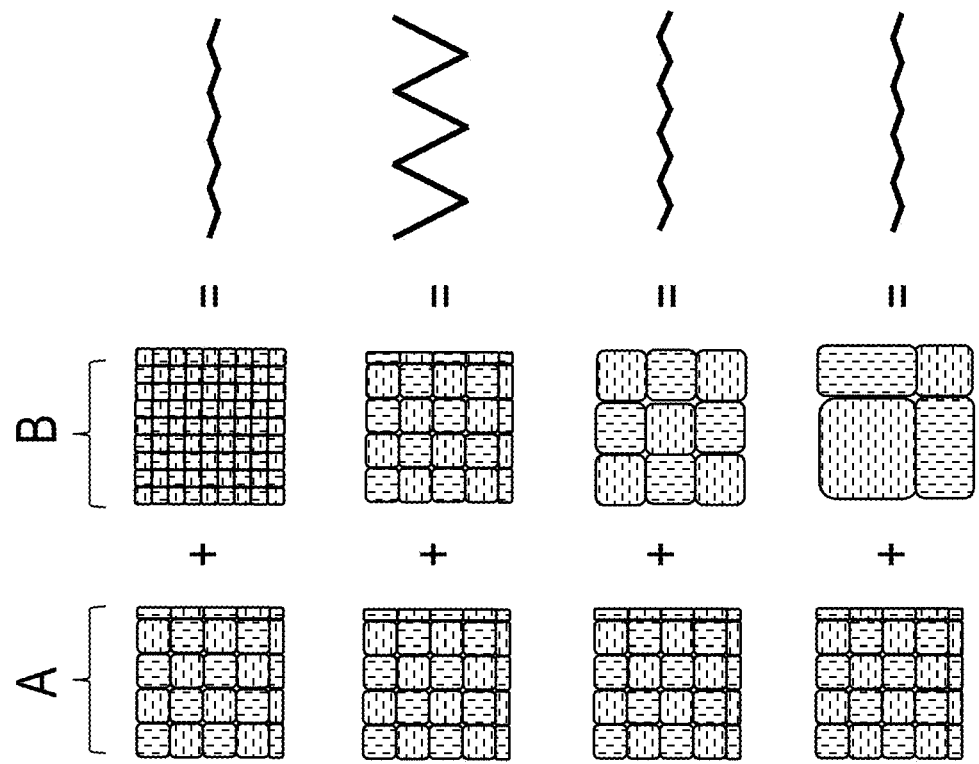
FIG. 22A and FIG. 22B are diagrams illustrating a relation of an attractive force area ratio between two magnetic sheets.
Figure 22A:
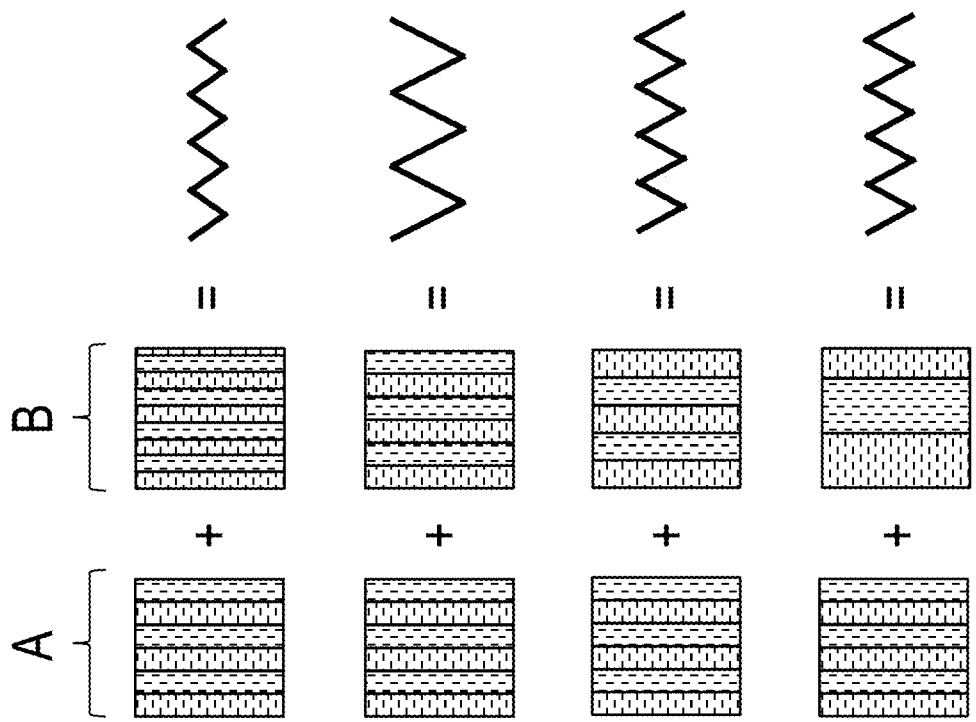

Similar advantageous effects to those of the third embodiment can be obtained also in this configuration. However, as described in the second embodiment, the magnitude of shearing stress perceived by a user, that is, the magnitude of bumpy feeling is smaller if the base object 310', the contact object 320', and the contact object 330' which are magnetized with checker textures is used instead of any of the base object 310, the contact object 320, and the contact object 330. As illustrated in FIG. 22A, in the use of the base object A and the contact object B which are magnetized with stripe textures, the magnitude of bumpy feeling perceived by a user reaches the maximum when the pitches of the textures are the same as each other, and even when the pitches of the textures are not the same as each other, there is a combination by which shearing stress perceived by the user is large to some extent and the user perceives a certain magnitude of bumpy feeling. On the other hand, as illustrated in FIG. 22B, in the use of the base object A and the contact object B which are magnetized with checker textures, the magnitude of bumpy feeling perceived by a user reaches the maximum when the pitches of the textures are the same as each other, and when the pitches of the textures are not the same as each other, shearing stress perceived by the user is small and almost no bumpy feeling is perceived. That is, a region in which bumpy feeling is perceived can be limited in the use of the base object A and the contact object B which are magnetized with checker textures.

Modification 2 of Third Embodiment

As described in the third embodiment and Modification 1 thereof, different kinds of bumpy feeling can be presented to a user depending on whether to use the "first contact object" or the "second contact object" even when the same "base object" is used for respective cases. The bumpy feeling varies depending on a combination between a pattern, which is composed of S-pole regions and N-pole regions which are magnetized on the "first contact object" and the "second contact object", and a pattern, which is composed of S-pole regions and N-pole regions which are magnetized on each region of the "first surface" of the "base object", which is close to the pattern composed of the S-pole regions and the N-pole regions which are magnetized on the "first contact object" and the "second contact object". Therefore, bumpy feeling perceived by a user can be varied depending on whether to move the "first contact object" or the "second contact object" even in movement on the same paths on the "first surface" of the "base object". Further, the magnitude of each bumpy feeling perceived by a user when moving the "first contact object" while keeping the "second surface" of the "first contact object" close to each region of the "first surface" of the "base object" and the magnitude of each bumpy feeling perceived by a user when moving the "second contact object" while keeping the "third surface" of the "second contact object" close to the each region are permitted to have a mutually non-liner relation. That is, the magnitude of each bumpy feeling perceived by a user can be set to satisfy (I) and (II) below or (I) and (III) below.

(I) The magnitude of bumpy feeling perceived by a user when the user touches the "first contact object" and moves the "first contact object" while keeping the "second surface" of the "first contact object" close to a certain region α on the "first surface" of the "base object" is smaller than the magnitude of bumpy feeling perceived by the user when the user moves the "first contact object" while keeping the "second surface" of the "first contact object" close to the other region β on the "first surface" of the "base object".

(II) The magnitude of bumpy feeling perceived by a user when the user touches the "second contact object" and moves the "second contact object" while keeping the "third surface" of the "second contact object" close to the region α of the "base object" is larger than the magnitude of bumpy feeling perceived by the user when the user moves the "second contact object" while keeping the "third surface" of the "second contact object" close to the other region β of the "base object".

(III) The magnitude of bumpy feeling perceived by a user when the user touches the "second contact object" and moves the "second contact object" while keeping the "third surface" of the "second contact object" close to the region α of the "base object" is equal to the magnitude of bumpy feeling perceived by the user when the user moves the "second contact object" while keeping the "third surface" of the "second contact object" close to the other region β of the "base object".

Here, an "action $A_{1-1}$", an "action $A_{1-2}$", an "action $A_{2-1}$", and an "action $A_{2-2}$" are defined as the following.

The "action $A_{1-1}$" is an action in which the "acting subject" touches the "first contact object" and performs an operation for changing a relative positional relation between a "first magnetization region" of the "first surface" and the "second surface" and/or an action for changing the relative positional relation between the "first magnetization region" of the "first surface" and the "second surface" while keeping the "first magnetization region" of the "first surface" and the "second surface" close to each other when the "first sheet" is layered on the "first surface" side of the "base object".

The "action $A_{1-2}$" is an action in which the "acting subject" touches the "first contact object" and performs an operation for changing a relative positional relation between a "second magnetization region" of the "first surface" and the "second surface" and/or an action for changing the relative positional relation between the "second magnetization region" of the "first surface" and the "second surface" while keeping the "second magnetization region" of the "first surface" and the "second surface" close to each other when the "first sheet" is layered on the "first surface" side of the "base object".

The "action $A_{2-1}$" is an action in which the "acting subject" touches the "second contact object" and performs an operation for changing a relative positional relation between the "first magnetization region" of the "first surface" and the "third surface" and/or an action for changing the relative positional relation between the "first magnetization region" of the "first surface" and the "third surface" while keeping the "first magnetization region" of the "first surface" and the "third surface" close to each other when the "second sheet" is layered on the "first surface" side of the "base object".

The "action $A_{2-2}$" is an action in which the "acting subject" touches the "second contact object" and performs an operation for changing a relative positional relation between the "second magnetization region" of the "first surface" and the "third surface" and/or an action for changing the relative positional relation between the "second magnetization region" of the "first surface" and the "third surface" while keeping the "second magnetization region" of the "first surface" and the "third surface" close to each other when the "second sheet" is layered on the "first surface" side of the "base object".

In this case, the "first texture", the "second texture", and the "third texture" may be configured so that the "first texture" includes the "first magnetization region" and the "second magnetization region" whose magnetization patterns are different from each other, and (1) the magnitude of bumpy feeling perceived by the "acting subject" from the "first contact object" when performing the "action $A_{1-1}$" is smaller than the magnitude of bumpy feeling perceived by the "acting subject" from the "first contact object" when performing the "action $A_{1-2}$" and (2) the magnitude of bumpy feeling perceived by the "acting subject" from the "second contact object" when performing the "action $A_{2-1}$" is equal to or larger than the magnitude of bumpy feeling perceived by the "acting subject" from the "second contact object" when performing the "action $A_{2-2}$".

In other words, the "first texture", the "second texture", and the "third texture" may be configured so that the "first texture" includes the "first magnetization region" and the "second magnetization region" whose magnetization patterns are different from each other, and (1) the maximum value of shearing stress received by the "acting subject" from the "first contact object" when performing the "action $A_{1-1}$" is smaller than the maximum value of shearing stress received by the "acting subject" from the "first contact object" when performing the "action $A_{1-2}$" and (2) the maximum value of shearing stress received by the "acting subject" from the "second contact object" when performing the "action $A_{2-1}$" is equal to or larger than the maximum value of shearing stress received by the "acting subject" from the "second contact object" when performing the "action $A_{2-2}$".

A specific example of the present modification is described below with reference to the accompanying drawings.

Figure 23:
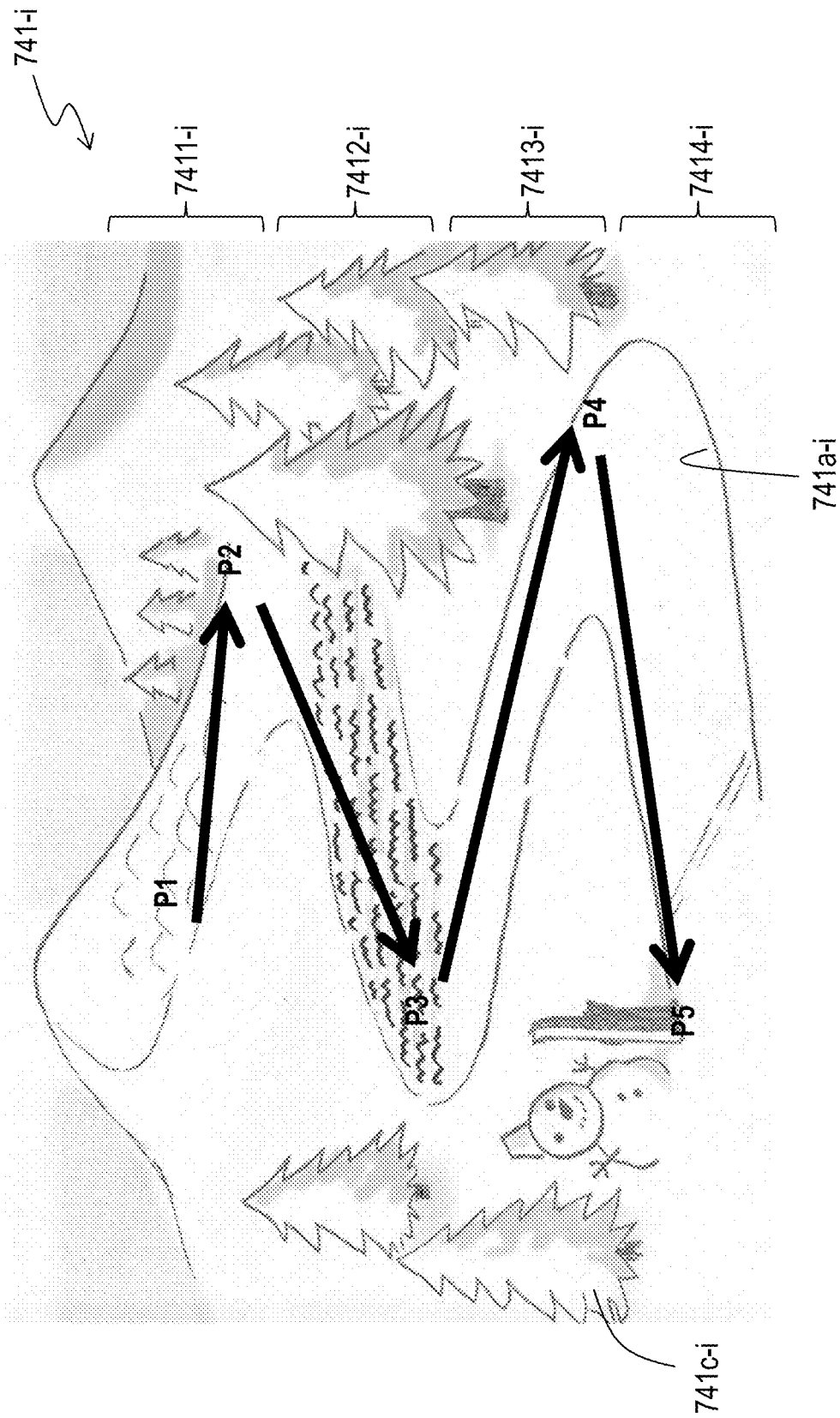
FIG. 23 is a diagram illustrating a sheet to be layered on a base object.

The case is illustrated in which the base object 310 is used as the "base object" of the present modification (FIG. 19), a sheet 741-$i$ is used as the "first sheet" of the present modification (FIG. 23, for example), a sheet 742-$i$ is used as the "second sheet" of the present modification (FIG. 24, for example), the contact object 320 is used as the "first contact object" of the present modification (FIG. 20A and FIG. 20B), and the contact object 330 is used as the "second contact object" of the present modification (FIG. 20C and FIG. 20D). Here, i=1, . . . , K holds, where K is an integer which is 1 or larger. The "first patterns" drawn on surfaces 741$a$-$i$ of the sheets 741-$i$ corresponding to mutually-different i are different from each other. In a similar manner, the "second patterns" drawn on surfaces 742$a$-$i$ of the sheets 742-$i$ corresponding to mutually-different i are different from each other.

As described above, a texture (first texture) including the four regions 311 to 314 whose magnetization patterns are different from each other are provided on the base object 310. The region 311 is an example of the "first magnetization region" and the region 312 is an example of the "second magnetization region". It is assumed that each of the widths in the short side direction of the regions 311$a$ and 311$b$ of the region 311 is 6 mm, each of the widths in the short side direction of the regions 312$a$ and 312$b$ of the region 312 is 2 mm, each of the widths in the short side direction of the regions 313$a$ and 313$b$ of the region 313 is 5 mm, and each of the widths in the short side direction of the regions 314$a$ and 314$b$ of the region 314 is 4 mm. Further, as described above, the surface 321 (second surface) of the contact object 320 is preliminarily magnetized with a texture (second texture) including the regions 321$a$ and the regions 321$b$. The surface 331 (third surface) of the contact object 330 is preliminarily magnetized with a texture (third texture) including the regions 331$a$ and the regions 331$b$. It is assumed that each of the widths in the short side direction of the regions 321$a$ and 321$b$ of the contact object 320 is 2 mm and each of the widths in the short side direction of the regions 331$a$ and 331$b$ of the contact object 330 is 6 mm.

Figure 24:
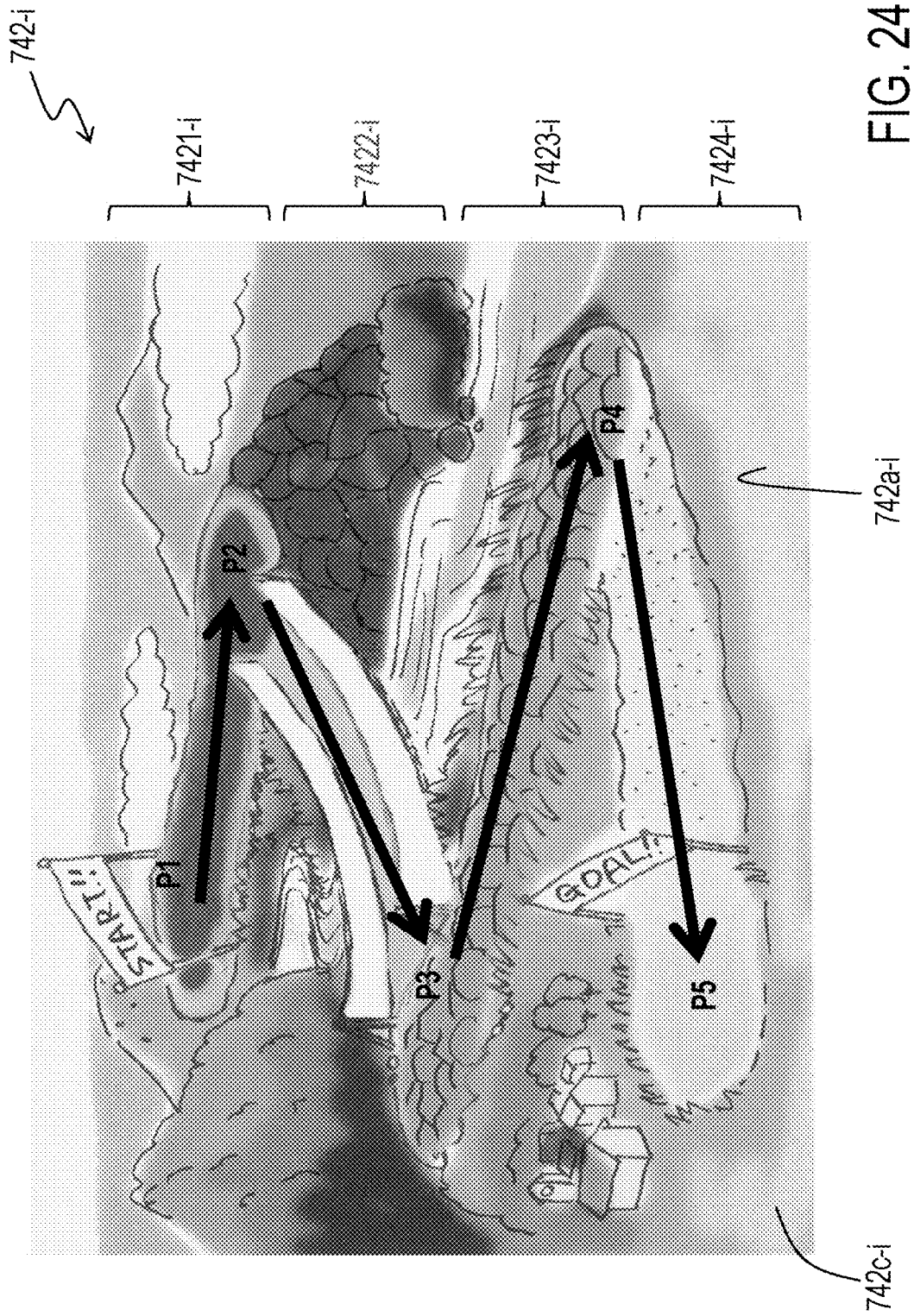
FIG. 24 is a diagram illustrating a sheet to be layered on the base object.

A visually-recognizable "first pattern" is drawn on one surface 741$a$-$i$ of the sheet 741-$i$ (FIG. 23) and a visually-recognizable "second pattern" is drawn on one surface 742$a$-$i$ of the sheet 742-$i$ (FIG. 24). The "first pattern" and the "second pattern" are different from each other. Here, paths P1-P5 passing through points P1, P2, P3, P4, and P5 are drawn on the "first pattern" and paths P1-P5 passing through points P1, P2, P3, P4, and P5 are drawn also on the "second pattern". The positions and the shapes of the paths P1-P5 in the "first pattern" are the same as the positions and the shapes of the paths P1-P5 in the "second pattern".

<<Case where Sheet 741-$i$ and Contact Object 320 are Layered on Surface 310$a$ Side of Base Object 310 and Contact Object 320 is Moved>>

If the sheet 741-$i$ (first sheet) is layered on the surface 310$a$ (first surface) side of the base object 310, regions 7411-$i$ to 7414-$i$ of the sheet 741-$i$ are respectively layered on the regions 311 to 314 of the base object 310. Here, the other surface (back surface of the surface 741$a$-$i$) side of the sheet 741-$i$ is allowed to face the surface 310$a$ side of the base object 310. The path P1-P2 passing through the points P1 and P2 is positioned in the region 7411-$i$, the path P2-P3 passing through the points P2 and P3 is positioned in the region 7412-$i$, the path P3-P4 passing through the points P3 and P4 is positioned in the region 7413-$i$, and the path P4-P5 passing through the points P4 and P5 is positioned in the region 7414-$i$.

The contact object 320 (first contact object) is disposed such that the surface 321 side thereof faces the surface 741$a$-$i$ side of the sheet 741-$i$ disposed as described above. In this state, a user (acting subject) touches the contact object 320 and performs an operation for changing a relative positional relation between the surface 310$a$ (first surface) and the surface 321 (second surface) and/or an action for changing the relative positional relation between the surface 310$a$ and the surface 321 while keeping a region ρ (here, ρ∈{311, . . . , 314}) of the base object 310 and the surface 321 (second surface) close to each other. The magnitude of bumpy feeling perceived by the user from the contact object 320 is denoted as μ1(ρ). In this case, the magnitude of bumpy feeling of each region satisfies the relation of Formula (4) below.

$$\mu1(312) > \mu1(311) > \mu1(313) \approx \mu1(314) \quad (4)$$

Here, μ1(311), μ1(312), μ1(313), and μ1(314) represent the magnitudes of bumpy feeling perceived by the user when the contact object 320 moves through the paths P1-P2, P2-P3, P3-P4, and P4-P5 respectively.

A relation of magnitude of bumpy feeling is expressed by a relation of maximum values of shearing stress received by a user from the contact object 320, obtaining Formula (5) below.

$$\Lambda1(312) > \Lambda1(311) > \Lambda1(313) \approx \Lambda1(314) \quad (5)$$

Here, the maximum value of shearing stress is expressed as Λ1(ρ), the shearing stress being received by a user from the contact object 320 when the user touches the contact object 320 and performs the operation for changing the relative positional relation between the surface 310$a$ and the surface 321 and/or the action for changing the relative positional relation between the surface 310$a$ and the surface 321 while keeping the region ρ of the base object 310 and the surface 321 close to each other. Further, Λ1(311), Λ1(312), Λ1(313), and Λ1(314) represent the maximum values of shearing stress received by a user when the contact object 320 moves through the paths P1-P2, P2-P3, P3-P4, and P4-P5 respectively.

<<Case where Sheet 742-$i$ and Contact Object 330 are Layered on Surface 310$a$ Side of Base Object 310 and Contact Object 330 is Moved>>

If the sheet 742-$i$ (second sheet) is layered on the surface 310$a$ (first surface) side of the base object 310, regions 7421-$i$ to 7424-$i$ of the sheet 742-$i$ are respectively layered on the regions 311 to 314 of the base object 310. Here, the other surface (back surface of the surface 742$a$-$i$) side of the sheet 742-$i$ is allowed to face the surface 310$a$ side of the base object 310. The path P1-P2 passing through the points P1 and P2 is positioned in the region 7421-$i$, the path P2-P3 passing through the points P2 and P3 is positioned in the region 7422-$i$, the path P3-P4 passing through the points P3 and P4 is positioned in the region 7423-$i$, and the path P4-P5 passing through the points P4 and P5 is positioned in the region 7424-$i$.

The contact object 330 (second contact object) is disposed such that the surface 331 side thereof faces the surface 742$a$-$i$ side of the sheet 742-$i$ disposed as described above. In this state, a user touches the contact object 330 and performs an operation for changing a relative positional relation between the surface 310$a$ (first surface) and the surface 331 (third surface) and/or an action for changing the relative positional relation between the surface 310$a$ and the surface 331 while keeping the region ρ (here, ρ∈{311, ... , 314}) of the base object 310 and the surface 331 (third surface) close to each other. The magnitude of bumpy feeling perceived by the user from the contact object 330 is denoted as $\mu2(\rho)$. In this case, the magnitude of bumpy feeling of each region satisfies the relation of Formula (6) below.

$$\mu2(311) > \mu2(312) > \mu2(313) > \mu2(314) \qquad (6)$$

Here, $\mu2(311)$, $\mu2(312)$, $\mu2(313)$, and $\mu2(314)$ represent the magnitude of bumpy feeling perceived by the user when the contact object 330 moves through the paths P1-P2, P2-P3, P3-P4, and P4-P5 respectively.

A relation of magnitude of bumpy feeling is expressed by a relation of maximum values of shearing stress received by a user from the contact object 330, obtaining Formula (7) below.

$$\Lambda2(311) > \Lambda2(312) > \Lambda2(313) > \Lambda2(314) \qquad (7)$$

Here, the maximum value of shearing stress is expressed as $\Lambda2(\rho)$, the shearing stress being received by a user from the contact object 330 when the user touches the contact object 330 and performs the operation for changing the relative positional relation between the surface 310a and the surface 331 and/or the action for changing the relative positional relation between the surface 310a and the surface 331 while keeping the region ρ of the base object 310 and the surface 331 close to each other. Further, $\Lambda2(311)$, $\Lambda2(312)$, $\Lambda2(313)$, and $\Lambda2(314)$ represent the maximum values of shearing stress received by a user when the contact object 330 moves through the paths P1-P2, P2-P3, P3-P4, and P4-P5 respectively.

As understood in comparison between Formula (4) and Formula (5), a user perceives different bumpy feeling from the contact objects 320 and 330 even though the contact object 320 and the contact object 330 move on the identical path P1-P5 on the base object 310. Further, a magnitude relation ($\mu1(311) < \mu1(312)$) in the magnitude of bumpy feeling obtained when the contact object 320 moves in the regions 311 and 312 (paths P1-P2 and P2-P3) is inversed to a magnitude relation in the magnitude of bumpy feeling obtained when the contact object 330 moves in the regions 311 and 312 (paths P1-P2 and P2-P3). The same applies to a magnitude relation in the maximum value of shearing stress. Thus, bumpy feeling perceived by a user can be changed in a non-linear manner depending on whether to use the contact object 320 or the contact object 330 even when the contact objects 320 and 330 are moved through the identical path on the identical base object 310.

Modification 3 of Third Embodiment

The "base object", the "first sheet", and the "second sheet" may be bundled in a booklet form. That is, a part of the "first sheet" and a part of the "second sheet" may be attached to a part of the "base sheet" including the "base object". Accordingly, when the "first sheet" is layered on the "first surface" side of the "base object", a relative position of the "first sheet" with respect to the "base object" goes within a predetermined range; and when the "second sheet" is layered on the "first surface" side of the "base object", a relative position of the "second sheet" with respect to the "base object" goes within a predetermined range. Thus, the "first pattern" of the "first sheet" and the "second pattern" of the "second sheet" can be positioned on desired positions on the "first surface" of the "base object". Books are applications of such a configuration. Such a "book" includes the "base object" as a cover and/or pages thereof, and includes the "first sheet" provided with the "first pattern" which is a "first drawing" and the "second sheet" provided with the "second pattern" which is a "second drawing" different from the "first drawing" as pages respectively. That is, this "book" (1) includes the "base object", which includes the "first surface" which is preliminarily magnetized with the "first texture" including S-pole regions and N-pole regions, as a cover and/or pages thereof, and (2) includes the "first sheet" that is provided with the "first pattern", which is the visually-recognizable "first drawing", and is to be layered on the "first surface side" of the "base object", and the "second sheet" that is provided with the visually-recognizable "second pattern", which is the "second drawing" different from the "first drawing", and is to be layered on the "first surface" side of the "base object", as pages respectively. In such a case, a "third drawing" corresponding to the "first drawing" of the "book" is provided on the "first contact object" and a "fourth drawing" corresponding to the "second drawing" of the "book" is provided on the "second contact object". That is, the "first contact object" includes the "second surface". The "second surface" is preliminarily magnetized with the "second texture" including S-pole regions and N-pole regions. Further, the "first contact object" is provided with the "third drawing" corresponding to the "first drawing" of the "book". The "third drawing" is provided on a position of the "first contact object" other than the "second surface", for example (a back surface of the "second surface", for example). Further, the "second contact object" includes the "third surface". The "third surface" is preliminarily magnetized with a third texture that includes S-pole regions and N-pole regions and is different from the "second texture". Further, the "second contact object" is provided with the "fourth drawing" corresponding to the "second drawing" of the "book". The "fourth drawing" is provided on a position of the "first contact object" other than the "third surface", for example (a back surface of the "third surface", for example). The "book" is used together with the "first contact object" and the "second contact object" as described above, being enabled to function as the "force sense presenting object".

A specific example of the present modification is described below with reference to the accompanying drawings.

Figure 25:
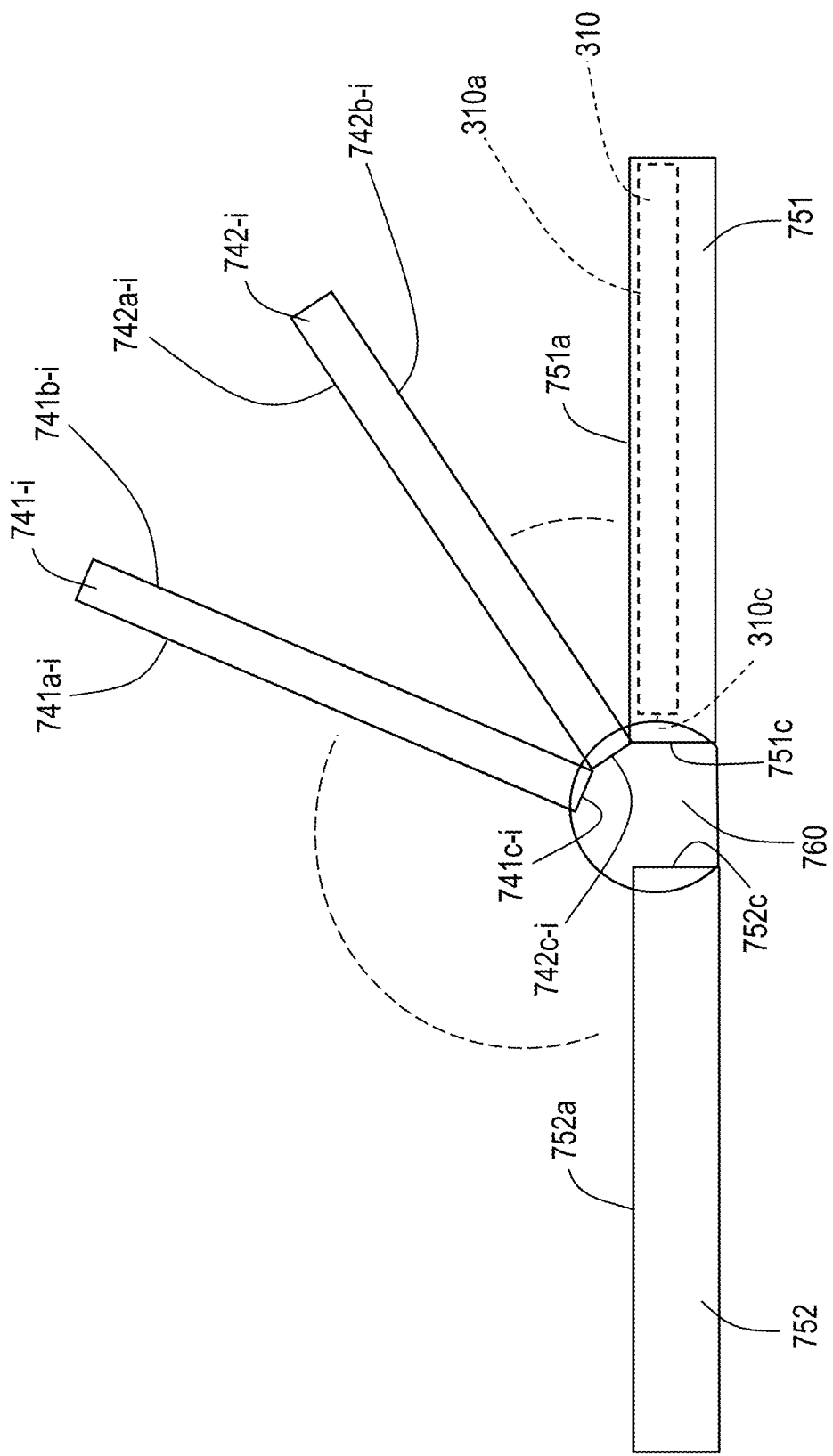
FIG. 25 is a conceptual diagram illustrating a configuration in which a base sheet including a base object and sheets which are to be layered on the base object are bound.

As illustrated in FIG. 25, the "force sense presenting object" according to the present modification includes a book that includes at least a cover 751 (base sheet) including the above-described base object 310 (FIG. 19), a cover 752, the above-described sheet 741-i (first sheet) (FIG. 23), the sheet 742-i (second sheet) (FIG. 24), and an attachment part 760. The "force sense presenting object" according to the present modification further includes at least the "first contact object" (FIG. 20A and FIG. 20B) and the "second contact object" (FIG. 20C and FIG. 20D) that are associated with the book of FIG. 25. The covers 751 and 752 are sheets made of a nonmagnetic body such as paper and synthetic resin. Here, i=1, . . . , K holds and K is an integer which is 1 or greater.

The book illustrated in FIG. 25, and the first contact object and the second contact object which are associated with this book may be sold in a pair of the book and an appendix of the book so as to be purchased by a user; the book, and the first contact object and the second contact object which are associated with this book may be separately sold to be purchased by a user; or the first contact object and the second contact object may be freely distributed as a sales promotion tool of the book and only the book may be sold to be purchased by a user, for example. The book illustrated in FIG. 25 may be a picture book for infants and children, for example, and the first sheet and the second sheet may include letters and so on as well as drawings which are visually-recognizable patterns. These points are also applicable to each modification of the third embodiment described below.

All of the base object 310, the covers 751 and 752, and the sheets 741-i and 742-i according to the present modification have a substantially rectangular planar shape. The base object 310 is incorporated in the cover 751 and a relative position of the base object 310 with respect to the cover 751 is fixed. The surface 310a of the base object 310 is substantially parallel to an inner surface 751a of the cover 751 and one side 310c of the base object 310 is substantially parallel to one side 751c of the cover 751.

Each of one side 751c side of the cover 751, one side 752c side of the cover 752, one side 741c-i side of the sheet 741-i, and one side 742c-i side of the sheet 742-i is attached to the attachment part 760. Accordingly, a part of the sheet 741-i and a part of the sheet 742-i are attached to a part of the cover 751 including the base object 310, via the attachment part 760. The attachment part 760 may be a binding tool of a binder, a binding thread, a wire, or a wireless binding sheet. That is, one side 751c side of the cover 751, one side 752c side of the cover 752, one side 741c-i side of the sheet 741-i, and one side 742c-i side of the sheet 742-i may be bound by the attachment part 760 which is a binding tool or may be bound by the attachment part 760 which is a thread, a wire, or a sheet. One side 741c-i side of the sheet 741-i and one side 742c-i side of the sheet 742-i may be fixed on one side 751c side of the cover 751 or does not have to be fixed there. However, relative positions of one side 741c-i side of the sheet 741-i and one side 742c-i side of the sheet 742-i with respect to one side 751c side of the cover 751 need to be within a predetermined range. In a similar manner, relative positions of one side 741c-i side of the sheet 741-i and one side 742c-i side of the sheet 742-i with respect to one side 752c side of the cover 752 need to be within a predetermined range.

In the present modification, the surface 741a-i side of the sheet 741-i is disposed on the surface 752a side of the cover 752, the surface 742a-i side of the sheet 742-i is disposed on the other surface 741b-i side of the sheet 741-i, and the surface 751a side of the cover 751 is disposed on the other surface 742b-i of the sheet 742-i. That is, when the cover 751, the cover 752, the sheet 741-i, and the sheet 742-i are all layered, the surface 741a-i side of the sheet 741-i is disposed on the surface 752a side of the cover 752, the surface 742a-i side of the sheet 742-i is disposed on the other surface 741b-i side of the sheet 741-i, and the surface 751a side of the cover 751 is disposed on the other surface 742b-i of the sheet 742-i.

At least a part of the sheet 741-i and the sheet 742-i can be layered on the surface 751a side of the cover 751 and layered on the surface 752a side of the cover 752. Here, one side 741c-i of the sheet 741-i and one side 742c-i of the sheet 742-i are supported by the attachment part 760. Therefore, when the sheet 741-i is layered on the surface 751a side of the cover 751 and the sheet 741-i (first sheet) is thus layered on the surface 310a (first surface) side of the base object 310, a relative position of the sheet 741-i with respect to the base object 310 is within a predetermined range. For example, when the sheet 741-i is layered on the surface 751a side of the cover 751, the relative position of the sheet 741-i with respect to the base object 310 is constantly the same (predetermined position). In a similar manner, when the sheet 742-i is layered on the surface 751a side of the cover 751 and the sheet 742-i (second sheet) is thus layered on the surface 310a (first surface) side of the base object 310, a relative position of the sheet 742-i with respect to the base object 310 is within a predetermined range. For example, when the sheet 742-i is layered on the surface 751a side of the cover 751, the relative position of the sheet 742-i with respect to the base object 310 is constantly the same (predetermined position). Accordingly, the sheet 741-i and the sheet 742-i can be easily layered on a desired position on the base object 310.

According to the present modification, for example, when an infant or a child who is a user opens a certain page among a plurality of pages included in a picture book (book), he/she selects a contact object corresponding to a drawing (pattern) of the page from a plurality of contact objects, superimposes the contact object on the drawing of the page, and operates the contact object along a path drawn in the drawing of the page, being able to perceive bumpy feeling corresponding to the path drawn in the drawing. These points are applied also to each modification of the third embodiment described below.

Modification 4 of Third Embodiment

The "base object", a "second base object", the "first sheet", and the "second sheet" may be bundled in a booklet form. Here, the "second base object" includes a "fourth surface". The "fourth surface" includes S-pole regions and N-pole regions and is preliminarily magnetized with a "fourth texture". The "fourth texture" and the "first texture" may be the same as each other or different from each other. One surface of the "first sheet" is provided with a "first pattern" and the other surface of the "first sheet" is provided with a visually recognizable "third pattern". The "third pattern" and the "first pattern" may be the same as each other or different from each other. One surface of the "second sheet" is provided with the "second pattern" and the other surface of the "second sheet" is provided with a visually recognizable "fourth pattern". The "fourth pattern" and the "second pattern" may be the same as each other or different from each other. A part of the "first sheet" and a part of the "second sheet" are attached to a part of the "base sheet" including the "base object" and further attached to a part of a "second base sheet" including the "second base object". One surface of the "first sheet" and one surface of the "second sheet" are disposed on the "fourth surface" side of the "second base object" and the other surface of the "first sheet" and the other surface of the "second sheet" are disposed on the "first surface" side of the "base object". In such a configuration, when the "first sheet" is layered on the "first surface" side of the "base object", a relative position of the "first sheet" with respect to the "base object" goes within a predetermined range; and when the "second sheet" is layered on the "first surface" side of the "base object", a relative position of the "second sheet" with respect to the "base object" goes within a predetermined range. In a similar manner, when the "first sheet" is layered on the "fourth surface" side of the "second base object", a relative position of the "first sheet" with respect to the "second base object" goes within a predetermined range; and when the "second sheet" is layered on the "fourth surface" side of the "second base object", a relative position of the "second sheet" with respect to the "second base object" goes within a predetermined range. Thus, the "first pattern" of the "first sheet" and the "second pattern" of the "second sheet" can be positioned on desired positions on the "first surface" of the "base object". In a similar manner, the "third pattern" of the "first sheet" and the "fourth pattern" of the "second sheet" can be positioned on desired positions on the "fourth surface" of the "second base object".

Preferably, bumpy feeling perceived by the "acting subject" from the "first contact object" when performing the "third action" and bumpy feeling perceived from the "second contact object" when performing the "fourth action" are different from each other. In other words, the way of change in shearing stress received by the "acting subject" from the "first contact object" when performing the "third action" and the way of change in shearing stress received by the "acting subject" from the "second contact object" when performing the "fourth action" are different from each other. Here, the "third action" means an action that the "acting subject" touches the "first contact object" and performs an operation for changing a relative positional relation between the "fourth surface" and the "second surface" and/or an action for changing the relative positional relation between the "fourth surface" and the "second surface" while keeping the "fourth surface" and the "second surface" close to each other when the "first sheet" is layered on the "fourth surface" side of the "second base object". The "fourth action" means an action that the "acting subject" touches the "second contact object" and performs an operation for changing a relative positional relation between the "fourth surface" and the "third surface" and/or an action for changing the relative positional relation between the "fourth surface" and the "third surface" while keeping the "fourth surface" and the "third surface" close to each other when the "second sheet" is layered on the "fourth surface" side of the "second base object".

Bumpy feeling perceived by the "acting subject" from the "first contact object" when performing the above-described "first action" and bumpy feeling perceived from the "first contact object" when performing the "third action" may be different from each other. In other words, the way of change in shearing stress received by the "acting subject" from the "first contact object" when performing the above-described "first action" and the way of change in shearing stress received from the "first contact object" when performing the "third action" may be different from each other. In a similar manner, bumpy feeling perceived by the "acting subject" from the "second contact object" when performing the above-described "second action" and bumpy feeling perceived from the "second contact object" when performing the "fourth action" may be different from each other. In other words, the way of change in shearing stress received by the "acting subject" from the "second contact object" when performing the above-described "second action" and the way of change in shearing stress received from the "second contact object" when performing the "fourth action" may be different from each other.

A specific example of the present modification is described below with reference to the accompanying drawings.

Figure 26:
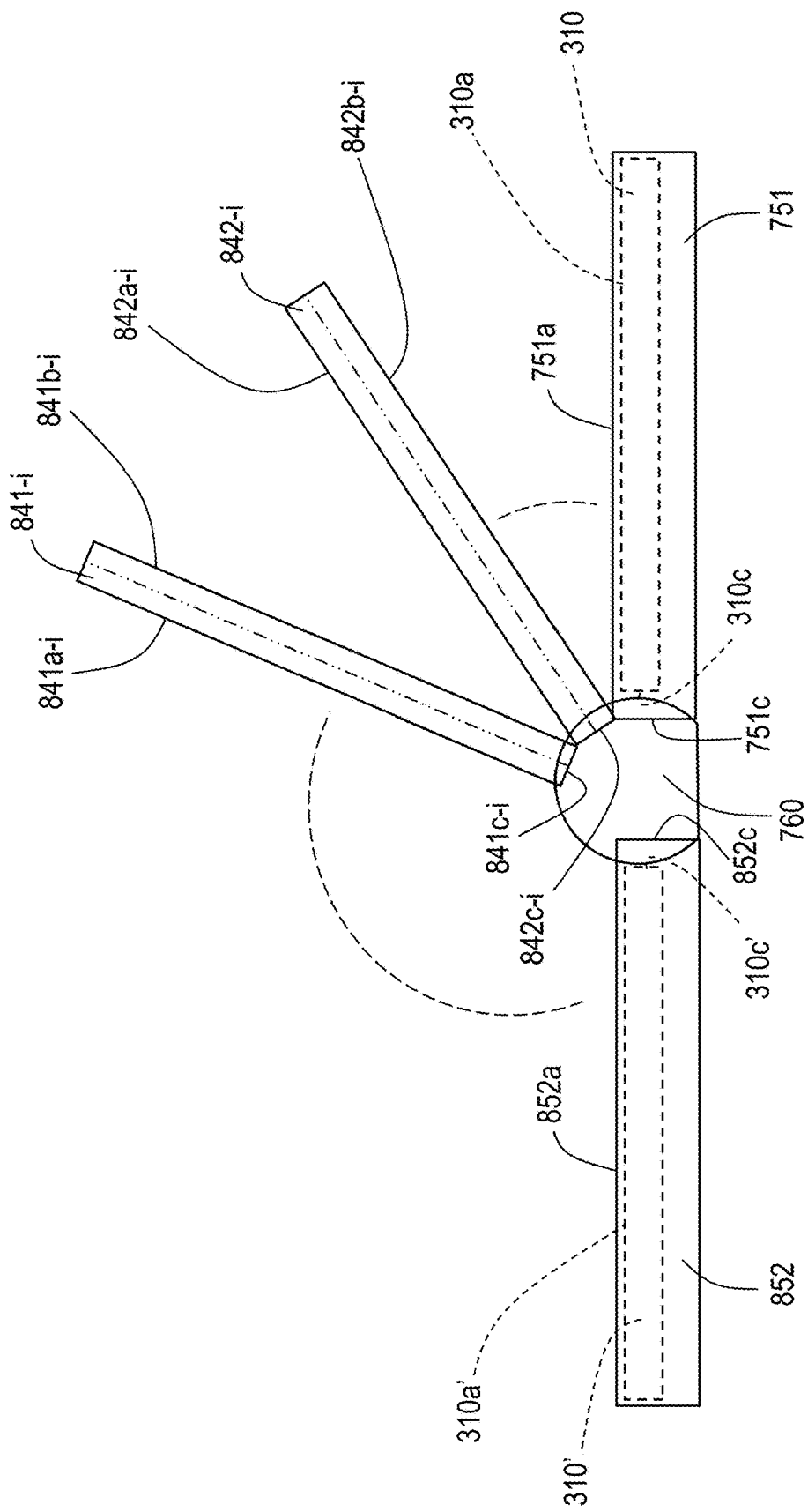
FIG. 26 is a conceptual diagram illustrating a configuration in which a base sheet including a base object, a second base sheet including a second base object, sheets to be layered on the base object and the second base object are bound.

As illustrated in FIG. 26, the "force sense presenting object" according to the present modification includes a book that includes the cover 751 (base sheet) including the above-described base object 310 (FIG. 19), a cover 852 (second base sheet) including the above-described base object 310' (second base object) (FIG. 21A), a sheet 841-$i$ (first sheet), a sheet 842-$i$ (second sheet), and the attachment part 760. The "force sense presenting object" according to the present modification further includes at least the "first contact object" (FIG. 20A and FIG. 20B) and the "second contact object" (FIG. 20C and FIG. 20D) that are associated with the book of FIG. 26. The cover 852 is a sheet made of a nonmagnetic body such as paper and synthetic resin. Here, i=1, . . . , K holds and K is an integer which is 1 or greater.

The base object 310' according to the present modification includes the surface 310$a$' (fourth surface). The surface 310$a$' is preliminarily magnetized with texture (fourth texture) which includes S-pole regions and N-pole regions and is different from the texture (first texture) magnetizing the surface 310$a$ of the base object 310. A visually-recognizable pattern (first pattern) (FIG. 23, for example) is provided on one surface 841$a$-$i$ of the sheet 841-$i$, and a visually-recognizable pattern (third pattern) is provided on the other surface 841$b$-$i$ of the sheet 841-$i$. The third pattern is different from the first pattern. A visually-recognizable pattern (second pattern) (FIG. 24, for example) is provided on one surface 842$a$-$i$ of the sheet 842-$i$, and a visually-recognizable fourth pattern is provided oil the other surface 842$b$-$i$ of the sheet 842-$i$. The fourth pattern is different from the second pattern.

All of the base objects 310 and 310', the covers 751 and 852, and the sheets 841-$i$ and 842-$i$ have a substantially rectangular planar shape. The base object 310' is incorporated in the cover 852 and a relative position of the base object 310' with respect to the cover 852 is fixed. The surface 310$a$' of the base object 310' is substantially parallel to an inner surface 852$a$ of the cover 852 and one side 310$c$' of the base object 310' is substantially parallel to one side 852$c$ of the cover 852.

Each of one side 751$c$ side of the cover 751, one side 852$c$ side of the cover 852, one side 841$c$-$i$ side of the sheet 841-$i$, and one side 842$c$-$i$ side of the sheet 842-$i$ is attached to the attachment part 760. Accordingly, a part of the sheet 841-$i$ and a part of the sheet 842-$i$ are attached to a part of the cover 751 including the base object 310, via the attachment part 760. Further, a part of the sheet 841-$i$ and a part of the sheet 842-$i$ are attached to a part of the cover 852 including the base object 310', via the attachment part 760. One side 841$c$-$i$ side of the sheet 841-$i$ and one side 842$c$-$i$ side of the sheet 842-$i$ may be fixed on one side 751$c$ side of the cover 751 or do not have to be fixed there. In a similar manner, one side 841$c$-$i$ side of the sheet 841-$i$ and one side 842$c$-$i$ side of the sheet 842-$i$ may be fixed on one side 852$c$ side of the cover 852 or do not have to be fixed there. However, relative positions of one side 841$c$-$i$ side of the sheet 841-$i$ and one side 842$c$-$i$ side of the sheet 842-$i$ with respect to one side 751$c$ side of the cover 751 need to be within a predetermined range. Further, relative positions of one side 841$c$-$i$ side of the sheet 841-$i$ and one side 842$c$-$i$ side of the sheet 842-$i$ with respect to one side 852$c$ side of the cover 852 need to be within a predetermined range.

In the present modification, the surface 841$a$-$i$ side of the sheet 841-$i$ is disposed on the surface 852$a$ side of the cover 852, the surface 842$a$-$i$ side of the sheet 842-$i$ is disposed on the other surface 841$b$-$i$ side of the sheet 841-$i$, and the surface 751$a$ side of the cover 751 is disposed on the other surface 842$b$-$i$ of the sheet 842-$i$. That is, when the cover 751, the cover 852, the sheet 841-$i$, and the sheet 842-$i$ are all layered, the surface 841$a$-$i$ side of the sheet 841-$i$ is disposed on the surface 852$a$ side of the cover 852, the surface 842$a$-$i$ side of the sheet 842-$i$ is disposed on the other surface 841$b$-$i$ side of the sheet 841-$i$, and the surface 751$a$ side of the cover 751 is disposed on the other surface 842$b$-$i$ of the sheet 842-$i$.

At least a part of the sheet 841-$i$ and the sheet 842-$i$ can be layered on the surface 751$a$ side of the cover 751 and layered on the surface 852$a$ side of the cover 852. Here, one side 841$c$-$i$ of the sheet 841-$i$ and one side 842$c$-$i$ of the sheet 842-$i$ are supported by the attachment part 760. Therefore, when the sheet 841-*i* is layered on the surface 751*a* side of the cover 751 and the sheet 841-*i* (first sheet) is thus layered on the surface 310*a* (first surface) side of the base object 310, a relative position of the sheet 841-*i* with respect to the base object 310 is within a predetermined range. For example, when the sheet 841-*i* is layered on the surface 751*a* side of the cover 751, the relative position of the sheet 841-*i* with respect to the base object 310 is constantly the same (predetermined position). In a similar manner, when the sheet 842-*i* is layered on the surface 751*a* side of the cover 751 and the sheet 842-*i* (second sheet) is thus layered on the surface 310*a* (first surface) side of the base object 310, a relative position of the sheet 842-*i* with respect to the base object 310 is within a predetermined range. For example, when the sheet 842-*i* is layered on the surface 751*a* side of the cover 751, the relative position of the sheet 842-*i* with respect to the base object 310 is constantly the same (predetermined position). Further, when the sheet 841-*i* is layered on the surface 852*a* side of the cover 852 and the sheet 841-*i* (first sheet) is thus layered on the surface 310*a'* (fourth surface) side of the base object 310', a relative position of the sheet 841-*i* with respect to the base object 310' is within a predetermined range. For example, when the sheet 841-*i* is layered on the surface 852*a* side of the cover 852, the relative position of the sheet 841-*i* with respect to the base object 310' is constantly the same (predetermined position). In a similar manner, when the sheet 842-*i* is layered on the surface 852*a* side of the cover 852 and the sheet 842-*i* (second sheet) is thus layered on the surface 310*a'* (fourth surface) side of the base object 310', a relative position of the sheet 842-*i* with respect to the base object 310' is within a predetermined range. For example, when the sheet 842-*i* is layered on the surface 852*a* side of the cover 852, the relative position of the sheet 842-*i* with respect to the base object 310' is constantly the same (predetermined position). Thus, the sheet 841-*i* and the sheet 842-*i* can be easily layered on desired positions on the base objects 310 and 310'.

Modification 5 of Third Embodiment

Modification 3 and Modification 4 of the third embodiment have described the example in which the number of "first sheets" and the number of "second sheets" are the same as each other. However, the number of "first sheets" and the number of "second sheets" may be different from each other.

Modification 6 of Third Embodiment

Further, force sense may be presented by using a permanent magnet having strong magnetic force such as a ferrite magnet and a neodymium magnet. For example, a "first permanent magnet" having stronger magnetic force than that of the "base object" may be provided and a "second permanent magnet" having stronger magnetic force than that of a magnetic sheet may be provided as well as the magnetic sheet only to either one of the "first contact object" or the "second contact object". If the above-described operation and/or action using the "first contact object" are/is performed when the "second permanent magnet" is provided only to the "first contact object", for example, a user perceives not only the above-described bumpy feeling but also force sense based on attractive force or repulsive force between the "first permanent magnet" and the "second permanent magnet". On the other hand, if the above-described operation and/or action using the "second contact object" are/is performed in this case, a user perceives only the above-described bumpy feeling. In an inverted manner, if the above-described operation and/or action using the "second contact object" are/is performed when the "second permanent magnet" is provided only to the "second contact object", a user perceives not only the above-described bumpy feeling but also force sense based on attractive force or repulsive force between the "first permanent magnet" and the "second permanent magnet". On the other hand, if the above-described operation and/or action using the "first contact object" are/is performed in this case, a user perceives only the above-described bumpy feeling.

A specific example of the present modification is described below with reference to the accompanying drawings.

Figure 27:
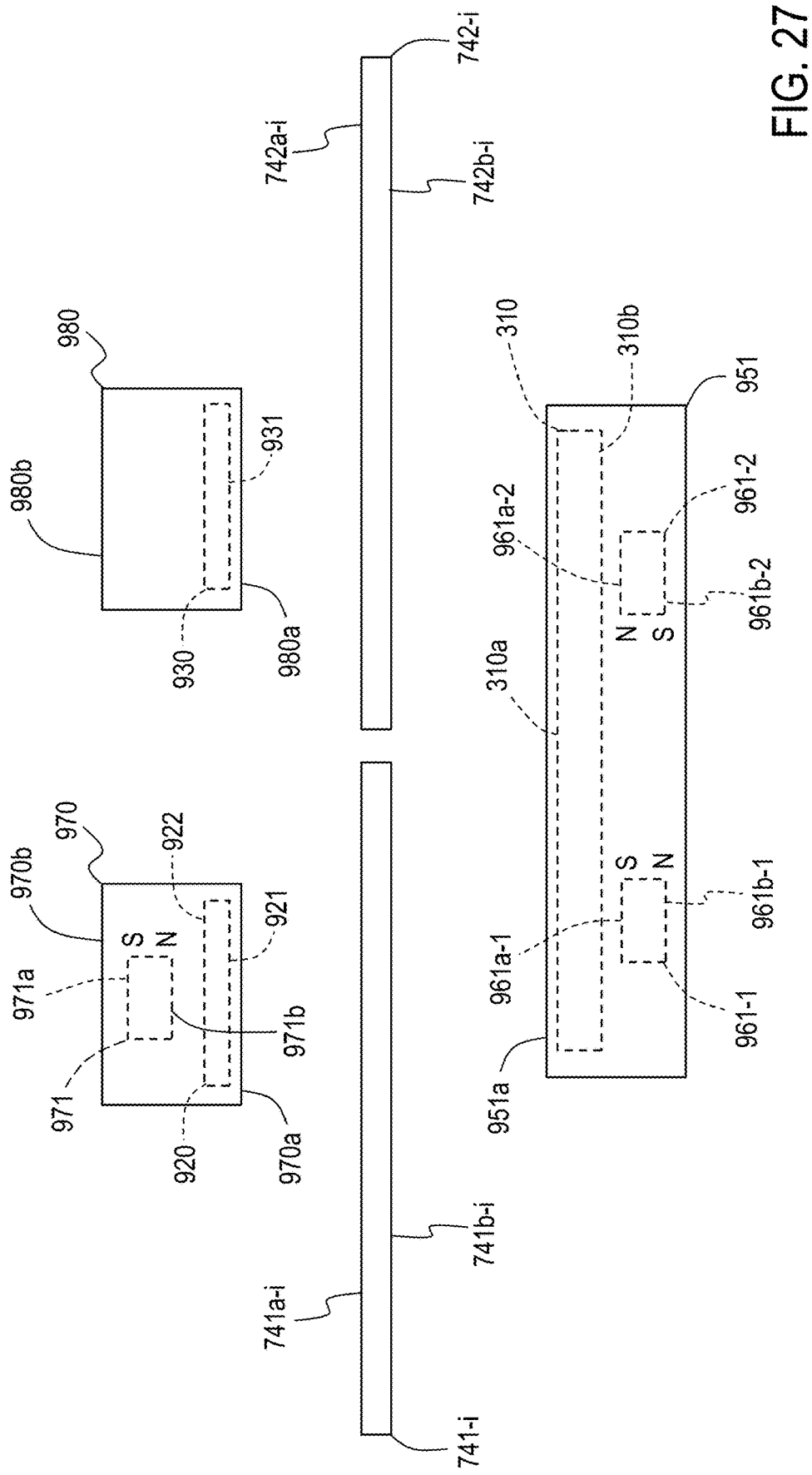
FIG. 27 is a conceptual diagram illustrating a configuration in which a permanent magnet having strong magnetic force is provided on a base object side and a permanent magnet having strong magnetic force is provided only on one of two contact objects.

A "force sense presenting object" illustrated in FIG. 27 includes a base part 951, the above-described sheet 741-*i* (first sheet) (FIG. 23, for example) and sheet 742-*i* (second sheet) (FIG. 24, for example), a first contact object 970, and a second contact object 980.

The base part 951 incorporates the above-described base object 310 (FIG. 19) and permanent magnets 961-1 and 961-2 (first permanent magnets). The base part 951 has a plate surface 951*a*, and the base object 310 is fixed so that one surface 310*a* thereof is substantially parallel to this plate surface 951*a*. The permanent magnets 961-1 and 961-2 are fixed on the other surface 310*b* side of the base object 310. The magnetic force of the permanent magnets 961-1 and 961-2 is stronger than the magnetic force of the base object 310. The permanent magnets 961-1 and 961-2 are a ferrite magnet or a neodymium magnet, for example. In this example, an S-pole side end portion 961*a*-1 of the permanent magnet 961-1 faces the surface 310*b* side of the base object 310 and an N-pole side end portion 961*b*-1 faces the opposite side. Further, an N-pole side end portion 961*a*-2 of the permanent magnet 961-2 faces the surface 310*b* side of the base object 310 and an S-pole side end portion 961*b*-2 faces the opposite side.

The first contact object 970 incorporates a magnetic sheet 920 similar to that of the above-described contact object 320 (FIG. 20A and FIG. 20B) and a permanent magnet 971 (second permanent magnet). One surface 921 (second surface) of the magnetic sheet 920 is preliminarily magnetized with a texture (second texture) which is the same as that on one surface 321 of the above-described contact object 320. The first contact object 970 has a plate surface 970*a*, and the surface 921 of the magnetic sheet 920 is fixed so as to be substantially parallel to this plate surface 970*a*. The permanent magnet 971 is fixed on the other surface 922 side of the magnetic sheet 920. The magnetic force of the permanent magnet 971 is stronger than the magnetic force of the magnetic sheet 920. The permanent magnet 971 is a ferrite magnet or a neodymium magnet, for example. In this example, an N-pole side end portion 971*b* of the permanent magnet 971 faces the surface 922 side of the magnetic sheet 920 and an S-pole side end portion 971*a* faces the opposite side. The first contact object 970 has a plate surface 970*b* on the opposite side of the plate surface 970*a*. An image (a drawing or a picture of a snow boarder, for example) is drawn on the plate surface 970*b*.

The second contact object 980 incorporates a magnetic sheet 930 similar to the above-described contact object 330 (FIG. 20C and FIG. 20D). One surface 931 (third surface) of the magnetic sheet 930 is preliminarily magnetized with a texture (third texture) which is the same as that on one surface 331 of the above-described contact object 330. The second contact object 980 has a plate surface 980*a*, and the surface 931 of the magnetic sheet 930 is fixed so as to be substantially parallel to this plate surface 980a. The second contact object 980 does not include any permanent magnet other than the magnetic sheet 930. The second contact object 980 has the plate surface 980b on the opposite side to the plate surface 980a. An image (a drawing or a picture of a car, for example) is drawn on the plate surface 980b.

When the sheet 741-i (first sheet) is layered on the plate surface 951a side of the base part 951, the plate surface 970a of the first contact object 970 is further layered on the sheet 741-i. The surface 741b-i side of the sheet 741-i is allowed to face the plate surface 951a side and the surface 741a-i side of the sheet 741-i is allowed to face the plate surface 970a side of the first contact object 970. Accordingly, the sheet 741-i is layered on the surface 310a side of the base object 310 and further, the surface 921 side of the magnetic sheet 920 is layered on the surface 741a-i side of the sheet 741-i. A user touches the surface 970b of the first contact object 970 with the finger or the like and performs an operation for changing a relative positional relation between the surface 310a (first surface) and the surface 921 (second surface) and/or an action for changing the relative positional relation between the surface 310a (first surface) and the surface 921 (second surface) while keeping the surface 310a (first surface) and the surface 921 (second surface) close to each other. Accordingly, the user perceives bumpy feeling from the first contact object 970. Further, when the permanent magnet 971 comes close to the permanent magnet 961-1 in the process of this operation and/or action, the user perceives force sense that the first contact object 970 is attracted to the permanent magnet 961-1 side, based on magnetic force (attractive force) between the permanent magnet 971 and the permanent magnet 961-1. In addition to this, when the permanent magnet 971 comes close to the permanent magnet 961-2 in the process of this operation and/or action, the user perceives force sense that the first contact object 970 is separated from the permanent magnet 961-2, based on magnetic force (repulsive force) between the permanent magnet 971 and the permanent magnet 962-2. That is, the user perceives not only bumpy feeling but also perceives attractive force and repulsive force depending on a position.

Meanwhile, when the sheet 742-i (second sheet) is layered on the plate surface 951a side of the base part 951, the plate surface 980a of the second contact object 980 is further layered on the sheet 742-i. The surface 742b-i side of the sheet 742-i is allowed to face the plate surface 951a side and the surface 742a-i side of the sheet 742-i is allowed to face the plate surface 980a side of the second contact object 980. Accordingly, the sheet 742-i is layered on the surface 310a side of the base object 310 and further, the surface 931 side of the magnetic sheet 930 is layered on the surface 742a-i side of the sheet 742-i. A user touches the plate surface 980b of the second contact object 980 with the finger or the like and performs an operation for changing a relative positional relation between the surface 310a (first surface) and the surface 931 (third surface) and/or an action for changing the relative positional relation between the surface 310a (first surface) and the surface 931 (third surface) while keeping the surface 310a (first surface) and the surface 931 (third surface) close to each other. Accordingly, the user perceives bumpy feeling from the second contact object 980. However, since the second contact object 980 does not include any permanent magnet other than the magnetic sheet 930, attractive force and repulsive force generated by the permanent magnets 961-1 and 961-2 are not perceived even though the second contact object 980 comes close to the permanent magnets 961-1 and 961-2.

Modification 7 of Third Embodiment

A permanent magnet having strong magnetic force such as a ferrite magnet and a neodymium magnet may be provided to both of the "first contact object" and the "second contact object". That is, the "base object" side may be provided with the "first permanent magnet" having stronger magnetic force than that of the "base object", the "first contact object" may be provided with the "second permanent magnet" having stronger magnetic force than that of a magnetic sheet in addition to the magnetic sheet, and the "second contact object" may be provided with a "third permanent magnet" having stronger magnetic force than that of a magnetic sheet in addition to the magnetic sheet. Directions of magnetic poles of the permanent magnets respectively provided to the "first contact object" and the "second contact object" may be the same as each other or may be opposite to each other. The present modification describes an example in which directions of magnetic poles of permanent magnets respectively provided to the "first contact object" and the "second contact object" are opposite to each other. That is, a magnetic pole of the "second permanent magnet" positioned on the "first surface" side when the "second surface" of the "first contact object" is brought close to the "first surface" of the "base object" is different from a magnetic pole of the "third permanent magnet" positioned on the "first surface" side when the "third surface" of the "second contact object" is brought close to the "first surface", in the present modification. Accordingly, a direction of magnetic force received by the "second permanent magnet" from the "first permanent magnet" when the "second permanent magnet" of the "first contact object" comes close to the "first permanent magnet" on the "base object" side can be made different from a direction of magnetic force received by the "third permanent magnet" from the "first permanent magnet" when the "third permanent magnet" of the "second contact object" comes close to the "first permanent magnet". That is, when the "second permanent magnet" receives attractive force from the "first permanent magnet", the "third permanent magnet" receives repulsive force from the "first permanent magnet". In an inverted manner, when the "second permanent magnet" receives repulsive force from the "first permanent magnet", the "third permanent magnet" receives attractive force from the "first permanent magnet". Accordingly, the "first contact object" and the "second contact object" can present force senses (attractive force or repulsive force) different from each other even on the same position of the "base object" in which the "first permanent magnet" is disposed.

A specific example of the present modification is described below with reference to the accompanying drawings.

Figure 28:
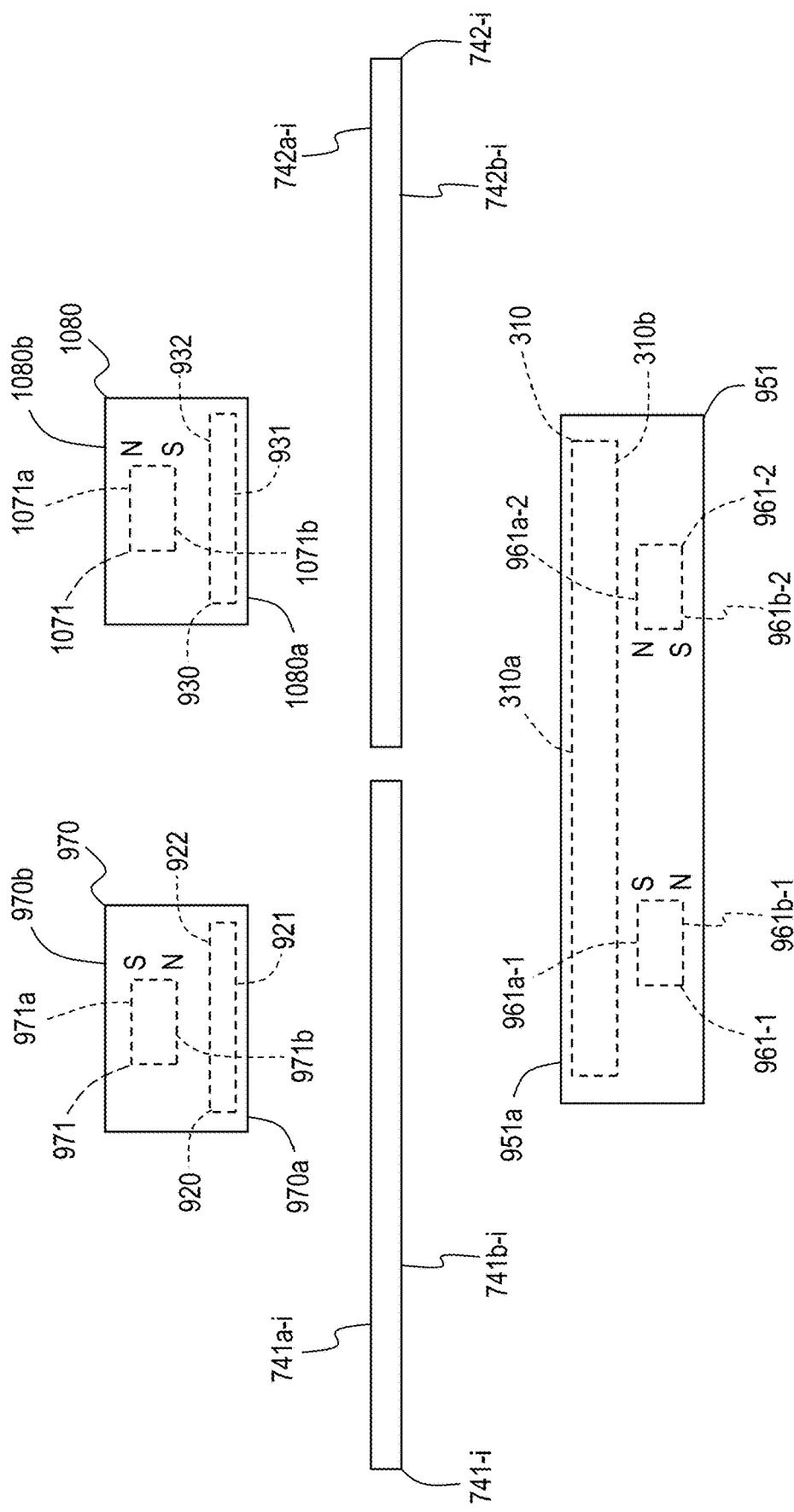
FIG. 28 is a conceptual diagram illustrating a configuration in which a permanent magnet having strong magnetic force is provided on a base object side and permanent magnets whose magnetic poles are in opposite directions are provided to two contact objects.

A "force sense presenting object" illustrated in FIG. 28 includes the base part 951, the sheet 741-i (first sheet), a sheet 742-i (second sheet), the first contact object 970, and a second contact object 1080.

The second contact object 1080 incorporates the magnetic sheet 930 similar to that of the above-described contact object 330 (FIG. 20C and FIG. 20D) and a permanent magnet 1071 (third permanent magnet). One surface 931 (third surface) of the magnetic sheet 930 is preliminarily magnetized with a texture (third texture) which is the same as that on one surface 331 of the above-described contact object 330. The second contact object 1080 has a plate surface 1080a, and the surface 931 of the magnetic sheet 930 is fixed so as to be substantially parallel to this plate surface 1080a. The permanent magnet 1071 is fixed on the other surface 932 side of the magnetic sheet 930. The magnetic force of the permanent magnet 1071 is stronger than the magnetic force of the magnetic sheet 930. The permanent magnet 1071 is a ferrite magnet or a neodymium magnet, for example. In this example, an S-pole side end portion 1071b of the permanent magnet 1071 faces the surface 932 side of the magnetic sheet 930 and an N-pole side end portion 1071a faces the opposite side. That is, a magnetic pole (N) of the permanent magnet 971 (second permanent magnet) which is disposed on the plate surface 951a (first surface) side when the plate surface 970a (second surface) of the first contact object 970 is brought close to the plate surface 951a of the base part 951 (when the plate surface 970a faces the surface 310a side of the base object 310) is different from a magnetic pole (S) of the permanent magnet 1071 (third permanent magnet) which is disposed on the plate surface 951a (first surface) side when the plate surface 1080a (third surface) of the second contact object 1080 is brought close to the plate surface 951a of the base part 951 (when the plate surface 1080a faces the surface 310a side of the base object 310). The second contact object 1080 has a plate surface 1080b on the opposite side of the plate surface 1080a. An image (a drawing or a picture of a car, for example) is drawn on the plate surface 1080b.

When the sheet 741-i (first sheet) is layered on the plate surface 951a side of the base part 951, the first contact object 970 is further layered on the sheet 741-i. The action and force sense perceived in this case are the same as those described in Modification 6 of the third embodiment.

On the other hand, when the sheet 742-i (second sheet) is layered on the plate surface 951a side of the base part 951, the second contact object 1080 is further layered on the sheet 742-i. The surface 742b-i side of the sheet 742-i is allowed to face the plate surface 951a side and the surface 742a-i side of the sheet 742-i is allowed to face the plate surface 1080a side of the second contact object 1080. Accordingly, the sheet 742-i is layered on the surface 310a side of the base object 310 and further, the surface 931 side of the magnetic sheet 930 is layered on the surface 742a-i side of the sheet 742-i. A user touches the plate surface 1080b of the second contact object 1080 with the finger or the like and performs an operation for changing a relative positional relation between the surface 310a (first surface) and the surface 931 (third surface) and/or an action for changing the relative positional relation between the surface 310a (first surface) and the surface 931 (third surface) while keeping the surface 310a (first surface) and the surface 931 (third surface) close to each other. Accordingly, the user perceives bumpy feeling from the second contact object 1080. Further, when the permanent magnet 1071 comes close to the permanent magnet 961-1 in the process of this operation and/or action, the user perceives force sense that the second contact object 1080 is separated from the permanent magnet 961-1 side, based on magnetic force (repulsive force) between the permanent magnet 1071 and the permanent magnet 961-1. In addition to this, when the permanent magnet 1071 comes close to the permanent magnet 961-2 in the process of this operation and/or action, the user perceives force sense that the second contact object 1080 is attracted to the permanent magnet 961-2, based on magnetic force (attractive force) between the permanent magnet 1071 and the permanent magnet 962-2. That is, the user perceives not only bumpy feeling but also perceives attractive force and repulsive force depending on a position.

Here, a direction of magnetic force (attractive force) received by the permanent magnet 971 of the first contact object 970 from the permanent magnet 961-1 when the permanent magnet 971 comes close to the permanent magnet 961-1 is opposite to a direction of magnetic force (repulsive force) received by the permanent magnet 1071 of the second contact object 1080 from the permanent magnet 961-1 when the permanent magnet 1071 comes close to the permanent magnet 961-1. Further, a direction of magnetic force (repulsive force) received by the permanent magnet 971 of the first contact object 970 from the permanent magnet 961-2 when the permanent magnet 971 comes close to the permanent magnet 961-2 is opposite to a direction of magnetic force (attractive force) received by the permanent magnet 1071 of the second contact object 1080 from the permanent magnet 961-2 when the permanent magnet 1071 comes close to the permanent magnet 961-2. Accordingly, force sense perceived when the first contact object 970 and the second contact object 1080 come close to the permanent magnets 961-1 and 961-2 can be changed depending on whether to use the first contact object 970 or the second contact object 1080.

Figure 29:
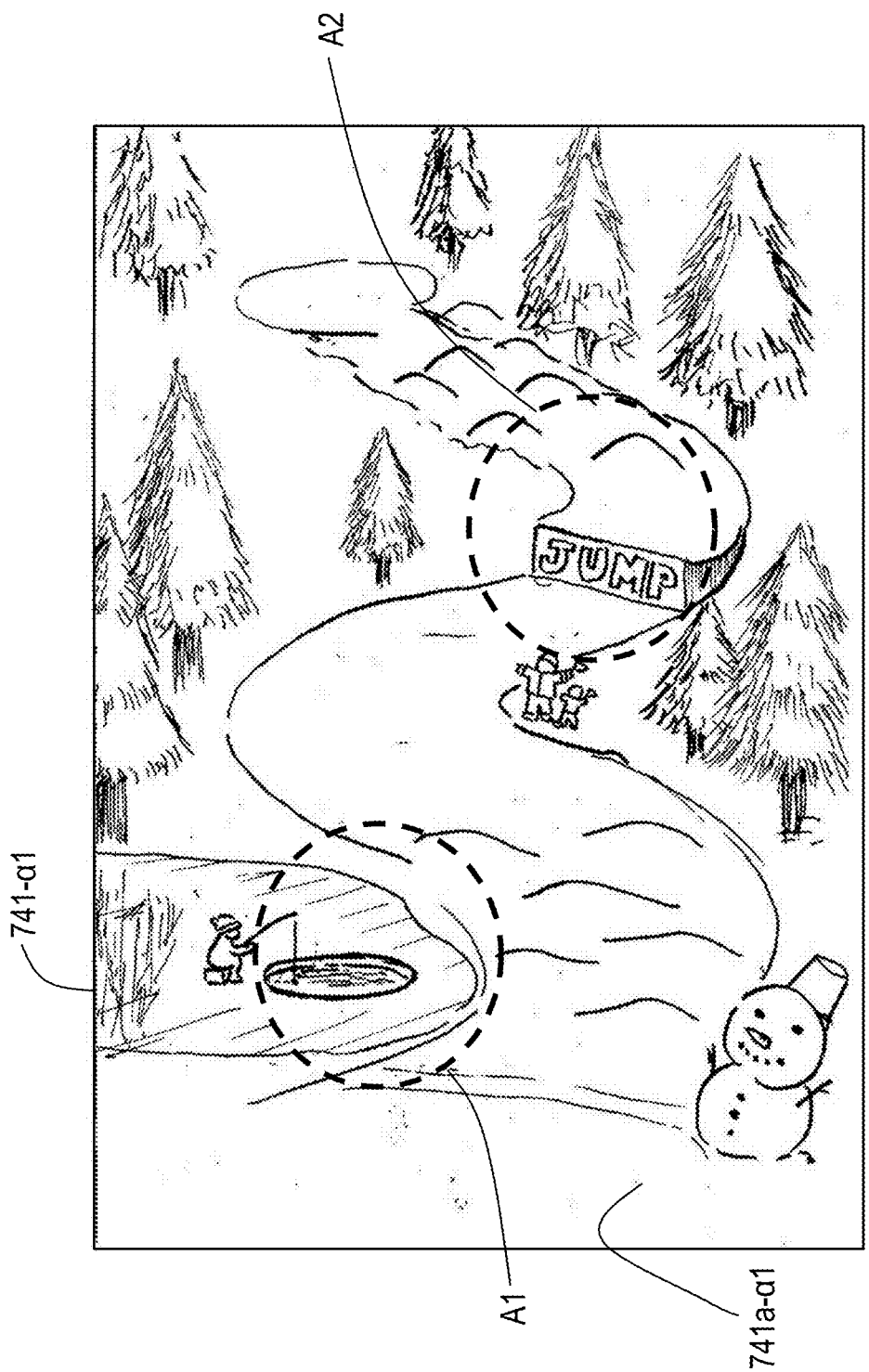
FIG. 29 is a diagram illustrating a sheet to be layered on a base object.
Figure 30:
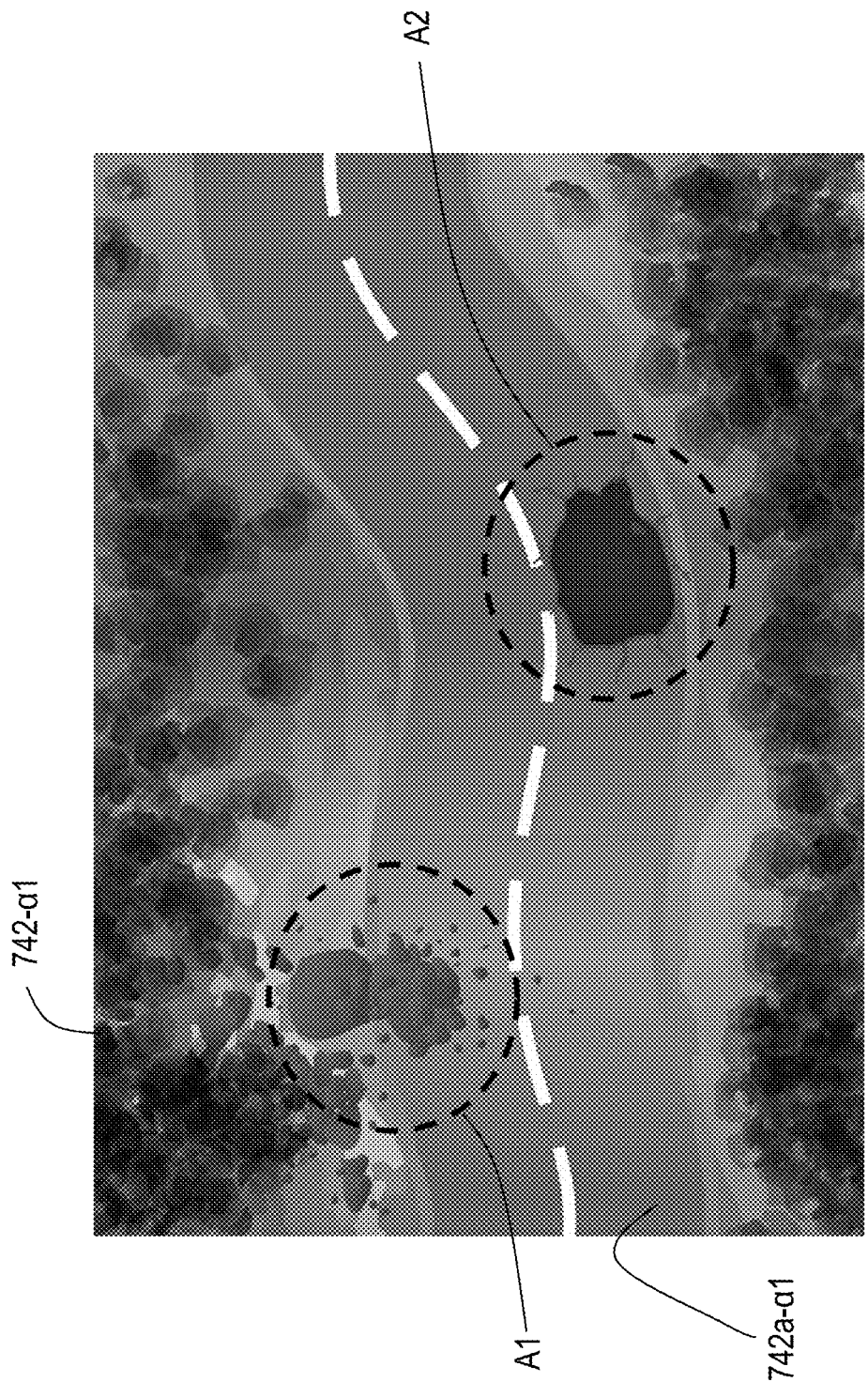
FIG. 30 is a diagram illustrating a sheet to be layered on the base object.

For example, it is assumed that a sheet 741-α1 of FIG. 29 and a sheet 742-α1 of FIG. 30 are used as the sheet 741-i and the sheet 742-i respectively. A "first pattern" as the one in FIG. 29 is drawn on a surface 741a-α1 of the sheet 741-α1 and a "second pattern" as the one in FIG. 30 is drawn on a surface 742a-α1 of the sheet 742-α1. Here, it is assumed that when the sheets 741-α1 and 742-α1 are layered on the plate surface 951a side of the base part 951, the permanent magnet 961-1 is disposed on a position in the region A1 and the permanent magnet 961-2 is disposed on a position in the region A2.

If the first contact object 970 reaches the position in the region A1 when the sheet 741-α1 is layered on the plate surface 951a side of the base part 951 and the first contact object 970 is further layered oil the sheet 741-α1, a user perceives force sense that the first contact object 970 is attracted to the region A1 (force sense of falling of the first contact object 970 into the pond in the drawing), based on attractive force between the permanent magnet 971 and the permanent magnet 961-1. On the other hand, if the first contact object 970 reaches the position in the region A2, a user perceives force sense that the first contact object 970 is separated from the region A2 (force sense of jumping of the first contact object 970 from the jump ramp in the drawing), based on repulsive force between the permanent magnet 971 and the permanent magnet 961-2.

If the second contact object 1080 reaches the position in the region A1 when the sheet 742-α1 is layered on the plate surface 951a side of the base part 951 and the second contact object 1080 is further layered on the sheet 742-α1, a user perceives force sense that the second contact object 1080 is separated from the region A1 (force sense of running of the second contact object 1080 on the rock in the drawing), based on repulsive force between the permanent magnet 1071 and the permanent magnet 961-1. On the other hand, if the second contact object 1080 reaches the position in the region A2, a user perceives force sense that the second contact object 1080 is attracted to the region A2 (force sense of falling of the second contact object 1080 into the hole in the drawing), based on attractive force between the permanent magnet 1071 and the permanent magnet 961-2.

Modification 8 of Third Embodiment

The "second contact object" according to Modification 7 of the third embodiment may be provided with a yoke instead of a permanent magnet having strong magnetic force. That is, the "base object" side may be provided with the "first permanent magnet" having stronger magnetic force than that of the "base object", the "first contact object" may be provided with the "second permanent magnet" having stronger magnetic force than that of a magnetic sheet in addition to the magnetic sheet, and the "second contact object" may be provided with a yoke in addition to a magnetic sheet. Accordingly, force senses different from each other can be presented by the "first contact object" and the "second contact object" even on the same positions of the "base object" on which the "first permanent magnet" is disposed.

A specific example of the present modification is described below with reference to the accompanying drawings.

Figure 31:
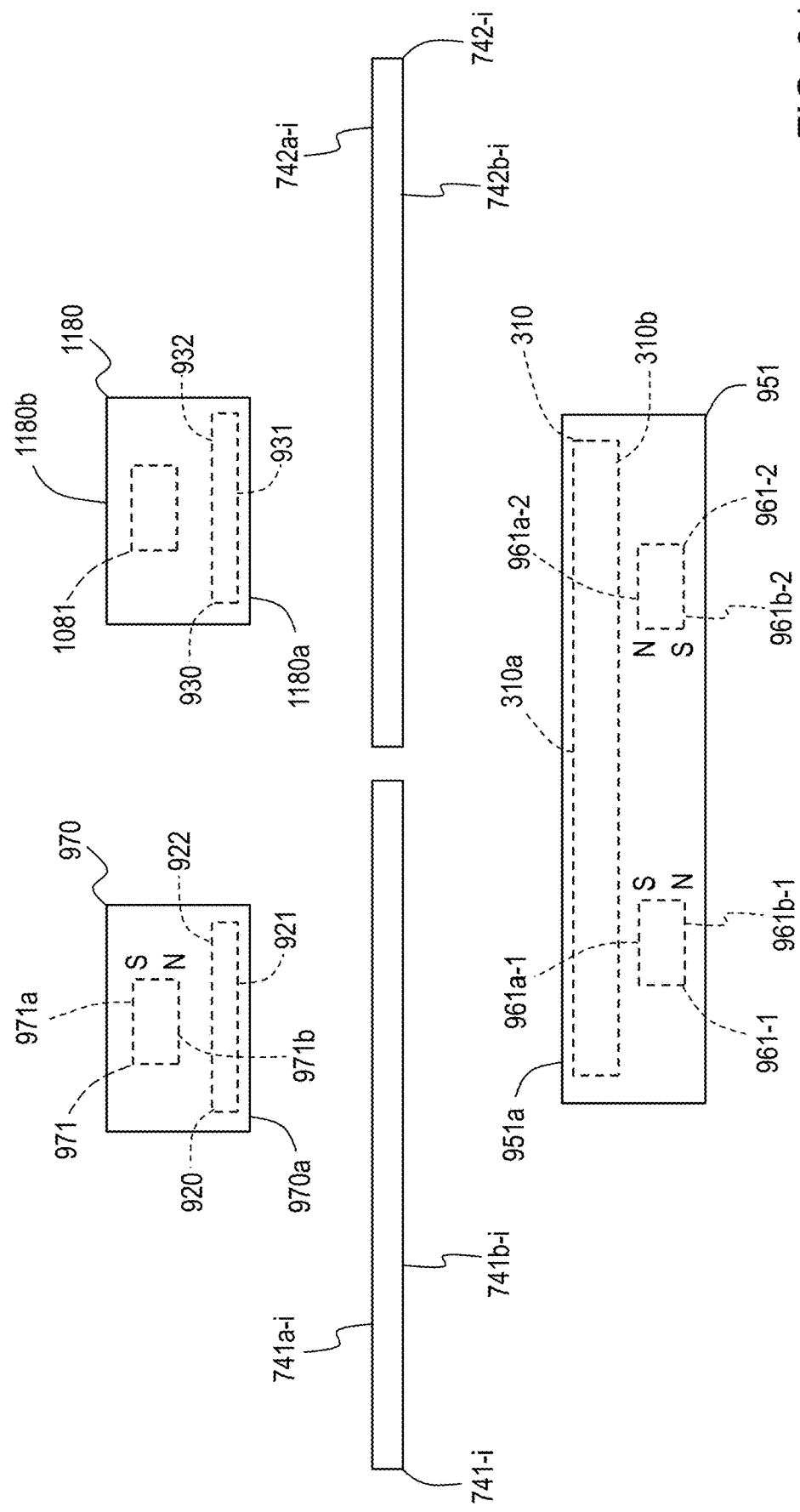
FIG. 31 is a conceptual diagram illustrating a configuration in which a permanent magnet having strong magnetic force is provided on a base object side, a permanent magnet having strong magnetic force is provided to one of two contact objects, and a yoke is provided to the other.

A "force sense presenting object" illustrated in FIG. 31 includes the above-described base part 951, sheet 741-*i* (first sheet), sheet 742-*i* (second sheet), and first contact object 970, and a second contact object 1180.

The difference from the "force sense presenting object" according to Modification 7 of the third embodiment is that the second contact object 1080 is replaced with the second contact object 1180. The second contact object 1180 incorporates the magnetic sheet 930 similar to that of the above-described contact object 330 (FIG. 20C and FIG. 20D) and a yoke 1081. The second contact object 1180 has a plate surface 1180*a*, and the surface 931 of the magnetic sheet 930 is fixed so as to be substantially parallel to this plate surface 1180*a*. The yoke 1081 is fixed on the other surface 932 side of the magnetic sheet 930. The yoke 1081 is made of pure iron, ferrosilicon, and ferritic stainless steel, for example. The second contact object 1180 has a plate surface 1180*b* on the opposite side of the plate surface 1180*a*. An image (a drawing or a picture of a car, for example) is drawn on the plate surface 1180*b*.

When the sheet 741-*i* (first sheet) is layered on the plate surface 951*a* side of the base part 951, the first contact object 970 is further layered on the sheet 741-*i*. The action and force sense perceived in this case are the same as those described in Modification 6 of the third embodiment.

On the other hand, when the sheet 742-*i* (second sheet) is layered on the plate surface 951*a* side of the base part 951, the second contact object 1180 is further layered on the sheet 742-*i*. The surface 742*b*-*i* side of the sheet 742-*i* is allowed to face the plate surface 951*a* side and the surface 742*a*-*i* side of the sheet 742-*i* is allowed to face the plate surface 1180*a* side of the second contact object 1180. Accordingly, the sheet 742-*i* is layered on the surface 310*a* side of the base object 310 and further, the surface 931 side of the magnetic sheet 930 is layered on the surface 742*a*-*i* side of the sheet 742-*i*. A user touches the plate surface 1180*b* of the second contact object 1180 with the finger or the like and performs an operation for changing a relative positional relation between the surface 310*a* (first surface) and the surface 931 (third surface) and/or an action for changing the relative positional relation between the surface 310*a* (first surface) and the surface 931 (third surface) while keeping the surface 310*a* (first surface) and the surface 931 (third surface) close to each other. Accordingly, the user perceives bumpy feeling from the second contact object 1180. Further, when the yoke 1081 comes close to the permanent magnets 961-1 and 961-2 in the process of this operation and/or action, the user perceives force sense that the second contact object 1180 is attracted to the permanent magnets 961-1 and 961-2 in the both cases, based on magnetic attraction force between the yoke 1081 and the permanent magnets 961-1 and 961-2. That is, the user perceives not only bumpy feeling but also perceives attractive force depending on a position.

As described above, a direction of magnetic force (attractive force) received by the permanent magnet 971 of the first contact object 970 from the permanent magnet 961-1 when the permanent magnet 971 comes close to the permanent magnet 961-1 is opposite to a direction of magnetic force (repulsive force) received by the permanent magnet 971 of the first contact object 970 from the permanent magnet 961-2 when the permanent magnet 971 comes close to the permanent magnet 961-2. On the other hand, force received by the yoke 1081 of the second contact object 1180 from the permanent magnet 961-1 and force received by the yoke 1081 from the permanent magnet 961-2 when the yoke 1081 comes close to the permanent magnets 961-1 and 961-2 are the same as each other (both are attractive force).

Modification 9 of Third Embodiment

A magnetism shielding object may be provided on a partial region of a sheet. That is, the "first permanent magnet" having stronger magnetic force than that of a "base object" may be provided to the "base object" side, the "second permanent magnet" having stronger magnetic force than that of the "first contact object" or the "second contact object" may be provided to at least one of the "first contact object" and the "second contact object", and a "magnetism shielding object" may be provided to a partial region of at least one of the "first sheet" and the "second sheet". The "magnetism shielding object" is a yoke, for example. The "second permanent magnet" may be provided to only one of the "first contact object" and the "second contact object" or may be provided to both of the "first contact object" and the "second contact object". The "second permanent magnet" may be provided to one of the "first contact object" and the "second contact object" and the "yoke" may be provided to the other. Accordingly, magnetic force from the "first permanent magnet" is shielded by the "magnetism shielding object" at a partial region. Thus, force sense perceived in the partial region can be discriminated from that in other region. Further, when the "magnetism shielding object" is a yoke, force sense based on magnetic attraction force between the "second permanent magnet" and the "magnetism shielding object" can be presented.

Figure 32:
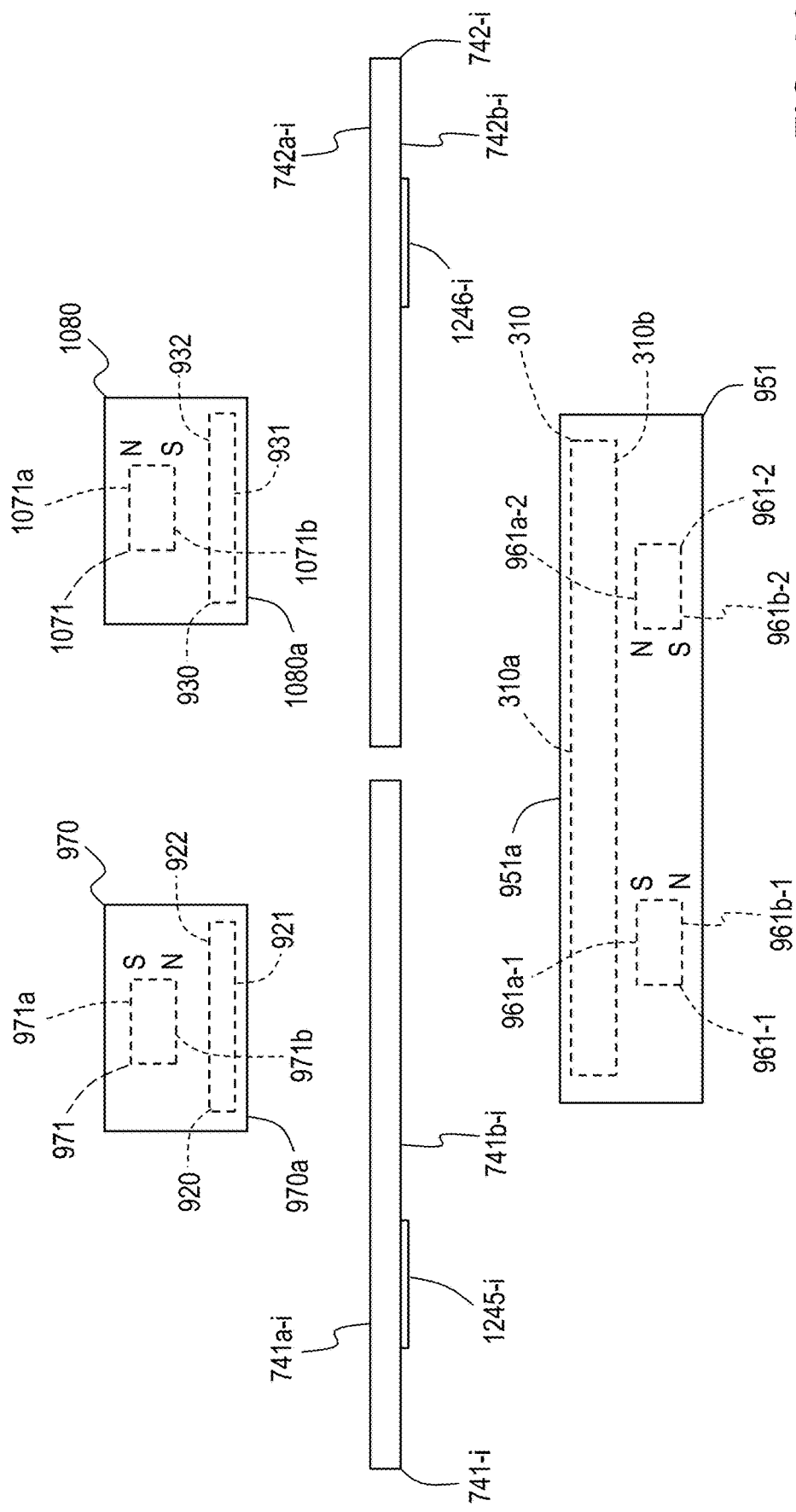
FIG. 32 is a conceptual diagram illustrating a configuration in which a permanent magnet having strong magnetic force is provided on a base object side, a permanent magnet having strong magnetic force is provided to two contact objects, and a magnetism shielding object is provided to sheets.

A specific example of the present modification is described below with reference to the accompanying drawings. An example is shown below in which the "second permanent magnet" whose magnetic force is stronger than that of the "first contact object" and the "second contact object" is provided to the "first contact object" and the "second contact object". A "force sense presenting object" illustrated in FIG. 32 includes the base part 951, the sheet 741-*i* (first sheet), the sheet 742-*i* (second sheet), the first contact object 970, and the second contact object 1080. These configurations follow the description of Modification 7 of the third embodiment. However, in the present modification, one plate surface of a magnetism shielding object 1245-*i* having a plate shape is further fixed on a partial region on the surface 741*b*-*i* side of the sheet 741-*i* and one plate surface of a magnetism shielding object 1246-*i* having a plate shape is further fixed on a partial region on the surface 742*b*-*i* side of the sheet 742-*i*.

When the sheet 741-*i* (first sheet) is layered on the plate surface 951*a* side of the base part 951, the first contact object 970 is further layered on the sheet 741-*i*. The action described in Modification 6 of the third embodiment is performed in this state. Here, force sense perceived when the first contact object 970 is disposed in a region in which magnetic fields of the permanent magnets 961-1 and 961-2 of the base part 951 are not shielded by the magnetism shielding object 1245-*i* follows the description of Modification 6 of the third embodiment. On the other hand, when the first contact object 970 is disposed in a region in which the magnetic field of the permanent magnet 961-1 is shielded by the magnetism shielding object 1245-*i*, force sense based on magnetic force between the permanent magnet 971 and the permanent magnet 961-1 is not perceived or is reduced. In a similar manner, when the first contact object 970 is disposed in a region in which the magnetic field of the permanent magnet 961-2 is shielded by the magnetism shielding object 1245-*i*, force sense based on magnetic force between the permanent magnet 971 and the permanent magnet 961-2 is not perceived or is reduced. Further, when the first contact object 970 is disposed in this region, the above-described bumpy feeling is not perceived or is reduced as well. However, when the magnetism shielding object 1245-*i* is a yoke, force based on magnetic attraction force between the permanent magnet 971 and the magnetism shielding object 1245-*i* is perceived.

When the sheet 742-*i* (second sheet) is layered on the plate surface 951*a* side of the base part 951, the second contact object 1080 is further layered on the sheet 742-*i*. The action described in Modification 7 of the third embodiment is performed in this state. Here, force sense perceived when the second contact object 1080 is disposed in a region in which the magnetic fields of the permanent magnets 961-1 and 961-2 of the base part 951 are not shielded by the magnetism shielding object 1246-*i* follows the description of Modification 7 of the third embodiment. On the other hand, when the second contact object 1080 is disposed in a region in which the magnetic field of the permanent magnet 961-1 is shielded by the magnetism shielding object 1246-*i*, force sense based on magnetic force between the permanent magnet 1071 and the permanent magnet 961-1 is not perceived or is reduced. In a similar manner, when the second contact object 1080 is disposed in a region in which the magnetic field of the permanent magnet 961-2 is shielded by the magnetism shielding object 1246-*i*, force sense based on magnetic force between the permanent magnet 1071 and the permanent magnet 961-2 is not perceived or is reduced. Further, when the second contact object 1080 is disposed in this region, the above-described bumpy feeling is not perceived or is reduced as well. However, when the magnetism shielding object 1246-*i* is a yoke, force based on magnetic attraction force between the permanent magnet 1071 and the magnetism shielding object 1246-*i* is perceived.

Figure 33:
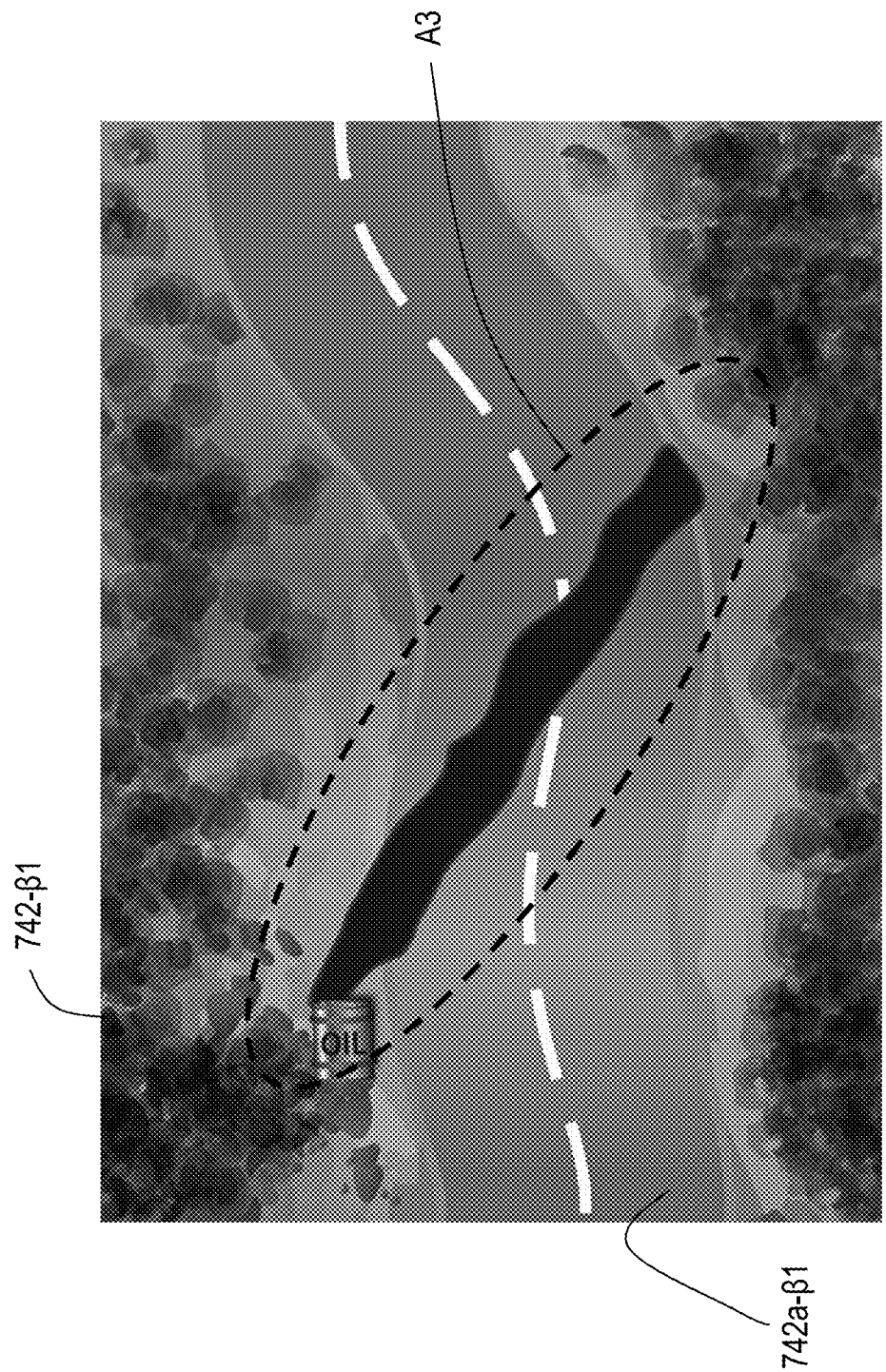
FIG. 33 is a diagram illustrating a sheet to be layered on the base object.

For example, it is assumed that a sheet 742-β1 of FIG. 33 is used as the sheet 742-*i*. A "second pattern" as the one in FIG. 33 is drawn on a surface 742*a*-β1 of the sheet 742-β1. Here, it is assumed that when the sheet 742-β1 is layered on the plate surface 951*a* side of the base part 951, the magnetism shielding object 1246-*i* which is a yoke is disposed on a position in the region A3. It is assumed that the second contact object 1080 reaches the position in the region A3 when the sheet 742-β1 is layered on the plate surface 951*a* side of the base part 951 and the second contact object 1080 is further layered on the sheet 742-β1. At this time, a user perceives magnetic attraction force between the permanent magnet 1071 and the magnetism shielding object 1246-*i*. However, since a magnetic field between the permanent magnet 1071 and the permanent magnets 961-1 and 961-2 is shielded in the region A3, attractive force and repulsive force between these are not perceived or are reduced. Further, the above-described bumpy feeling is not perceived or is reduced as well in the region A3. Accordingly, when the second contact object 1080 is positioned on the region A3, a user perceives force sense as if the second contact object 1080 smoothly slides on the surface 742*a*-β1.

Modification 10 of Third Embodiment

Both of the "first sheet", and the "second sheet" provided with the "magnetism shielding object" may be layered on the "first surface" of the "base object". That is, the "first permanent magnet" having stronger magnetic force than that of the "base object" may be provided to the "base object" side, the "second permanent magnet" having stronger magnetic force than that of the contact object (the "first contact object" or the "second contact object") may be provided to at least one of the "first contact object" and the "second contact object", the "magnetism shielding object" may be provided to a partial region of the "second sheet", and the "first sheet" and the "second sheet" may be layered on the "first surface" side of the "base object". However, the "magnetism shielding object" is interposed between the "first sheet" and the "first permanent magnet". In this case, the "magnetism shielding object" shields a magnetic field of the "first permanent magnet" not only in the partial region of the "second sheet" but also in a partial region of the "first sheet" which is layered on the partial region of the "second sheet".

A specific example of the present modification is described below with reference to the accompanying drawings.

Figure 34:
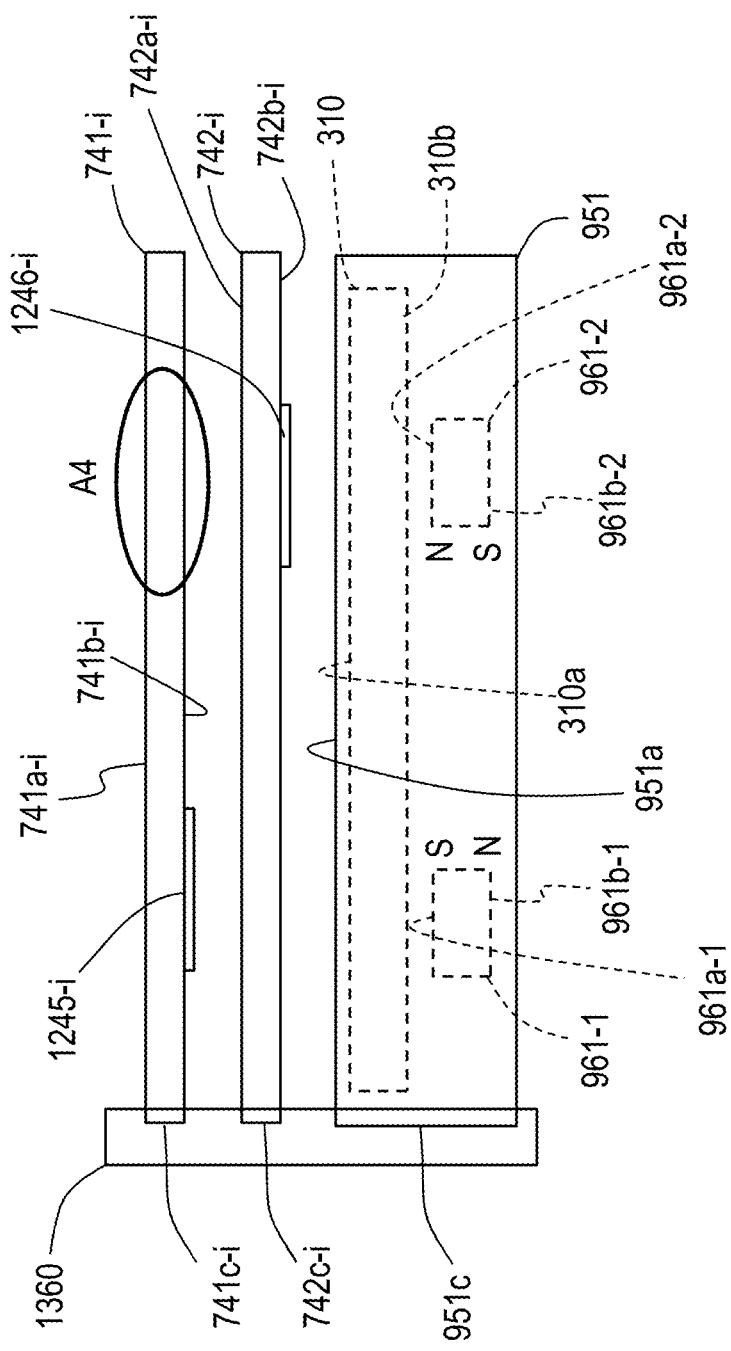
FIG. 34 is a conceptual diagram illustrating a configuration in which a base sheet including a base object and sheets to be layered on the base object are bound, permanent magnets having strong magnetic force is provided to the base object side, and magnetism shielding objects are provided to the sheets.

As illustrated in FIG. 34, the "force sense presenting object" according to the present modification includes a book that includes the base part 951 including the above-described base object 310 and the permanent magnets 961-1 and 961-2, the sheet 741-*i* (first sheet) on which the magnetism shielding object 1245-*i* is provided on a partial region of the surface 741*b*-*i*, the sheet 742-*i* (second sheet) on which the magnetism shielding object 1246-*i* is provided on a partial region of the surface 742*b*-*i*, and an attachment part 1360. Further, the "force sense presenting object" according to the present modification further includes at least the "first contact object" (FIG. 20A and FIG. 20B) and the "second contact object" (FIG. 20C and FIG. 20D) that are associated with the book of FIG. 34. Here, i=1, . . . , K holds and K is an integer which is 1 or greater.

Each of one side 951*c* side of the base part 951, one side 741*c*-*i* side of the sheet 741-*i*, and one side 742*c*-*i* side of the sheet 742-*i* is attached to the attachment part 1360. Accordingly, a part of the sheet 741-*i* and a part of the sheet 742-*i* are attached to a part of the base part 951 via the attachment part 1360. A specific example of the attachment part 1360 is the same as that of the above-described attachment part 760. That is, the sheet 741-*i*, the sheet 742-*i*, and the base part 951 are bundled in a booklet form by the attachment part 1360.

In the present modification, the surface 742*b*-*i* side of the sheet 742-*i* is disposed on the surface 951*a* side of the base part 951 and the surface 741*b*-*i* side of the sheet 741-*i* is disposed on the surface 742*a*-*i* side of the sheet 742-*i*. In this case, magnetic field of the permanent magnet 961-2 is shielded by the magnetism shielding object 1246-*i*. Though a magnetism shielding object is not provided on the region A4 of the sheet 741-*i* which is layered on a region in which the magnetism shielding object 1246-*i* is provided, the magnetic field of the permanent magnet 961-2 does not act on the region A4 either. Accordingly, in the layer illustrated in FIG. 34, an influence of the permanent magnets (permanent magnets 961-1 and 961-2) of the base part 951 is suppressed not only in the region of the sheet 741-*i* in which the magnetism shielding object 1245-*i* is provided but also in the region A4 in which the magnetism shielding object 1245-*i* is not provided. Therefore, when the first contact object 970 is layered on the surface 741*a*-*i* side of the sheet 741-*i*, the first contact object 970 is moved as described above, and then the first contact object 970 reaches the region A4, the influence of the permanent magnet 961-2 is suppressed by the magnetism shielding object 1246-*i*. Thus, force sense similar to that perceived when the magnetism shielding object is provided in the region A4 can be perceived even though a magnetism shielding object is not provided in the region A4.

Modification 11 of Third Embodiment

Not providing a magnetism shielding object to a partial region of the "first sheet" and/or the "second sheet", a "shielding sheet" whose partial region is provided with a magnetism shielding object may be layered on the "first sheet" and the "second sheet". That is, the "first permanent magnet" having stronger magnetic force than that of the "base object" is provided to the "base object" side and the "second permanent magnet" having stronger magnetic force than that of the "first contact object" or the "second contact object" is provided to at least one of the "first contact object" and the "second contact object". A part of the "first sheet", a part of the "second sheet", and a part of the "shielding sheet" are attached to a part of the "base sheet". However, the "shielding sheet" is a sheet whose partial region is provided with a "magnetism shielding object". When the "first sheet" and the "shielding sheet" are layered on the "first surface" side of the "base object", the "magnetism shielding object" is interposed between the "first sheet" and the "first permanent magnet".

A specific example of the present modification is described below with reference to the accompanying drawings.

Figure 35:
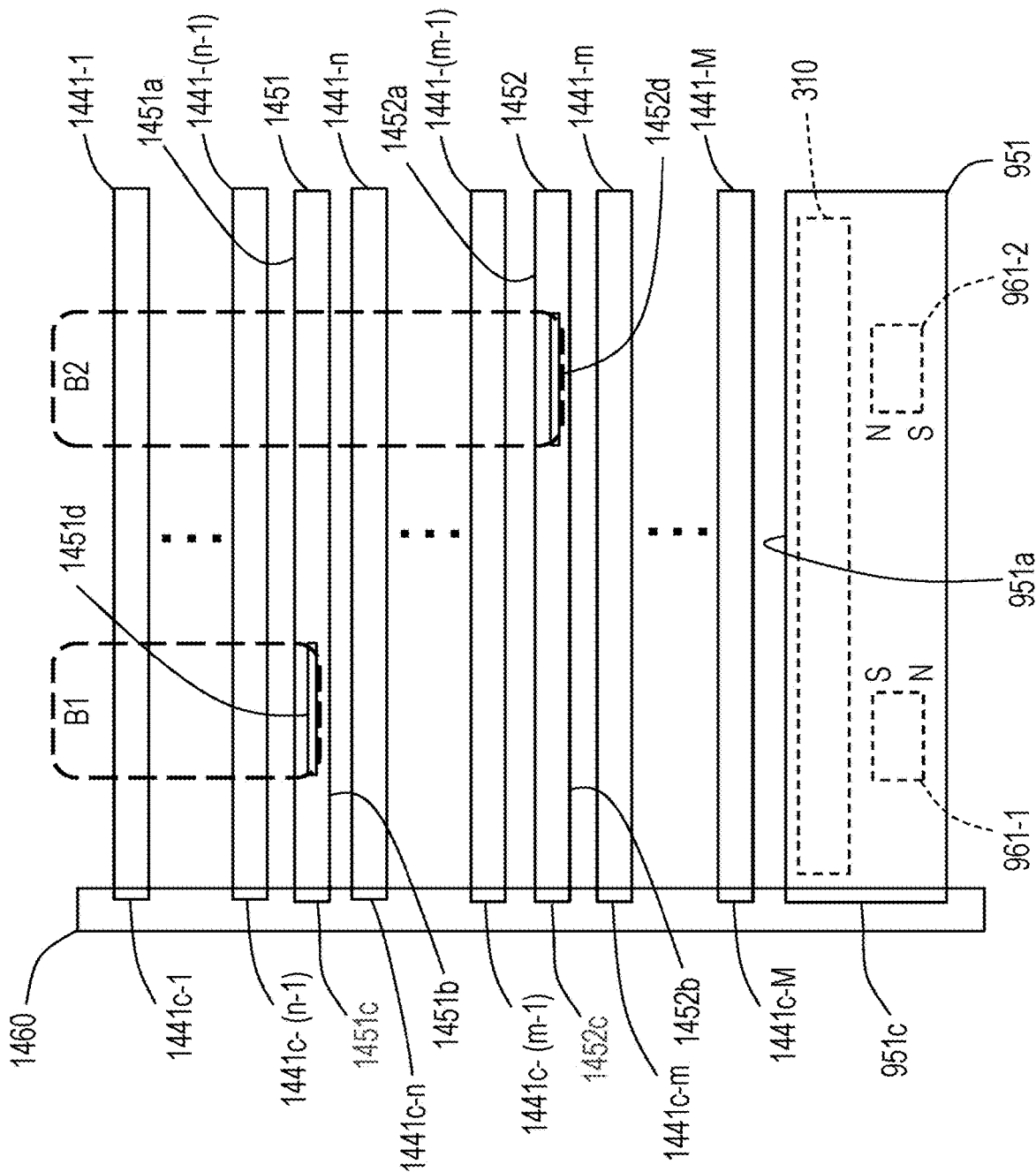
FIG. 35 is a conceptual diagram illustrating a configuration in which a base sheet including a base object, sheets to be layered on the base object, and shielding sheets including a magnetism shielding object are bound and permanent magnets having strong magnetic force is provided to the base object side.

As illustrated in FIG. 35, the "force sense presenting object" according to the present modification includes a book that includes the base part 951 including the above-described base object 310 and permanent magnets 961-1 and 961-2, sheets 1441-*j* (first and second sheets) having the same configuration as the above-described sheets 741-*i* and 742-*i*, a shielding sheet 1451 which incorporates a magnetism shielding object 1451*d* on a partial region thereof, a shielding sheet 1452 which incorporates a magnetism shielding object 1452*d* on a partial region thereof, and an attachment part 1460. Further, the "force sense presenting object" according to the present modification includes at least the "first contact object" (FIG. 20A and FIG. 20B) and the "second contact object" (FIG. 20C and FIG. 20D) that are associated with the book in FIG. 35. Here, j=1, ..., M holds and M is an integer which is 4 or greater.

Each of one side 951*c* side of the base part 951, one side 1441*c*-*j* side of the sheets 1441-*j*, one side 1451*c* of the shielding sheet 1451, and one side 1452*c* of the shielding sheet 1452 is attached to the attachment part 1460. Accordingly, a part of each of the sheets 1441-*j*, a part of the shielding sheet 1451, and a part of the shielding sheet 1452 are attached to a part of the base part 951 via the attachment part 1460. A specific example of the attachment part 1460 is the same as that of the above-described attachment part 760. That is, the base part 951, the sheets 1441-*j*, and the shielding sheets 1451 and 1452 are bundled in a booklet form by the attachment part 1460. However, the sheets 1441-1 to 1441-(*n*−1) (first sheets) can be disposed on one surface 1451*a* side of the shielding sheet 1451. The sheets 1441-*n* to 1441-(*m*−1) (second sheets) can be disposed on the other surface 1451*b* side of the shielding sheet 1451. Further, the sheets 1441-1 to 1441-(*n*−1), the shielding sheet 1451, and the sheets 1441-*n* to 1441-(*m*−1) can be disposed on one surface 1452*a* side of the shielding sheet 1452. The sheet 1441-*m* to 1441-M can be disposed on the other surface 1452*b* side of the shielding sheet 1452. These sheets 1441-1 to 1441-M, the shielding sheet 1451, and the shielding sheet 1452 can be disposed on the surface 951*a* side of the base part 951. Here, 1≤n<m<M holds.

Further, the distance from one side 1451*c* of the shielding sheet 1451 attached to the attachment part 1460 to the magnetism shielding object 1451*d* is different from the distance from one side 1452*c* of the shielding sheet 1452 to the magnetism shielding object 1452*d*. For example, a region obtained by projecting a region of the shielding sheet 1451 on the surface 951*a* of the base part 951 in the state that the shielding sheets 1451 and 1452 are layered on the surface 951*a* side of the base part 951 and a region obtained by projecting a region of the shielding sheet 1452 on the surface 951*a* of the base part 951 in the same state are not overlapped with each other. For example, the magnetism shielding object 1451*d* and the magnetism shielding object 1452*d* are disposed so that the region B1, shielded by the magnetism shielding object 1451*d*, in the magnetic field of the permanent magnet 961-1 is not overlapped with the region B2, shielded by the magnetism shielding object 1452*d*, in the magnetic field of the permanent magnet 961-2.

Modification 12 of Third Embodiment

A range in which magnetic force of the "base object" acts and a range in which magnetic force of the "second base object" acts may be different from each other in a plurality of layered sheets obtained by layering the "base object" and the "second base object" with a plurality of sheets in a booklet form.

That is, the "force sense presenting object" according to the present modification includes the "base sheet" including the above-described "base object", the "second base object", the above-described "first sheet", the above-described "second sheet", a "third sheet", and a "fourth sheet". The "second base object" includes a "fourth surface". The "fourth surface" is preliminarily magnetized with a "fourth texture". The "fourth texture" is a texture including S-pole regions and N-pole regions. The "fourth texture" is different from the "first texture" of the above-described "base object". The "third sheet" is provided with a visually-recognizable "third pattern" and the "fourth sheet" is provided with a visually-recognizable "fourth pattern". The "third pattern" is different from the "fourth pattern". A part of the "first sheet", a part of the "second sheet", a part of the "third sheet", and a part of the "fourth sheet" are attached to a part of the "base sheet" including the "base object". The "third sheet" and the "fourth sheet" are layered on the "fourth surface" side of the "second base object". When the "second base object", the "first sheet", the "second sheet", the "third sheet", and the "fourth sheet" are layered on the "first surface" side of the "base object", the "first sheet" and the "second sheet" are interposed between the "base object" and the "second base object", the "second base object" is interposed between a couple of the "first sheet" and the "second sheet" and a couple of the "third sheet" and the "fourth sheet", magnetic force of the "base object" reaches the "first sheet" and the "second sheet", and magnetic force of the "second base object" reaches the "third sheet" and the "fourth sheet".

In this case, magnetic force of the "first permanent magnet" may reach all of a plurality of sheets layered in a booklet form. That is, the "first permanent magnet" having stronger magnetic force than that of the "base object" may be provided to the "base object" side, and when the "second base object", the "first sheet", the "second sheet", the "third sheet", and the "fourth sheet" are layered on the "first surface" side of the "base object", the magnetic force of the "first permanent magnet" may reach at least the "first sheet", the "second sheet", the "third sheet", and the "fourth sheet".

A specific example of the present modification is described below with reference to the accompanying drawings.

Figure 36:
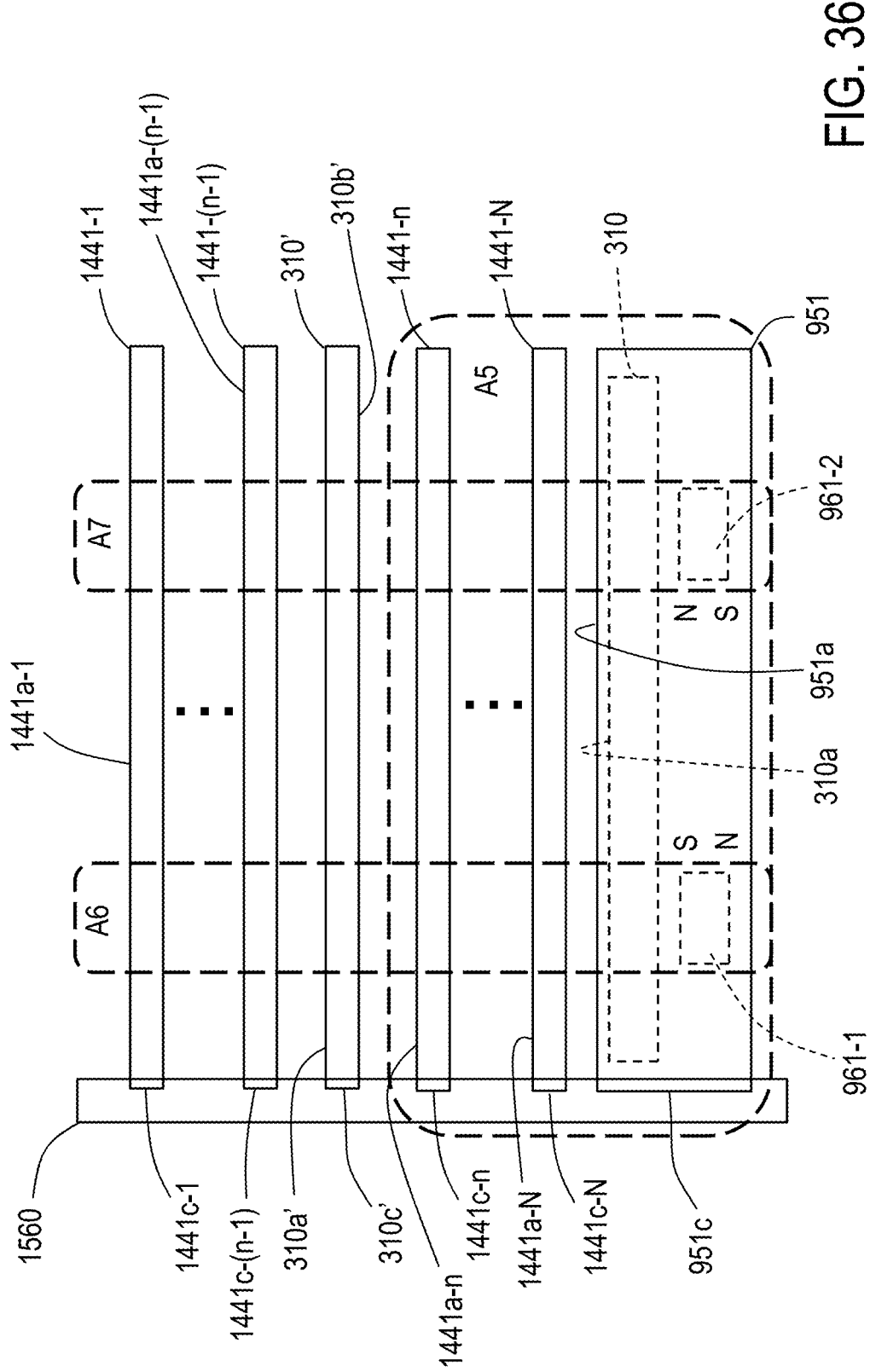
FIG. 36 is a conceptual diagram illustrating a configuration in which a base sheet including a base object, a second base object, and a plurality of sheets are bound and permanent magnets having strong magnetic force are provided to the base object side.

As illustrated in FIG. 36, the "force sense presenting object" according to the present modification includes a book that includes the base part 951 (base sheet) including the above-described base object 310 (FIG. 19) and permanent magnets 961-1 and 961-2, the above-described base object 310' (second base object) (FIG. 21A), the sheets 1441-$j$ (first to fourth sheets) having the same configurations as those of the above-described sheets 741-$i$ and 742-$i$, and an attachment part 1560. Further, the "force sense presenting object" according to the present modification includes at least the "first contact object" (FIG. 20A and FIG. 20B) and the "second contact object" (FIG. 20C and FIG. 20D) that are associated with the book in FIG. 36. Here, $j=1, \ldots, N$ holds and N is an integer which is 4 or greater.

As described above, one surface 310$a'$ (fourth surface) of the base object 310' is preliminarily magnetized with a texture (fourth texture) which includes S-pole regions and N-pole regions and is different from the texture (first texture) magnetizing the surface 310$a$ of the base object 310. A visually-recognizable pattern is drawn on one surface 1441$a$-$j$ of the sheets 1441-$j$. Patterns drawn on respective surfaces 1441$a$-$j$ are different from each other.

Each of one side 951$c$ side of the base part 951, one side 1441$c$-$j$ side of the sheets 1441-$j$, and one side 310$c'$ of the base object 310' is attached to the attachment part 1560. Accordingly, a part of each of the sheets 1441-$j$ and a part of the base object 310' are attached to a part of the base part 951 via the attachment part 1560. A specific example of the attachment part 1560 is the same as that of the above-described attachment part 760. That is, the base part 951, the sheets 1441-$j$, and the base object 310' are bundled in a booklet form by the attachment part 1560. However, the sheets 1441-1 to 1441-($n$–1) (third and fourth sheets) can be layered on one surface 310$a'$ side of the base object 310'. Further, the sheets 1441-$n$ to 1441-N (first and second sheets) can be disposed on the other surface 310$b'$ side of the base object 310' and layered on the surface 310$a$ side of the base object 310.

As illustrated in FIG. 36, when the base object 310' and all of the sheets 1441-$j$ are layered on the surface 310$a$ side of the base object 310, the sheets 1441-$n$ to 1441-N are interposed between the base object 310 and the base object 310'. Further, the base object 310' is interposed between the sheets 1441-$n$ to 1441-N and the sheets 1441-1 to 1441-($n$–1). At this time, magnetic force of the base object 310 (magnetic force of the surface 310$a$ side) reaches the region A5 of the sheets 1441-$n$ to 1441-N. This magnetic force of the base object 310 does not reach the sheets 1441-1 to 1441-($n$–1). Further, magnetic force of the base object 310' (magnetic force of the surface 310$a'$ side) reaches the sheets 1441-1 to 1441-($n$–1).

Accordingly, bumpy feeling perceived by a user can be varied depending on the thickness of the sheets 1441-1 to 1441-N, which are layered on the surface 310$a$ side of the base object 310, even in the use of the same first contact object 970. For example, when the sheets 1441-$n$ to 1441-N are layered on the surface 310$a$ side of the base object 310, the surface 970$a$ side of the first contact object 970 is layered on the surface 1441$a$-$n$ of the sheet 1441-$n$, and then the above-described operation and/or action are/is performed, a user perceives bumpy feeling corresponding to a combination between a magnetization pattern on the surface 310$a$ side of the base object 310 and a magnetization pattern on the surface 921 of the magnetic sheet 920 in the first contact object 970. On the other hand, when the sheets 1441-1 to 1441-N are layered on the surface 310$a$ side of the base object 310, the surface 970$a$ side of the first contact object 970 is layered on the surface 1441$a$-1 of the sheet 1441-1, and then the above-described operation and/or action are/is performed, a user perceives bumpy feeling corresponding to a combination between a magnetization pattern on the surface 310$a'$ side of the base object 310' and the magnetization pattern on the surface 921 of the magnetic sheet 920 in the first contact object 970. Here, mutually-different textures are used as the texture magnetizing the surface 310$a$ side of the base object 310 and the texture magnetizing the surface 310$a'$ side of the base object 310', being able to provide mutually-different bumpy feeling.

Meanwhile, the magnetic force of the permanent magnets 961-1 and 961-2 is stronger than the magnetic force of the base object 310. Accordingly, even when the base object 310' and all of the sheets 1441-$j$ are layered on the surface 310$a$ side of the base object 310 as illustrated in FIG. 36, the magnetic force of the permanent magnets 961-1 and 961-2 can be allowed to reach all of the sheets 1441-$j$ (regions A6 and A7). Even when the thickness of the sheets 1441-1 to 1441-N to be layered on the surface 310$a$ side of the base object 310 is changed so as to vary bumpy feeling perceived by a user as described above, force sense based on the magnetic force between the permanent magnet 971 included in the first contact object 970 and the permanent magnets 961-1 and 961-2 can be perceived.

Modification 13 of Third Embodiment

In Modification 12 of the third embodiment, a magnetism shielding object may be provided in a partial region of at least part of the sheets 1441-1 to 1441-N. Further, a shielding sheet incorporating a magnetism shielding object as well as the sheets 1441-1 to 1441-N may be bundled in a booklet form by the attachment part 1560 as illustrated in Modification 11 of the third embodiment. Books are applications also of such a configuration. Further, the permanent magnets 961-1 and 961-2 illustrated in Modification 11 of the third embodiment may be omitted. That is, the configuration may be replaced to the configuration in which the base part 951 includes the base object 310 but does not include the permanent magnets 961-1 and 961-2. The "force sense presenting object" may include such a "book" or the "book" described in Modification 12 of the third embodiment and only one of the "first contact object" (FIG. 20A and FIG. 20B) and the "second contact object" (FIG. 20C and FIG. 20D) that are associated with the "book". In this case, for example, when an infant or a child who is a user opens a certain page among a plurality of pages included in a picture book (book), he/she superimposes a contact object on a drawing of the page and operates the contact object along a path drawn in the drawing of the page, being able to perceive bumpy feeling corresponding to the path drawn in the drawing. Also, the textures, the positional relations between the positions of the magnetic sheet and the permanent magnet, the position, size, and number of pieces of magnetism shielding objects, the position and number of pieces of shielding sheets, and the like, which are illustrated in each modification of the third embodiment do not limit the present invention.

Fourth Embodiment

The principles of the second embodiment are applied also in a fourth embodiment. The present embodiment describes a "force sense presenting object" which presents bumpy feeling to a user in information input to an input device, in which the principle of the second embodiment is incorporated, without using any electromagnet.

When the input device is a touch screen, the "force sense presenting object" includes a "first object" which is disposed on an input surface of the touch screen and a "second object" which is attached, gripped, or supported by an "acting subject" performing an input operation with respect to the touch screen. The "first object" includes a "first surface", and the "first surface" is preliminarily magnetized with a "first texture" including S-pole regions and N-pole regions. The "second object" includes a "second surface", and the "second surface" is preliminarily magnetized with a "second texture" including S-pole regions and N-pole regions. The "first object" is a magnetic sheet which is disposed with one plate surface thereof facing an input surface side of the touch screen and the "first surface" is the other plate surface of the magnetic sheet, for example. An "acting subject" who performs an input operation with respect to the touch screen having an input surface on which the "first object" is disposed wears, grips, or supports the "second object" and performs an operation for changing a relative positional relation between the "first surface" and the "second surface" and/or an action for changing the relative positional relation between the first surface and the second surface while keeping the "first surface" and the "second surface" in contact with or close to each other. Thus, the input operation with respect to the touch screen is performed and the "acting subject" perceives bumpy feeling. That is, through such an action performed by an "acting subject", the input operation with respect to the touch screen is performed and shearing stress received by the "acting subject" from the second object periodically varies. Accordingly, the "acting subject" perceives bumpy feeling.

When the input device is an input device such as a computer mouse, a "force sense presenting object" includes a "first object" and a "second object". The "first object" includes a "first surface", and the "first surface" is preliminarily magnetized with a "first texture" including S-pole regions and N-pole regions. The "second object" includes a "second surface", and the "second surface" is preliminarily magnetized with a "second texture" including S-pole regions and N-pole regions. The "second object" is attached or provided to the "input device" gripped by an "acting subject". An acting subject who operates the "input device" to which the "second object" is attached or provided performs an operation for changing a relative positional relation between the "first surface" and the "second surface" and/or an action for changing the relative positional relation between the "first surface" and the "second surface" while keeping the "first surface" and the "second surface" in contact with or close to each other. Thus, the input operation with respect to the "input device" is performed and the "acting subject" perceives bumpy feeling. That is, through such an action performed by an "acting subject", the input operation with respect to the input device is performed and shearing stress received by the acting subject from the input device periodically varies. Accordingly, the acting subject perceives bumpy feeling.

Specific examples of the present embodiment are described below with reference to the accompanying drawings.

<Case where Input Device is Touch Screen>

Figure 37:
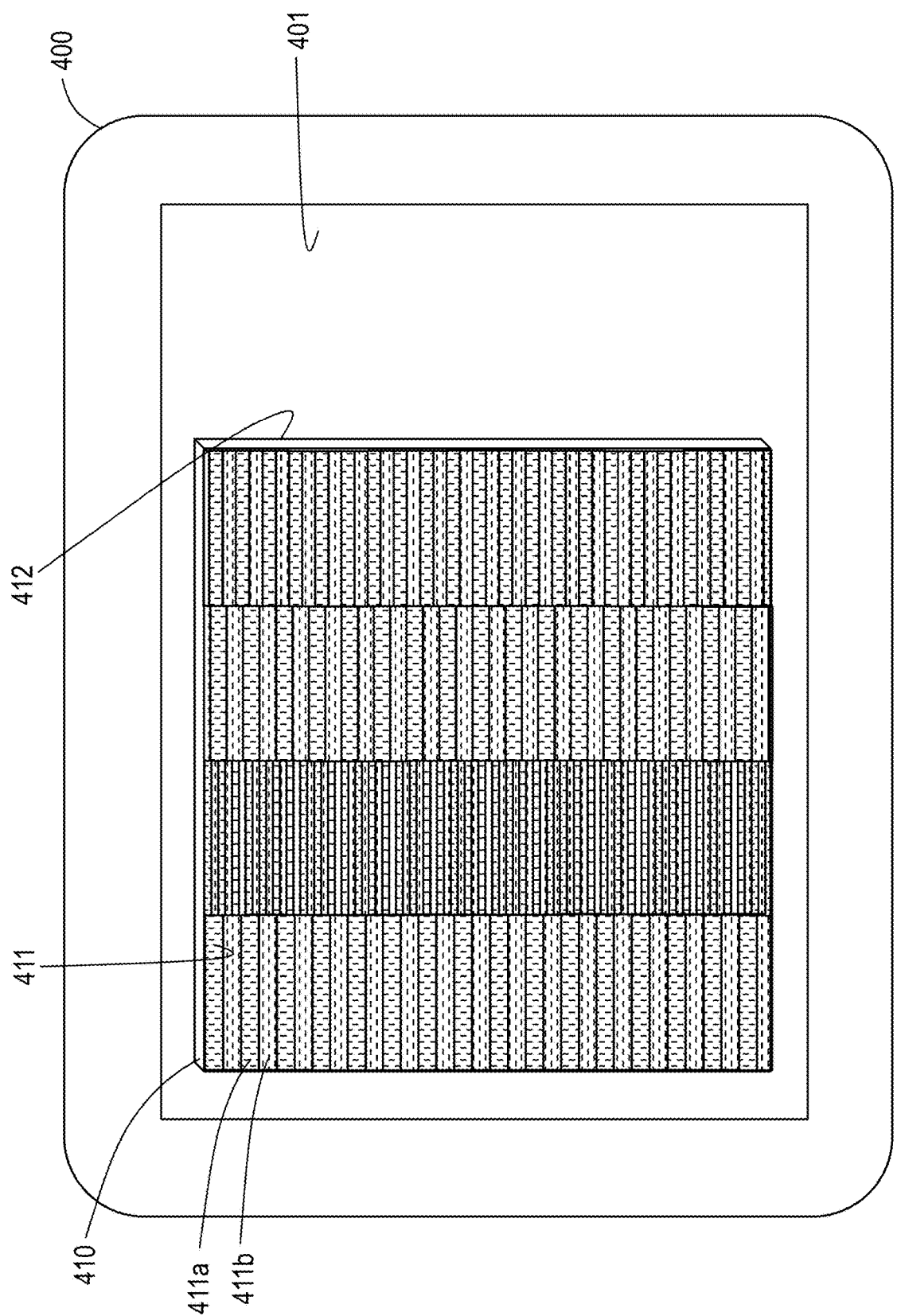
FIG. 37 is a diagram illustrating an input device according to an embodiment.

FIG. 37 and FIG. 38 illustrate an example in which the principle of the second embodiment is incorporated into a touch screen.

As illustrated in FIG. 37, a magnetic sheet 410 which is the "first object" is attached to an input surface (front surface) of a touch screen 401 of an electronic apparatus 400 such as a smartphone and a tablet device. One plate surface 412 of the magnetic sheet 410 is disposed to face an input surface side of the touch screen 401 and the other plate surface 411 (first surface) of the magnetic sheet 410 is preliminarily magnetized with a texture (first texture) including S-pole regions 411a and N-pole regions 411b. Here, the "first texture" may include a plurality of regions whose pitches and patterns (a stripe texture and a checker texture, for example) are mutually different.

A "second object" illustrated in FIG. 38A is a glove 420 which is worn, gripped, or supported by a user and front surfaces 421 (second surface) on pads of fingers of the user are preliminarily magnetized with a texture (second texture) including S-pole regions 421a and N-pole regions 421b. Here, the second texture may include a plurality of regions whose pitches and patterns (a stripe texture and a checker texture, for example) are mutually different. Respective fingers are magnetized with textures whose pitches and patterns are different from each other in FIG. 38A.

A user wears, grips, or supports the glove 420 and rubs the magnetic sheet 410 disposed on the input surface of the touch screen 401 of the electronic apparatus 400 by the texture part including the S-pole regions 421a and the N-pole regions 421b. Accordingly, an operation for changing a relative positional relation between the plate surface 411 (first surface) of the magnetic sheet 410 and the front surface 421 (second surface) on balls of fingers of the glove 420 or/and an action for changing the relative positional relation between the plate surface 411 (first surface) and the front surface 421 (second surface) is/are performed while keeping the plate surface 411 (first surface) and the front surface 421 (second surface) in contact with or close to each other. Thus, the input operation with respect to the touch screen is performed and a user perceives bumpy feeling. An image (a video, a moving image, and a picture image, for example) may be displayed from the touch screen 401 (output device) or sound may be outputted from a speaker (output device) of the electronic apparatus 400 in response to this input operation. Thus, force sense can be presented and presented contents of an image and/or sound can be changed in response to an input operation. In the glove 420 illustrated in FIG. 38A, respective fingers are magnetized with textures whose pitches and patterns are mutually different, realizing perception of different bumpy feeling depending on a finger operating the touch screen 401. Further, when a plurality of regions whose pitches and patterns are mutually different are provided on the plate surface 411 (first surface) of the magnetic sheet 410, a user can be allowed to perceive different bumpy feeling depending on a finger used for operation and a region operated.

A stylus pen 430 illustrated in FIG. 38B and FIG. 38C may be used as the "second object". The stylus pen 430 includes a gripping part 435 having a substantially columnar shape and an end part 436 having a substantially discoid shape. One end of the gripping part 435 is fixed or integrated around the center of one surface 432 of the end part 436. The other surface 431 (second surface) of the end part 436 is preliminarily magnetized with a texture (second texture) including S-pole regions 531a and N-pole regions 531b. A user grips or supports the gripping part 435 of the stylus pen 430 and rubs the magnetic sheet 410 disposed on the input surface of the stylus panel 401 of the electronic apparatus 400 on the surface 431 side of the end part 436. Accordingly, an operation for changing a relative positional relation between the plate surface 411 (first surface) of the magnetic sheet 410 and the surface 431 (second surface) of the end part 436 or/and an action for changing the relative positional relation between the plate surface 411 (first surface) and the surface 431 (second surface) is/are performed while keeping the plate surface 411 (first surface) and the surface 431 (second surface) in contact with or close to each other. Thus, the input operation with respect to the touch screen 401 is performed and a user perceives bumpy feeling. An image may be displayed from the touch screen 401 (output device) or sound may be outputted from the speaker (output device) of the electronic apparatus 400 in response to this input operation. Accordingly, force sense can be presented and presented contents of an image and/or sound can be changed in response to an input operation.

Figure 39:
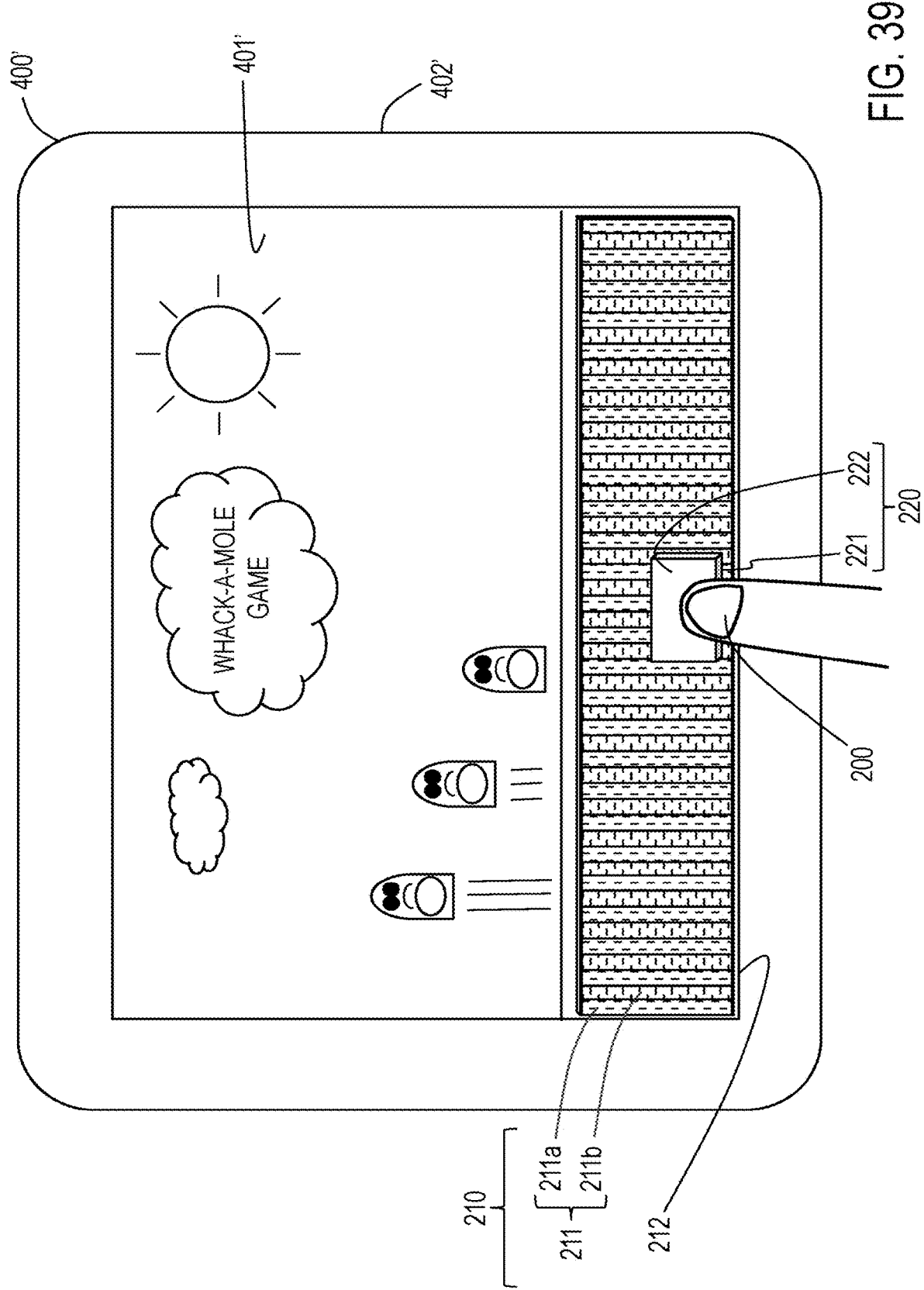
FIG. 39 is a diagram illustrating an input device according to the embodiment.

FIG. 39 illustrates an example in which force sense is presented and game contents are presented in response to an input operation. As illustrated in FIG. 39, the magnetic sheet 210 illustrated in the second embodiment is attached to a lower part of an input surface (front surface) of a touch screen 401' of an electronic apparatus 400' such as a smartphone and a tablet device. One plate surface 212 of the magnetic sheet 210 is disposed to face an input surface side of the touch screen 401' and the other plate surface 211 (first surface) of the magnetic sheet 210 is preliminarily magnetized with a texture (first texture) including S-pole regions 211a and N-pole regions 211b. The magnetic sheet 220 illustrated in the second embodiment is disposed on the plate surface 211 of the magnetic sheet 210. One surface 221 (second surface) of the magnetic sheet 220 is magnetized with a texture (second texture) including S-pole regions 221a and N-pole regions 221b and the magnetic sheet 220 is disposed so that the surface 221 faces the plate surface 211. A user touches the other surface 222 of the magnetic sheet 220 layered on the magnetic sheet 210 with a finger 200 and performs an operation for changing a relative positional relation between the surface 211 and the surface 221 while keeping the surface 211 and the surface 221 in contact with or close (nearly contact) to each other. Thus, the input operation with respect to the touch screen 401' is performed and the user perceives bumpy feeling. Presented contents of game contents on the touch screen 401' (output device) are changed and sound outputted from a speaker 402' (output device) of the electronic apparatus 400' is changed in response to this input operation.

<Case where Input Device is Computer Mouse and so On>

Figure 40C:
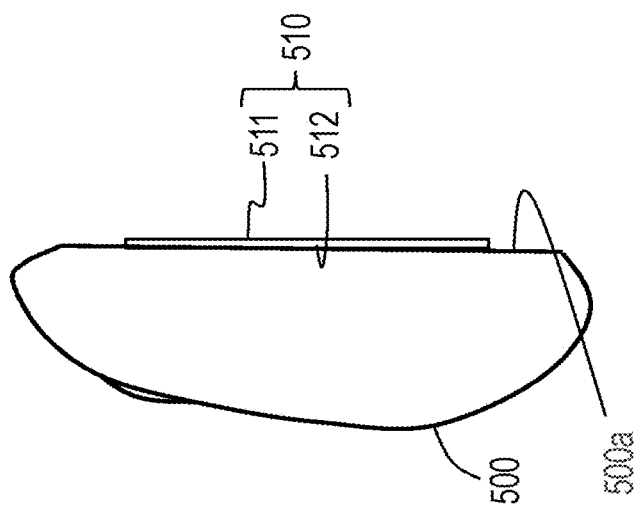
FIG. 40A to FIG. 40C are diagrams illustrating an input device according to the embodiment.
Figure 40B:
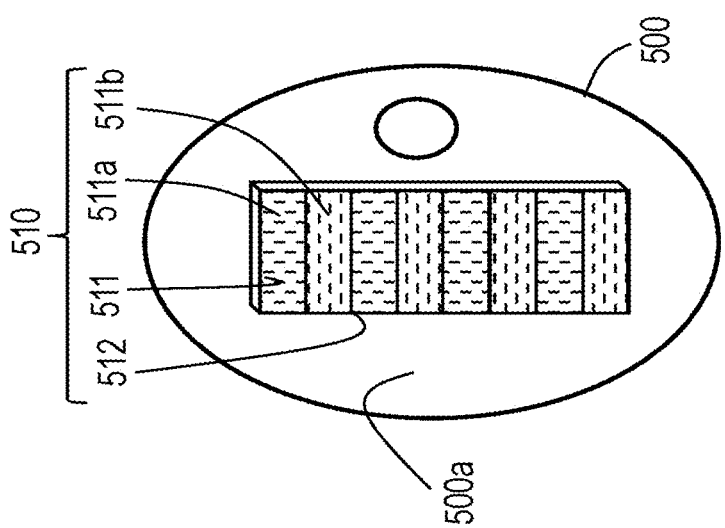
Figure 40A:
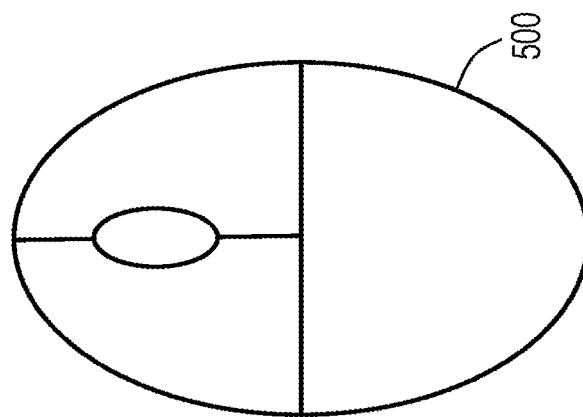

FIG. 40A to FIG. 40C illustrate an example in which the principle of the second embodiment is incorporated into a computer mouse 500. A magnetic sheet 510 which is the "second object" is fixed on a bottom surface 500a of the computer mouse 500. One surface 511 (second surface) of the magnetic sheet 510 is preliminarily magnetized with a "second texture" including S-pole regions 511a and N-pole regions 511b. The "second texture" is a stripe texture and a checker texture, for example. The other surface 512 of the magnetic sheet 510 is fixed on the bottom surface 500a of the computer mouse 500.

The magnetic sheets 210, 230, 250, 210', 230', and 250', and the base objects 310 and 310', for example, can be used as the "first object". When the magnetic sheet 210 is used as the "first object", for example, a user (acting subject) disposes the magnetic sheet 210 so that the surface 211 (first surface) faces outside and grips the computer mouse 500 so that the surface 511 (second surface) of the magnetic sheet 510 fixed to the computer mouse 500 is brought into contact with the surface 211. The user slides the computer mouse 500 along the surface 211 (first surface) of the magnetic sheet 210 so as to change a relative positional relation between the surface 211 (first surface) and the surface 511 (second surface) while keeping the surface 211 (first surface) and the surface 511 (second surface) in contact with or close to each other. Thus, the input operation with respect to the computer mouse 500 is performed and the user perceives bumpy feeling. An image may be displayed from a display (output device), which is not shown, a video may be projected from a projector (output device), or sound may be outputted from a speaker (output device) in response to this input operation. Accordingly, force sense can be presented and presented contents of an image and/or sound can be changed in response to an input operation.

Characteristics of Present Embodiment

In the present embodiment, a user performing information input can be allowed to perceive bumpy feeling when he/she performs the information input into an input device.

Fifth Embodiment

The principles of the second embodiment are applied in a fifth embodiment as well. In the fifth embodiment, a first object is fixed on a walking surface and bumpy feeling is presented when an acting subject wearing or gripping a second object moves, providing tactile information similar to a braille paving tile to a pedestrian. The "first object" of the present embodiment can be fixed on a walking surface in a state that a "first surface" faces upward and the "second object" is a member that can be worn or gripped by an "acting subject" in a state that a "second surface" faces outside. Here, the "first object" includes the "first surface", and the "first surface" is magnetized with a "first texture" including S-pole regions and N-pole regions; and the "second object" includes the "second surface", and the "second surface" is magnetized with a "second texture" including S-pole regions and N-pole regions, as described above. The "acting subject" wearing or gripping the "second object" walks on the "first surface" of the "first object" fixed on a walking surface while keeping the "first surface" and the "second surface" in contact with or close to each other and thus changes a relative positional relation between the "first surface" and the "second surface", perceiving bumpiness.

A specific example of the present embodiment is described below with reference to the accompanying drawings.

Figure 41:
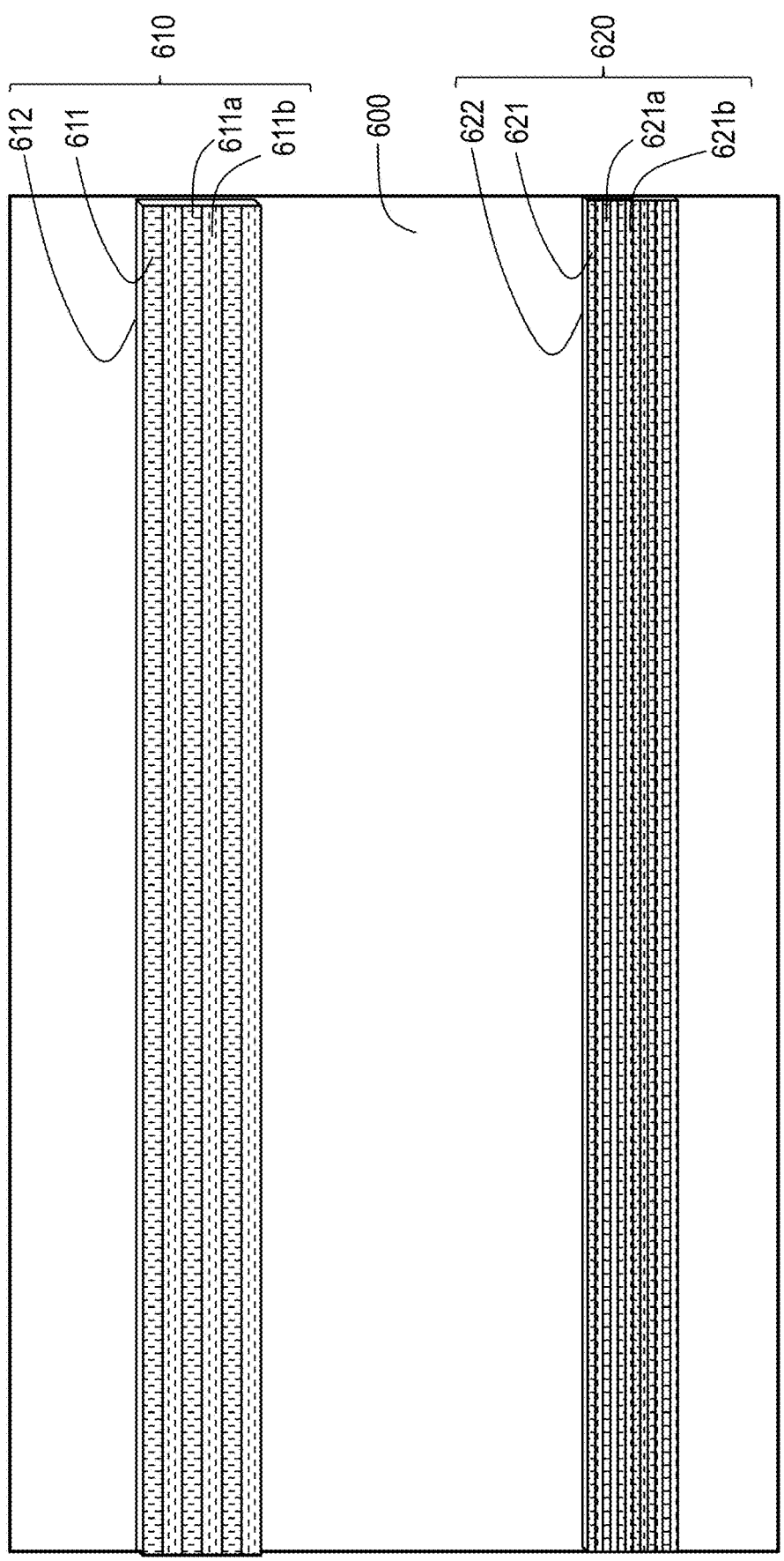
FIG. 41 is a diagram illustrating a magnetic braille paving tile according to an embodiment.

FIG. 41 illustrates magnetic sheets 610 and 620 which are the "first object" according to the present embodiment. One surface 611 (first surface) of a magnetic sheet 610 is magnetized with a texture (first texture) including S-pole regions 611a and N-pole regions 611b. The surface 611 (first surface) of the magnetic sheet 610 faces upward and the other surface 612 of the magnetic sheet 610 is fixed on a floor 600 (walking surface). In a similar manner, one surface 621 (first surface) of the magnetic sheet 620 is magnetized with a texture (first texture) including S-pole regions 621a and N-pole regions 621b. The surface 621 (first surface) of the magnetic sheet 620 faces upward and the other surface 622 of the magnetic sheet 620 is fixed on the floor 600 (walking surface). Though the surfaces 611 and 621 are magnetized with stripe textures in FIG. 41, the surfaces 611 and 621 may be magnetized with checker textures.

Figure 42B:
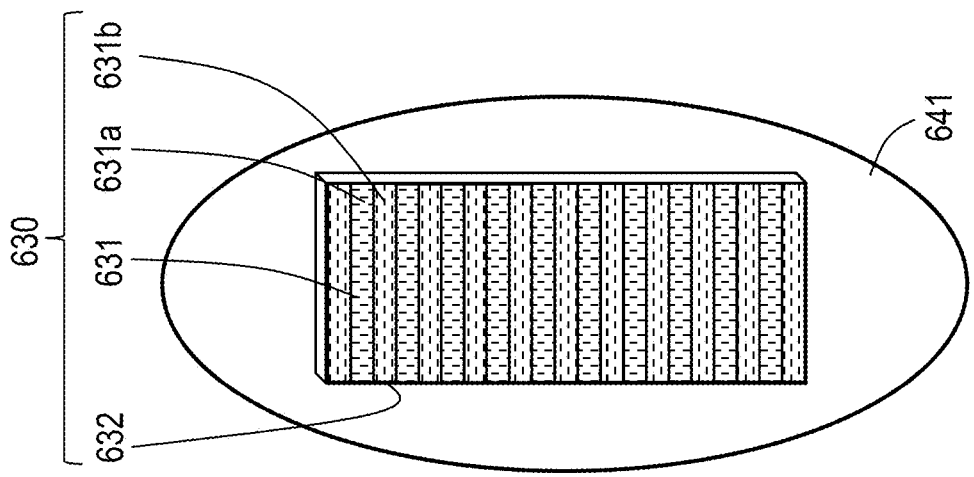
FIG. 42A and FIG. 42B are diagrams illustrating a shoe for magnetic braille paving tile according to the embodiment.
Figure 42A:
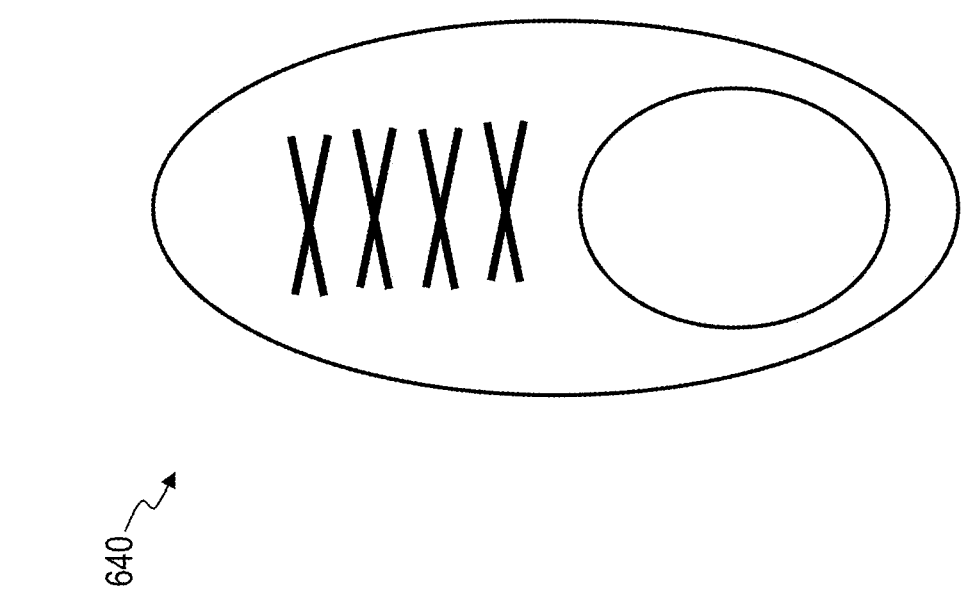

FIG. 42A and FIG. 42B illustrate a shoe 640 which is the "second object" of the present embodiment. One surface 632 of a magnetic sheet 630 is fixed on a shoe sole 641 (second surface) of the shoe 640. The other surface 631 of the magnetic sheet 630 is magnetized with a texture (second texture) including S-pole regions 631a and N-pole regions 631b. Needless to say, a pedestrian (acting subject) can wear the shoe 640 in a state that the shoe sole 641 faces outside.

A pedestrian wearing the shoe 640 walks on the surface 611 or 621 (first surface) of the magnetic sheet 610 or 620 fixed on the floor 600 (walking surface) while keeping the surface 611 or 621 (first surface) of the magnetic sheet 610 or 620 and the shoe sole 641 (second surface) in contact with or close to each other and thus changes a relative positional relation between the surface 611 or 621 (first surface) and the shoe sole 641 (second surface), perceiving bumpiness.

Figure 43B:
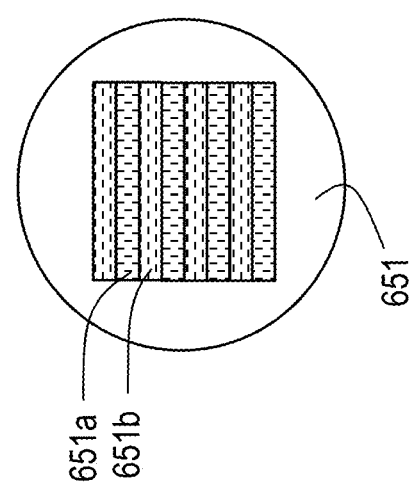
FIG. 43A and FIG. 43B are diagrams illustrating a white cane for magnetic braille paving tile according to the embodiment.
Figure 43A:
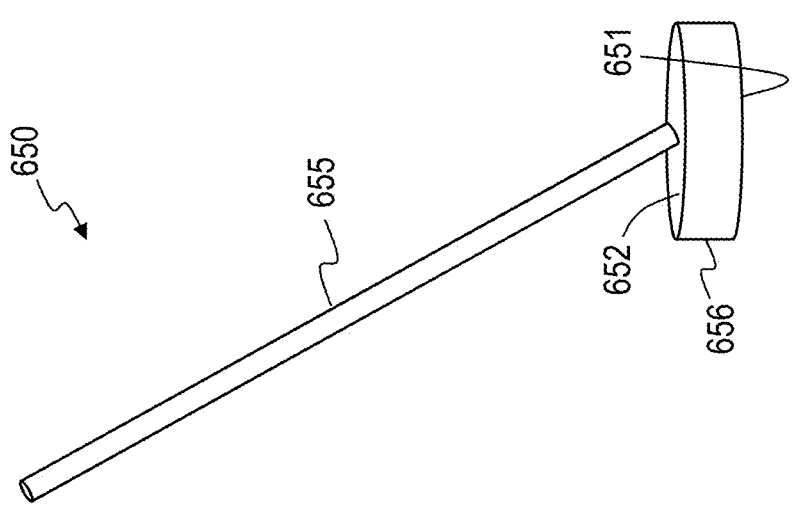

FIG. 43A and FIG. 43B illustrate a white cane 650 which is another example of the "second object". The white cane 650 includes a gripping part 655 having a substantially columnar shape and an end part 656 having a substantially discoid shape. One end of the gripping part 655 is fixed or integrated around the center of one surface 652 of the end part 656. The other surface 651 (second surface) of the end part 656 is preliminarily magnetized with a texture (second texture) including S-pole regions 651a and N-pole regions 651b. A pedestrian gripping the white cane 650 walks on the surface 611 or 621 (first surface) of the magnetic sheet 610 or 620 fixed on the floor 600 (walking surface) while keeping the surface 611 or 621 (first surface) of the magnetic sheet 610 or 620 and the surface 651 (second surface) of the end part 656 of the white cane 650 in contact with or close to each other and thus changes a relative positional relation between the surface 611 or 621 (first surface) and the surface 651 (second surface), perceiving bumpiness.

Characteristics of Present Embodiment

In the present embodiment, a pedestrian can be allowed to perceive bumpy feeling without providing physical bumps on the floor 600. Physical bumps do not have to be provided on the floor 600, providing an advantage that dirt or dust is hardly collected on the floor 600. Further, the way of change in shearing stress received from the shoe sole 641 or the surface 651 by a pedestrian (acting subject) is varied depending on the direction in which the relative positional relation between the surface 611 or 621 (first surface) and the shoe sole 641 or the surface 651 (second surface) is changed by using a stripe texture or the like, thus being able to providing different bumpy feeling. Accordingly, different bumpy feeling can be presented depending on a heading direction of a pedestrian.

Other Modifications and so Forth

The present invention is not limited to the above-described embodiments. For example, the "first object", the "second object", the "base object", the "first contact object", the "second contact object", and so on may be composed of a magnetic body other than a magnetic sheet. The "first object", the "second object", the "base object", the "first contact object", the "second contact object", and so on may be electromagnet. Further, the above-described embodiments have shown the example in which a stripe texture or/and a checker texture magnetizes a magnetic body. However, a texture having another pattern may magnetize a magnetic body as long as bumpy feeling can be presented based on the above-described principles. Furthermore, the cutter component of the cutting plotter is replaced with the magnetization component and this cutting plotter is driven so as to magnetize a magnetic sheet in the first embodiment. However, instead of the cutting plotter, other devices in which a head can be moved in a planar direction such as a pen printer may be used. That is, a component such as a pen attached to a head of such a device may be replaced with the magnetization component and this device may be driven to magnetize a magnetic sheet.

DESCRIPTION OF REFERENCE NUMERALS 1 magnetization device
11 magnetization component
210, 220, 230, 240, 250, 260, 410, 510, 610 magnetic sheet
310, 310' base object
341, 342 sheet
401 touch screen
420 glove
430 stylus pen
500 computer mouse
600 floor
640 shoe
650 white cane

What is claimed is:
1. A force sense presenting object comprising:
a base object that is a magnetic sheet and includes a first surface, where a partial region including a predetermined path on the first surface of the magnetic sheet is preliminarily magnetized with a first texture in which an S-pole region and an N-pole region are arranged in an alternate manner;
a first sheet that is provided with a first drawing, the first drawing being visually recognizable, and is layered on the first surface side of the base object;
a second sheet that is provided with a second drawing, the second drawing being visually recognizable and being different from the first drawing, and is layered on the first surface side of the base object;
a first contact object that includes a magnetic sheet including a second surface and an opposite surface of the second surface, the second surface being preliminarily magnetized with a second texture in which an S-pole region and an N-pole region are arranged in an alternate manner, where the opposite surface of the second surface is provided with a third drawing corresponding to the first drawing; and
a second contact object that includes a magnetic sheet including a third surface and an opposite surface of the third surface, the third surface being preliminarily magnetized with a third texture in which an S-pole region and an N-pole region are arranged in an alternate manner, the third texture being different from the second texture, where the opposite surface of the third surface is provided with a fourth drawing corresponding to the second drawing, wherein
a first pathway for an object drawn in the third drawing to move is drawn in first position of the first drawing, the first position being layered on the path of the base object,
a second pathway for an object drawn in the fourth drawing to move is drawn in second position of the second drawing, the second position being layered on the path of the base object,
the first contact object is used in a first action in which, with the first sheet being layered on the base object, an acting subject touches the first contact object, and the first contact object is moved on the first pathway which is layered on the path of the base object while keeping the first surface and the second surface close to each other with disposing the first sheet between them, and
the second contact object is used in a second action in which, with the second sheet being layered on the base object, the acting subject touches the second contact object, and the second contact object is moved on the second pathway which is layered on the path of the base object while keeping the first surface and the third surface close to each other with disposing the second sheet between them.

2. The force sense presenting object according to claim 1, wherein
bumpy feeling perceived by the acting subject from the first contact object when the acting subject performs the first action and
bumpy feeling perceived by the acting subject from the second contact object when the acting subject performs the second action are different from each other, and/or
a way of change in shearing stress received by the acting subject from the first contact object when performing the first action and a way of change in shearing stress received by the acting subject from the second contact object when performing the second action are different from each other.

3. A force sense presenting object comprising:
a base object that is a magnetic sheet and includes a first surface, where a first magnetization region including a predetermined first path on the first surface of the magnetic sheet is preliminarily magnetized with a first magnetization pattern in which an S-pole region and an N-pole region are arranged in an alternate manner, and a second magnetization region including a predetermined second path on the first surface of the magnetic sheet is preliminarily magnetized with a second magnetization pattern in which an S-pole region and an N-pole region are arranged in an alternate manner, the second magnetization pattern being different from the first magnetization pattern;
a first sheet that is provided with a first drawing, the first drawing being visually recognizable, and is layered on the first surface side of the base object;
a second sheet that is provided with a second drawing, the second drawing being visually recognizable and being different from the first drawing, and is layered on the first surface side of the base object;
a first contact object that includes a magnetic sheet including a second surface and an opposite surface of the second surface, the second surface being preliminarily magnetized with a second texture in which an S-pole region and an N-pole region are arranged in an alternate manner, where the opposite surface of the second surface is provided with a third drawing corresponding to the first drawing; and
a second contact object that includes a magnetic sheet including a third surface and an opposite surface of the third surface, the third surface being preliminarily magnetized with a third texture in which an S-pole region and an N-pole region are arranged in an alternate manner, and the third texture being different from the second texture, where the opposite surface of the third surface is provided with a fourth drawing corresponding to the second drawing, wherein
a first pathway for an object drawn in the third drawing to move is drawn in first position of the first drawing, the first position being layered on the first path of the base object,
a second pathway for an object drawn in the fourth drawing to move is drawn in second position of the second drawing, the second position being layered on the first path of the base object,
a third pathway for an object drawn in the third drawing to move is drawn in third position of the first drawing, the third position being layered on the second path of the base object,
a fourth pathway for an object drawn in the fourth drawing to move is drawn in fourth position of the second drawing, the fourth position being layered on the second path of the base object,
a first action is an action in which, with the first sheet being layered on the base object, an acting subject touches the first contact object, and the first contact object is moved on the first pathway which is layered on the first path of the base object while keeping the first surface and the second surface close to each other with disposing the first sheet between them,
a third action is an action in which, with the first sheet being layered on the base object, the acting subject touches the first contact object, and the first contact object is moved on the third pathway which is layered on the second path of the base object while keeping the first surface and the second surface close to each other with disposing the first sheet between them,
a second action is an action in which, with the second sheet being layered on the base object, the acting subject touches the second contact object, and the second contact object is moved on the second pathway which is layered on the first path of the base object while keeping the first surface and the third surface close to each other with disposing the second sheet between them,
a fourth action is an action in which, with the second sheet being layered on the base object, the acting subject touches the second contact object, and the second contact object is moved on the fourth pathway which is layered on the second path of the base object while keeping the first surface and the third surface close to each other with disposing the second sheet between them, wherein
the first magnetization pattern of the first magnetization region on the first surface of the base object, the second magnetization pattern of the second magnetization region on the first surface of the base object, a magnetization pattern of the second texture of the first contact object, and a magnetization pattern of the third texture of the second contact object are magnetization patterns, in which a magnitude of bumpy feeling perceived by the acting subject from the first contact object when the acting subject performs the first action is smaller than a magnitude of bumpy feeling perceived by the acting subject from the first contact object when the acting subject performs the third action, and a magnitude of bumpy feeling perceived by the acting subject from the second contact object when the acting subject performs the second action is equal to or larger than a magnitude of bumpy feeling perceived by the acting subject from the second contact object when the acting subject performs the fourth action.

4. A force sense presenting object comprising:

a base object that is a magnetic sheet and includes a first surface, where a first magnetization region including a predetermined first path on the first surface of the magnetic sheet is preliminarily magnetized with a first magnetization pattern in which an S-pole region and an N-pole region are arranged in an alternate manner, and a second magnetization region including a predetermined second path on the first surface of the magnetic sheet is preliminarily magnetized with a second magnetization pattern in which an S-pole region and an N-pole region are arranged in an alternate manner, the second magnetization pattern being different from the first magnetization pattern;

a first sheet that is provided with a first drawing, the first drawing being visually recognizable, and is layered on the first surface side of the base object;

a second sheet that is provided with a second drawing, the second drawing being visually recognizable and being different from the first drawing, and is layered on the first surface side of the base object;

a first contact object that includes a magnetic sheet including a second surface and an opposite surface of the second surface, the second surface being preliminarily magnetized with a second texture in which an S-pole region and an N-pole region are arranged in an alternate manner, where the opposite surface of the second surface is provided with a third drawing corresponding to the first drawing; and a second contact object that includes a magnetic sheet including a third surface and an opposite surface of the third surface, the third surface being preliminarily magnetized with a third texture in which an S-pole region and an N-pole region are arranged in an alternate manner, and the third texture being different from the second texture, where the opposite surface of the third surface is provided with a fourth drawing corresponding to the second drawing, wherein a first pathway for an object drawn in the third drawing to move is drawn in first position of the first drawing, the first position being layered on the first path of the base object, a second pathway for an object drawn in the fourth drawing to move is drawn in second position of the second drawing, the second position being layered on the first path of the base object, a third pathway for an object drawn in the third drawing to move is drawn in third position of the first drawing, the third position being layered on the second path of the base object, a fourth pathway for an object drawn in the fourth drawing to move is drawn in fourth position of the second drawing, the fourth position being layered on the second path of the base object, a first action is an action in which, with the first sheet being layered on the base object, an acting subject touches the first contact object, and the first contact object is moved on the first pathway which is layered on the first path of the base object while keeping the first surface and the second surface close to each other with disposing the first sheet between them, a third action is an action in which, with the first sheet being layered on the base object, the acting subject touches the first contact object, and the first contact object is moved on the third pathway which is layered on the second path of the base object while keeping the first surface and the second surface close to each other with disposing the first sheet between them, a second action is an action in which, with the second sheet being layered on the base object, the acting subject touches the second contact object, and the second contact object is moved on the second pathway which is layered on the first path of the base object while keeping the first surface and the third surface close to each other with disposing the second sheet between them, a fourth action is an action in which, with the second sheet being layered on the base object, the acting subject touches the second contact object, and the second contact object is moved on the fourth pathway which is layered on the second path of the base object while keeping the first surface and the third surface close to each other with disposing the second sheet between them, wherein the first magnetization pattern of the first magnetization region on the first surface of the base object, the second magnetization pattern of the second magnetization region on the first surface of the base object, a magnetization pattern of the second texture of the first contact object, and a magnetization pattern of the third texture of the second contact object are magnetization patterns, in which a maximum value of shearing stress received by the acting subject from the first contact object when the acting subject performs the first action is smaller than a maximum value of shearing stress received by the acting subject from the first contact object when the acting subject performs the third action, and a maximum value of shearing stress received by the acting subject from the second contact object when the acting subject performs the second action is equal to or larger than a maximum value of shearing stress received by the acting subject from the second contact object when the acting subject performs the fourth action.

* * * * *